(12) United States Patent
Chen et al.

(10) Patent No.: US 8,885,649 B2
(45) Date of Patent: Nov. 11, 2014

(54) METHOD, APPARATUS, AND SYSTEM FOR IMPLEMENTING PRIVATE NETWORK TRAVERSAL

(71) Applicant: Huawei Technologies Co., Ltd., Guangdong (CN)

(72) Inventors: Xin Chen, Hangzhou (CN); Qiang Yan, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/139,022

(22) Filed: Dec. 23, 2013

(65) Prior Publication Data

US 2014/0226664 A1    Aug. 14, 2014

Related U.S. Application Data

(63) Continuation of application No. PCT/CN2013/071564, filed on Feb. 8, 2013.

(51) Int. Cl.
*H04L 12/28* (2006.01)
*H04L 29/12* (2006.01)

(52) U.S. Cl.
CPC ................................ *H04L 61/2589* (2013.01)
USPC ........................................................ 370/392

(58) Field of Classification Search
None
See application file for complete search history.

(56) References Cited

U.S. PATENT DOCUMENTS

| 2005/0259637 | A1* | 11/2005 | Chu et al. | 370/352 |
| 2009/0094684 | A1* | 4/2009 | Chinnusamy et al. | 726/4 |
| 2009/0097477 | A1* | 4/2009 | Zhu | 370/352 |
| 2009/0292817 | A1* | 11/2009 | Cho et al. | 709/230 |
| 2009/0319674 | A1* | 12/2009 | Yahyaoui et al. | 709/228 |
| 2010/0257276 | A1* | 10/2010 | Savolainen | 709/230 |
| 2011/0219113 | A1* | 9/2011 | Grewal et al. | 709/224 |
| 2012/0099599 | A1* | 4/2012 | Keranen et al. | 370/392 |
| 2013/0132524 | A1* | 5/2013 | Cho et al. | 709/219 |

(Continued)

FOREIGN PATENT DOCUMENTS

| CN | 1968194 A | 5/2007 |
| CN | 101848235 A | 9/2010 |
| CN | 101883056 A | 11/2010 |
| WO | WO 2009065996 A1 | 5/2009 |

OTHER PUBLICATIONS

Holmberg et al., "Web Real-Time Communication Use-cases and Requirements," Internet-Draft, pp. 1-28, RTC-WEB Working Group (Dec. 19, 2012).

*Primary Examiner* — Otis L Thompson, Jr.
(74) *Attorney, Agent, or Firm* — Leydig, Voit & Mayer, Ltd.

(57) ABSTRACT

A method, an apparatus, and a system for implementing private network traversal are disclosed, where a message exchanged between a TURN server in a public network and a communications terminal in a local area network is transmitted through a pre-established websocket connection. The method includes: receiving, by the TURN server, a resource allocate request sent by the communications terminal, allocating a relay address and a resource port for the communications terminal; receiving a TURN data packet sent by the communications terminal, where the TURN data packet includes communication data and a multiplexing identifier, and sending the communication data to the remote node through the communications channel identified by the multiplexing identifier, thereby solving a problem in an existing TURN technology that in case that a firewall only opening an HTTP port is deployed, communication between a communications terminal in a local area network and a remote node cannot be implemented.

35 Claims, 18 Drawing Sheets

(56) References Cited

U.S. PATENT DOCUMENTS

2013/0185440 A1* 7/2013 Blau et al. .................... 709/227
2014/0071839 A1* 3/2014 Andersen et al. ............. 370/252
2014/0082217 A1* 3/2014 Lohner et al. ................. 709/245
2014/0123267 A1* 5/2014 Preiss et al. .................... 726/14
2014/0150075 A1* 5/2014 Ryner ............................... 726/5

* cited by examiner

METHOD, APPARATUS, AND SYSTEM FOR IMPLEMENTING PRIVATE NETWORK TRAVERSAL

CROSS-REFERENCE TO RELATED APPLICATIONS

This application is a continuation of International Patent Application No. PCT/CN2013/071564, filed on Feb. 8, 2013, which is hereby incorporated by reference in its entirety.

TECHNICAL FIELD

Embodiments of the present invention relate to the field of communications, and in particular, to a method, an apparatus, and a system for implementing private network traversal.

BACKGROUND

With fast development of network technologies, a telecommunication network develops towards integration of a mobile network and a fixed network, so that various telecommunication services are expected to be borne on an IP (Internet protocol) network. However, IP addresses in the IP network are seriously deficient, so that it is impossible to allocate one public network address for each terminal. Therefore, a corresponding private network traversal function needs to be implemented on the IP network, so that a relatively small number of public network IP addresses are used to support a large number of machines in a local area network to access the IP network.

A TURN (Traversal Using Relay NAT, traversal using relay NAT) technology is a technology for implementing private network traversal, where a full name of NAT is Network Address Translation (network address translation). In the existing TURN technology, a communications terminal in a local area network sends signaling and communication data used to implement communication with a remote node to a TURN server located in a public network through a TCP protocol or UDP protocol, for example, the communications terminal sends a resource allocate request Allocate request to the TURN server through the TCP protocol (Transmission Control Protocol, transmission control protocol) or the UDP protocol (User Datagram Protocol, user datagram protocol, so as to request the TURN server to allocate a relay address, a resource port, and other communication resources used to communicate with the remote node, and sends a data packet used to communicate with the remote node to the TURN server through the TCP or UDP protocol, and the TURN server relays the data packet to the remote node by using the relay address and the resource port. The communications terminal sends signaling and communication data used to communicate with different remote nodes to different ports of the TURN server, so as to implement communication with the different remote nodes through the different ports of the TURN server.

Usually, a firewall or a proxy server is also deployed between the local area network and the public network, so that the local area network is prevented from being intruded by unauthorized users. Under an environment such as a hotel, an airport, or a prison, a firewall only opening an HTTP port (for example, an HTTP default port 80/433 port) and only allowing a data packet with an HTTP format to pass through is often deployed, the message and the communication data used to implement communication with the remote node may be blocked by the firewall or the proxy server, so that communication between the communications terminal in the local area network and the remote node cannot be implemented.

SUMMARY

Embodiments of the present invention provide a method, an apparatus, and a system for implementing private network traversal, to solve the problem in the prior art that communication between a communications terminal in a local area network and a remote node cannot be implemented because a firewall only opening an HTTP port and only allowing a data packet with an HTTP format to pass through is deployed.

In addition, due to limitation of the firewall on the port, the communications terminal in the local area network cannot send signaling and communication data used to implement communication with different remote nodes to different ports of a TURN server for implementing communication with the different remote nodes. The method, the apparatus, and the system for implementing private network traversal provided by the embodiments of the present invention are further used to solve the problem that communication between the communications terminal in the local area network and multiple remote nodes cannot be implemented due to the limitation of the firewall on the port.

In a first aspect, a method for implementing private network traversal is provided, where a message exchanged between a traversal using relay network address translation (TURN) server in a public network and a communications terminal in a local area network is transmitted through a pre-established first websocket connection, and the method includes:

receiving, by the TURN server, a resource allocate request sent by the communications terminal, and allocating a relay address and a resource port for the communications terminal, where the relay address and the resource port are an IP address and a port of the TURN server;

receiving, by the TURN server, a TURN data packet sent by the communications terminal, where the TURN data packet includes communication data and a multiplexing identifier, the multiplexing identifier is used to identify a communications channel between the relay address and the resource port, and a remote node corresponding to the communication data; and sending, by the TURN server, the communication data to the remote node through the communications channel identified by the multiplexing identifier.

In a first possible implementation manner of the first aspect:

the resource allocate request includes a resource protocol type, where the resource protocol type designates that a communications protocol between the TURN server and the remote node is a TCP;

before the receiving, by the TURN server, a TURN data packet sent by the communications terminal, the method further includes: establishing, by the TURN server, a TCP connection with the remote node by using the relay address and the resource port;

the multiplexing identifier included in the TURN data packet is specifically used to identify the TCP connection; and the sending, by the TURN server, the communication data to the remote node through the communications channel identified by the multiplexing identifier specifically includes: sending, by the TURN server, the communication data to the remote node through the TCP connection identified by the multiplexing identifier.

With reference to the first possible implementation manner of the first aspect, in a second possible implementation manner:

after the allocating a relay address and a resource port for the communications terminal, and before the establishing a TCP connection with the remote node by using the relay address and the resource port, the method further includes:

recording a resource identifier allocated for a pre-created configuration information object, the relay address, and the resource port in the configuration information object, and sending the resource identifier to the communications terminal;

receiving a create permission request sent by the communications terminal, where the create permission request includes the resource identifier, and an IP address and a port number of the remote node; obtaining the configuration information object in which the resource identifier is recorded, recording permission information in the configuration information object, where the permission information includes the IP address and the port number of the remote node;

receiving a TCP connection request used to establish the TCP connection and sent by the remote node, where a destination IP address and a destination port of the TCP connection request are the relay address and the resource port, and a source IP address and a source port of the TCP connection request are the IP address and the port number of the remote node; and obtaining the configuration information object in which the relay address and the resource port are recorded, determining whether the permission information in the configuration information object includes the IP address and the port number of the remote node, and if the permission information includes the IP address and the port number of the remote node, determining that the communications terminal permits the remote node to communicate with the communications terminal by using the relay address and the resource port.

With reference to the first possible implementation manner of the first aspect, in a third possible implementation manner:

after the allocating a relay address and a resource port for the communications terminal, and before the establishing a TCP connection with the remote node by using the relay address and the resource port, the method further includes:

recording a resource identifier allocated for a pre-created configuration information object, the relay address, and the resource port in the configuration information object; sending the resource identifier to the communications terminal; receiving a connection request sent by the communications terminal, where the connection request includes the resource identifier, and an IP address and a port number of the remote node, obtaining the configuration information object in which the resource identifier is recorded, and reading the relay address and the resource port from the configuration information object; and the establishing a TCP connection with the remote node by using the relay address and the resource port specifically includes: establishing the TCP connection by using the read relay address and the read resource port, and the IP address and the port number of the remote node in the connection request.

With reference to the second or the third possible implementation manner of the first aspect, in a fourth possible implementation manner:

after the establishing a TCP connection with the remote node by using the relay address and the resource port, the method further includes: recording correspondence between a connection identifier allocated for the TCP connection and the TCP connection in the configuration information object, and sending the connection identifier to the communications terminal; the multiplexing identifier included in the TURN data packet is specifically the connection identifier; the sending the communication data to the remote node through the TCP connection identified by the multiplexing identifier specifically includes: obtaining the configuration information object in which the connection identifier is recorded, determining the TCP connection according to the correspondence between the connection identifier and the TCP connection recorded in the configuration information object, and sending the communication data to the remote node through the TCP connection; or recording correspondence between the resource identifier and the TCP connection in the configuration information object; the multiplexing identifier included in the TURN data packet is specifically the resource identifier; the sending the communication data to the remote node through the TCP connection identified by the multiplexing identifier specifically includes: obtaining the configuration information object in which the resource identifier is recorded, determining the TCP connection according to the correspondence between the resource identifier and the TCP connection recorded in the configuration information object, and sending the communication data to the remote node through the TCP connection.

With reference to any one of the first to the fourth possible implementation manners of the first aspect, in a fifth possible implementation manner, after the establishing a TCP connection with the remote node, the method further includes: receiving communication data sent by the remote node through the TCP connection, encapsulating the communication data in a TURN data packet, and sending the TURN data packet to the communications terminal, where the TURN data packet further includes the multiplexing identifier.

In a sixth possible implementation manner of the first aspect:

the resource allocate request includes a resource protocol type, where the resource protocol type designates that a communications protocol between the TURN server and the remote node is a UDP;

the multiplexing identifier included in the TURN data packet is specifically used to identify a UDP channel between the relay address and the resource port, and the remote node; and the sending, by the TURN server, the communication data to the remote node through the communications channel identified by the multiplexing identifier specifically includes: obtaining, by the TURN server, the relay address and the resource port, and an IP address and a port number of the remote node according to the multiplexing identifier, encapsulating the communication data in a UDP data packet, and sending the UDP data packet to the remote node, where a source IP address and a source port number of the UDP data packet are the relay address and the resource port, and a destination IP address and a destination port number of the UDP data packet are the IP address and the port number of the remote node.

With reference to the sixth possible implementation manner of the first aspect, in a seventh possible implementation manner:

after the allocating a relay address and a resource port for the communications terminal, and before the receiving a TURN data packet sent by the communications terminal, the method further includes: recording a resource identifier allocated for a pre-created configuration information object, the relay address, and the resource port in the configuration information object; sending the resource identifier to the communications terminal; receiving a channel binding request sent by the communications terminal, where the channel binding request includes the resource identifier, and the IP address and the port number of the remote node, and obtaining the configuration information object in which the resource identifier is recorded; and recording a channel number allocated for the UDP channel and UDP channel information in the configuration information object, where the UDP channel information includes the IP address and the port number of the remote node; and sending the channel number to the communications terminal;

the multiplexing identifier included in the TURN data packet is specifically the channel number; and the obtaining, by the TURN server, the relay address and the resource port, and an IP address and a port number of the remote node according to the multiplexing identifier specifically includes: obtaining, by the TURN server, the configuration information object in which the channel number is recorded, and obtaining the relay address and the resource port, and the IP address and the port number of the remote node in the UDP channel information recorded in the configuration information object.

With reference to the sixth possible implementation manner of the first aspect, in an eighth possible implementation manner:

after the allocating a relay address and a resource port for the communications terminal, and before the receiving a TURN data packet sent by the communications terminal, the method further includes: recording a resource identifier allocated for a pre-created configuration information object, the relay address, and the resource port in the configuration information object; sending the resource identifier to the communications terminal; receiving a channel binding request sent by the communications terminal, where the channel binding request includes the resource identifier, and the IP address and the port number of the remote node; obtaining the configuration information object in which the resource identifier is recorded; and recording UDP channel information in the configuration information object, where the UDP channel information includes the IP address and the port number of the remote node;

the multiplexing identifier included in the TURN data packet is specifically the resource identifier; and the obtaining, by the TURN server, the relay address and the resource port, and an IP address and a port number of the remote node according to the multiplexing identifier specifically includes: obtaining the configuration information object in which the resource identifier is recorded, and obtaining the relay address and the resource port, and the IP address and the port number of the remote node in the UDP channel information recorded in the configuration information object.

With reference to the sixth possible implementation manner of the first aspect, in a ninth possible implementation manner:

after the allocating a relay address and a resource port for the communications terminal, and before the receiving, by the TURN server, a TURN data packet sent by the communications terminal, the method further includes: recording a resource identifier allocated for a pre-created configuration information object, the relay address, and the resource port in the configuration information object; and sending the resource identifier to the communications terminal;

the multiplexing identifier included in the TURN data packet specifically includes the resource identifier, and the IP address and the port number of the remote node; and the obtaining the relay address and the resource port, and an IP address and a port number of the remote node according to the multiplexing identifier specifically includes: obtaining the configuration information object in which the resource identifier is recorded, and obtaining the relay address and the resource port recorded in the configuration information object, and the IP address and the port number of the remote node in the TURN data packet.

With reference to any one of the seventh to the ninth possible implementation manners of the first aspect, in a tenth possible implementation manner after the sending the resource identifier to the communications terminal, the method further includes:

receiving, by the TURN server, a create permission request sent by the communications terminal, where the create permission request includes the resource identifier, and the IP address and the port number of the remote node;

obtaining, by the TURN server, the configuration information object in which the resource identifier is recorded, and recording permission information in the configuration information object, where the permission information includes the IP address and the port number of the remote node;

receiving, by the TURN server, a UDP data packet encapsulated with communication data and sent by the remote node, where a destination IP address and a destination port number of the UDP data packet are the relay address and the resource port, and a source IP address and a source port number of the UDP data packet are the IP address and the port number of the remote node; and obtaining, by the TURN server, the configuration information object in which the relay address and the resource port are recorded, determining whether the permission information in the configuration information object includes the IP address and the port number of the remote node, and if the permission information includes the IP address and the port number of the remote node, determining that the communications terminal permits the remote node to communicate with the communications terminal by using the relay address and the resource port, encapsulating the communication data in the TURN data packet, and sending the TURN data packet to the communications terminal, where the TURN data packet further includes the multiplexing identifier.

In an eleventh possible implementation manner of the first aspect:

the resource allocate request includes a resource protocol type, where the resource protocol type designates that a communications protocol between the TURN server and the remote node is a websocket;

before the receiving, by the TURN server, a TURN data packet sent by the communications terminal, the method further includes: generating a connection identifier, recording correspondence between the connection identifier and the first websocket connection, and correspondence between the connection identifier and a second websocket connection, and sending the connection identifier to the communications terminal, where the second websocket connection is a websocket connection with the remote node pre-established by the TURN server by using the relay address and the resource port, and a message exchanged between the TURN server and the remote node is transmitted through the second websocket connection;

the multiplexing identifier included in the TURN data packet is specifically the connection identifier; and the sending, by the TURN server, the communication data to the remote node through the communications channel identified by the multiplexing identifier specifically includes: sending, by the TURN server, the TURN data packet to the remote node through the second websocket connection corresponding to the connection identifier.

With reference to the eleventh possible implementation manner of the first aspect, in a twelfth possible implementation manner after the generating a connection identifier, recording correspondence between the connection identifier and the first websocket connection, and correspondence between the connection identifier and a second websocket connection, the method further includes:

sending the connection identifier to the remote node; and receiving a TURN data packet sent by the remote node, and sending a TURN data packet to the communications terminal, where the TURN data packet includes communication data and the connection identifier.

With reference to the eleventh or the twelfth possible implementation manner of the first aspect, in a thirteenth possible implementation manner:

after allocating a relay address and a resource port for the communications terminal, and before the generating a connection identifier, recording correspondence between the connection identifier and the first websocket connection, and correspondence between the connection identifier and a second websocket connection, the method further includes: recording a resource identifier allocated for a pre-created configuration information object, the relay address, and the resource port in the configuration information object; sending the resource identifier to the communications terminal; receiving a connection request sent by the communications terminal, where the connection request includes the resource identifier, and an IP address and a port number of the remote node, obtaining the configuration information object in which the resource identifier is recorded, and determining the second websocket connection according to the relay address and the resource port recorded in the configuration information object, and the IP address and the port number of the remote node in the connection request;

the recording correspondence between the connection identifier and the first websocket connection, and correspondence between the connection identifier and a second websocket connection specifically includes: recording the correspondence between the connection identifier and the first websocket connection, and the correspondence between the connection identifier and the second websocket connection in the configuration information object; and the sending, by the TURN server, the TURN data packet to the remote node through the second websocket connection corresponding to the connection identifier specifically includes: obtaining the configuration information object in which the connection identifier is recorded, determining the second websocket connection according to the correspondence between the connection identifier and the second websocket connection recorded in the configuration information object, and sending the TURN data packet to the remote node through the second websocket connection.

With reference to the eleventh or the twelfth possible implementation manner of the first aspect, in a fourteenth possible implementation manner:

after allocating a relay address and a resource port for the communications terminal, and before the generating a connection identifier, recording correspondence between the connection identifier and the first websocket connection, and correspondence between the connection identifier and a second websocket connection, the method further includes: recording a resource identifier allocated for a pre-created configuration information object, the relay address, and the resource port in the configuration information object; sending the resource identifier to the communications terminal; receiving a create permission request sent by the communications terminal, where the create permission request includes the resource identifier, and an IP address and a port number of the remote node; obtaining the configuration information object in which the resource identifier is recorded, recording permission information in the configuration information object, where the permission information includes the IP address and the port number of the remote node; receiving a connection request sent by the remote node, where the connection request includes an IP address and a port number of the communications terminal, obtaining the configuration information object in which the IP address and the port number of the communications terminal are recorded, determining whether the permission information in the configuration information object includes the IP address and the port number of the remote node, and if the permission information includes the IP address and the port number of the remote node, determining that the communications terminal permits the remote node to communicate with the communications terminal by using the relay address and the resource port;

the recording correspondence between the connection identifier and the first websocket connection, and correspondence between the connection identifier and a second websocket connection specifically includes: recording the correspondence between the connection identifier and the first websocket connection, and the correspondence between the connection identifier and the second websocket connection in the configuration information object; and the sending, by the TURN server, the TURN data packet to the remote node through the second websocket connection corresponding to the connection identifier specifically includes: obtaining the configuration information object in which the connection identifier is recorded, determining the second websocket connection according to the correspondence between the connection identifier and the second websocket connection recorded in the configuration information object, and sending the TURN data packet to the remote node through the second websocket connection.

In a second aspect, a method for implementing private network traversal is provided, where a message exchanged between a traversal using relay network address translation (TURN) server in a public network and a communications terminal in a local area network is transmitted through a pre-established first websocket connection, and the method includes:

sending, by the communications terminal, a resource allocate request to the TURN server, so that the TURN server allocates a relay address and a resource port for the communications terminal, where the relay address and the resource port are an IP address and a port of the TURN server; and sending, by the communications terminal, a TURN data packet to the TURN server, where the TURN data packet includes communication data and a multiplexing identifier, the multiplexing identifier is used to identify a communications channel between the relay address and the resource port, and a remote node corresponding to the communication data, so that the TURN server sends the communication data to the remote node through the communications channel identified by the multiplexing identifier.

In a first possible implementation manner of the second aspect:

the resource allocate request includes a resource protocol type, where the resource protocol type designates that a communications protocol between the TURN server and the remote node is a TCP; and the multiplexing identifier included in the TURN data packet is specifically used to identify a TCP connection with the remote node established by the TURN server by using the relay address and the resource port, so that the TURN server sends the communication data to the remote node through the TCP connection identified by the multiplexing identifier.

In a second possible implementation manner of the second aspect:

the resource allocate request includes a resource protocol type, where the resource protocol type designates that a communications protocol between the TURN server and the remote node is a UDP; and the multiplexing identifier included in the TURN data packet is specifically used to identify a UDP channel between the relay address and the resource port, and the remote node, so that the TURN server obtains the relay address and the resource port, and an IP address and a port number of the remote node according to the multiplexing identifier, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

With reference to the second possible implementation manner of the second aspect, in a third possible implementation manner, before the sending, by the communications terminal, a TURN data packet to the TURN server, the method further includes: receiving, by the communications terminal, a resource identifier sent by the TURN server after the resource identifier allocated for a pre-created configuration information object, the relay address, and the resource port are recorded in the configuration information object; sending a channel binding request to the TURN server, where the channel binding request includes the resource identifier, and the IP address and the port number of the remote node, so that the TURN server records a channel number allocated for the UDP channel and UDP channel information in the configuration information object in which the resource identifier is recorded, where the UDP channel information includes the IP address and the port number of the remote node; and receiving the channel number sent by the TURN server; and the multiplexing identifier included in the TURN data packet is specifically the channel number, so that the TURN server obtains the recorded relay address and the recorded resource port, and the IP address and the port number of the remote node in the UDP channel information from the configuration information object in which the channel number is recorded, encapsulates the communication data in the UDP data packet, and sends the UDP data packet to the remote node, where the source IP address and the source port number of the UDP data packet are the relay address and the resource port, and the destination IP address and the destination port number of the UDP data packet are the IP address and the port number of the remote node.

In a fourth possible implementation manner of the second aspect:

the resource allocate request includes a resource protocol type, where the resource protocol type designates that a communications protocol between the TURN server and the remote node is a websocket;

before the sending, by the communications terminal, a TURN data packet to the TURN server, the method further includes: receiving, by the communications terminal, a connection identifier sent by the TURN server, where the TURN server records correspondence between the connection identifier and the first websocket connection, and correspondence between the connection identifier and a second websocket connection, the second websocket connection is a websocket connection with the remote node pre-established by the TURN server by using the relay address and the resource port, and a message exchanged between the TURN server and the remote node is transmitted through the second websocket connection; and the multiplexing identifier included in the TURN data packet is specifically the connection identifier, so that the TURN server sends the TURN data packet to the remote node through the second websocket connection corresponding to the connection identifier.

In a third aspect, a traversal using relay network address translation (TURN) server is provided, where the TURN server is located in a public network, and a message exchanged with a communications terminal in a local area network is transmitted through a pre-established first websocket connection, and the TURN server includes: a receiving unit, a resource allocating unit, and a sending unit; where the receiving unit is configured to receive a resource allocate request sent by the communications terminal, and transmit the resource allocate request to the resource allocating unit;

the resource allocating unit is configured to receive the resource allocate request from the receiving unit, and allocate a relay address and a resource port for the communications terminal, where the relay address and the resource port are an IP address and a port of the TURN server;

the receiving unit is further configured to receive a TURN data packet sent by the communications terminal, and transmit the TURN data packet to the sending unit, where the TURN data packet includes communication data and a multiplexing identifier, the multiplexing identifier is used to identify a communications channel between the relay address and the resource port, and a remote node corresponding to the communication data; and the sending unit is configured to receive the TURN data packet from the receiving unit, and send the communication data to the remote node through the communications channel identified by the multiplexing identifier.

In a first possible implementation manner of the third aspect, the TURN server further includes a TCP connection establishing unit;

the resource allocate request received by the receiving unit includes a resource protocol type, where the resource protocol type designates that a communications protocol between the TURN server and the remote node is a TCP;

the TCP connection establishing unit is configured to establish a TCP connection with the remote node by using the relay address and the resource port;

the multiplexing identifier included in the TURN data packet received by the receiving unit is specifically used to identify the TCP connection; and that the sending unit is configured to send the communication data to the remote node through the communications channel identified by the multiplexing identifier specifically includes: the sending unit is configured to send the communication data to the remote node through the TCP connection identified by the multiplexing identifier.

In a second possible implementation manner of the third aspect:

the resource allocate request received by the receiving unit includes a resource protocol type, where the resource protocol type designates that a communications protocol between the TURN server and the remote node is a UDP;

the multiplexing identifier included in the TURN data packet received by the receiving unit is specifically used to identify a UDP channel between the relay address and the resource port, and the remote node; and the sending unit is specifically configured to receive the TURN data packet from the receiving unit, obtain the relay address and the resource port, and an IP address and a port number of the remote node according to the multiplexing identifier, encapsulate the communication data in a UDP data packet, and send the UDP data packet to the remote node, where a source IP address and a source port number of the UDP data packet are the relay address and the resource port, and a destination IP address and a destination port number of the UDP data packet are the IP address and the port number of the remote node.

With reference to the second possible implementation manner of the third aspect, in a third possible implementation manner:

the TURN server further includes a binding unit;

the resource allocating unit is further configured to record a resource identifier allocated for a pre-created configuration information object, the relay address, and the resource port in the configuration information object; and transmit the resource identifier to the sending unit;

the sending unit is further configured to receive the resource identifier from the resource allocating unit, and send the resource identifier to the communications terminal; and receive a channel number allocated by the binding unit from the binding unit, and send the channel number to the communications terminal;

the receiving unit is further configured to receive a channel binding request sent by the communications terminal, where the channel binding request includes the resource identifier, and the IP address and the port number of the remote node, and transmit the channel binding request to the binding unit;

the binding unit is configured to receive the channel binding request from the receiving unit, and obtain the configuration information object in which the resource identifier is recorded; record a channel number allocated for the UDP channel and UDP channel information in the configuration information object, where the UDP channel information includes the IP address and the port number of the remote node; and transmit the channel number to the sending unit; and that the sending unit is configured to obtain the relay address and the resource port, and an IP address and a port number of the remote node according to the multiplexing identifier specifically includes: the sending unit is configured to obtain the configuration information object in which the channel number is recorded, and obtain the relay address and the resource port, and the IP address and the port number of the remote node in the UDP channel information recorded in the configuration information object.

In a fourth possible implementation manner of the third aspect, the TURN serve further includes a connection establishing unit;

the resource allocate request received by the receiving unit includes a resource protocol type, where the resource protocol type designates that a communications protocol between the TURN server and the remote node is a websocket; the multiplexing identifier included in the TURN data packet received by the receiving unit is specifically a connection identifier generated by the connection establishing unit;

the connection establishing unit is configured to generate the connection identifier, and record correspondence between the connection identifier and the first websocket connection, and correspondence between the connection identifier and a second websocket connection, where the second websocket connection is a websocket connection with the remote node pre-established by the TURN server by using the relay address and the resource port, and a message exchanged between the TURN server and the remote node is transmitted through the second websocket connection; and transmit the connection identifier to the sending unit;

the sending unit is further configured to receive the connection identifier from the connection establishing unit, and send the connection identifier to the communications terminal; and that the sending unit is configured to send the communication data to the remote node through the communications channel identified by the multiplexing identifier specifically includes: the sending unit is configured to send the TURN data packet to the remote node through the second websocket connection corresponding to the connection identifier.

In a fourth aspect, a communications terminal is provided, where the communications terminal is located in a local area network, and a message exchanged between a traversal using relay network address translation (TURN) server in a public network and the communications terminal is transmitted through a pre-established first websocket connection, and the communications terminal includes: a sending unit and a TURN data packet generating unit; where the sending unit is configured to send a resource allocate request to the TURN server, so that the TURN server allocates a relay address and a resource port for the communications terminal, where the relay address and the resource port are an IP address and a port of the TURN server;

the TURN data packet generating unit is configured to generate a TURN data packet, where the TURN data packet includes communication data and a multiplexing identifier, the multiplexing identifier is used to identify a communications channel between the relay address and the resource port, and a remote node corresponding to the communication data; and transmit the TURN data packet to the sending unit; and the sending unit is further configured to receive the TURN data packet from the TURN data packet generating unit, and send the TURN data packet to the TURN server, so that the TURN server sends the communication data to the remote node through the communications channel identified by the multiplexing identifier.

In a first possible implementation manner of the fourth aspect, the resource allocate request sent by the sending unit includes a resource protocol type, where the resource protocol type designates that a communications protocol between the TURN server and the remote node is a TCP; and the multiplexing identifier included in the TURN data packet generated by the TURN data packet generating unit is specifically used to identify a TCP connection with the remote node established by the TURN server by using the relay address and the resource port, so that the TURN server sends the communication data to the remote node through the TCP connection identified by the multiplexing identifier.

In a second possible implementation manner of the fourth aspect, the resource allocate request sent by the sending unit includes a resource protocol type, where the resource protocol type designates that a communications protocol between the TURN server and the remote node is a UDP; and the multiplexing identifier included in the TURN data packet generated by the TURN data packet generating unit is specifically used to identify a UDP channel between the relay address and the resource port, and the remote node, so that the TURN server obtains the relay address and the resource port, and an IP address and a port number of the remote node according to the multiplexing identifier, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

With reference to the second possible implementation manner of the fourth aspect, in a third possible implementation manner, the communications terminal further includes a first receiving unit;

the first receiving unit is further configured to receive a resource identifier sent by the TURN server after the resource identifier allocated for a pre-created configuration information object, the relay address, and the resource port are recorded in the configuration information object, and transmit the resource identifier to the sending unit;

the sending unit is further configured to send a channel binding request to the TURN server, where the channel binding request includes the resource identifier, and the IP address and the port number of the remote node, so that the TURN server records a channel number allocated for the UDP channel and UDP channel information in the configuration information object in which the resource identifier is recorded, where the UDP channel information includes the IP address and the port number of the remote node; and receive the channel number sent by the TURN server; and the multiplexing identifier included in the TURN data packet generated by the TURN data packet generating unit is specifically the channel number, so that the TURN server obtains the recorded relay address and the recorded resource port, and the IP address and the port number of the remote node in the UDP channel information from the configuration information object in which the channel number is recorded, encapsulates the communication data in the UDP data packet, and sends the UDP data packet to the remote node, where the source IP address and the source port number of the UDP data packet are the relay address and the resource port, and the destination IP address and the destination port number of the UDP data packet are the IP address and the port number of the remote node.

In a fourth possible implementation manner of the fourth aspect, the communications terminal further includes a second receiving unit;

the resource allocate request sent by the sending unit includes a resource protocol type, where the resource protocol type designates that a communications protocol between the TURN server and the remote node is a websocket;

the second receiving unit is configured to receive a connection identifier sent by the TURN server, and is configured to transmit the connection identifier to the TURN data packet generating unit, where the TURN server records correspondence between the connection identifier and the first websocket connection, and correspondence between the connection identifier and a second websocket connection, the second websocket connection is a websocket connection with the remote node pre-established by the TURN server by using the relay address and the resource port, and a message exchanged between the TURN server and the remote node is transmitted through the second websocket connection; and the TURN data packet generating unit is further configured to receive the connection identifier from the second receiving unit; the multiplexing identifier included in the TURN data packet generated by the TURN data packet generating unit is specifically the connection identifier, so that the TURN server sends the TURN data packet to the remote node through the second websocket connection corresponding to the connection identifier.

In a fifth aspect, a communications system is provided, where the communications system includes a traversal using relay network address translation (TURN) server in a public network and a communications terminal in a local area network, and a message exchanged between the TURN server and the communications terminal is transmitted through a pre-established first websocket connection;

the TURN server is configured to receive a resource allocate request sent by the communications terminal, and allocate a relay address and a resource port for the communications terminal, where the relay address and the resource port are an IP address and a port of the TURN server; is further configured to receive a TURN data packet sent by the communications terminal, where the TURN data packet includes communication data and a multiplexing identifier, the multiplexing identifier is used to identify a communications channel between the relay address and the resource port, and a remote node corresponding to the communication data; and is further configured to send the communication data to the remote node through the communications channel identified by the multiplexing identifier; and the communications terminal is configured to send the resource allocate request to the TURN server, and is configured to send the TURN data packet to the TURN server.

In a first possible implementation manner of the fifth aspect, the resource allocate request sent by the communications terminal includes a resource protocol type, where the resource protocol type designates that a communications protocol between the TURN server and the remote node is a TCP;

the TURN server is further configured to establish a TCP connection with the remote node by using the relay address and the resource port, and an IP address and a port number of the remote node;

the multiplexing identifier included in the TURN data packet sent by the communications terminal is specifically used to identify the TCP connection; and that the TURN server is configured to send the communication data to the remote node through the communications channel identified by the multiplexing identifier specifically includes: the TURN server is configured to send the communication data to the remote node through the TCP connection identified by the multiplexing identifier.

In a second possible implementation manner of the fifth aspect, the resource allocate request sent by the communications terminal includes a resource protocol type, where the resource protocol type designates that a communications protocol between the TURN server and the remote node is a UDP;

the multiplexing identifier included in the TURN data packet sent by the communications terminal is specifically used to identify a UDP channel between the relay address and the resource port, and the remote node; and that the TURN server is configured to send the communication data to the remote node through the communications channel identified by the multiplexing identifier specifically includes: the TURN server is configured to obtain the relay address and the resource port, and an IP address and a port number of the remote node according to the multiplexing identifier, encapsulate the communication data in a UDP data packet, and send the UDP data packet to the remote node, where a source IP address and a source port number of the UDP data packet are the relay address and the resource port, and a destination IP address and a destination port number of the UDP data packet are the IP address and the port number of the remote node.

With reference to the second possible implementation manner of the fifth aspect, in a third possible implementation manner:

the TURN server is further configured to record a resource identifier allocated for a pre-created configuration information object, the relay address, and the resource port in the configuration information object; send the resource identifier to the communications terminal; receive a create permission request sent by the communications terminal, where the create permission request includes the resource identifier, and the IP address and the port number of the remote node, and obtain the configuration information object in which the resource identifier is recorded; and record a channel number allocated for the UDP channel and UDP channel information in the configuration information object, where the UDP channel information includes the IP address and the port number of the remote node; and send the channel number to the communications terminal;

the multiplexing identifier included in the TURN data packet sent by the communications terminal is specifically the channel number;

that the TURN server is configured to obtain the relay address and the resource port, and an IP address and a port number of the remote node according to the multiplexing identifier specifically includes: the TURN server obtains the configuration information object in which the channel number is recorded, and obtains the relay address and the resource port, and the IP address and the port number of the remote node in the UDP channel information recorded in the configuration information object; and the communications terminal is further configured to receive the resource identifier sent by the TURN server, and is configured to send the channel binding request to the TURN server.

In a fourth possible implementation manner of the fifth aspect, the resource allocate request sent by the communications terminal includes a resource protocol type, where the resource protocol type designates that a communications protocol between the TURN server and the remote node is a websocket;

the TURN server is configured to generate a connection identifier, record correspondence between the connection identifier and the first websocket connection, and correspondence between the connection identifier and a second websocket connection, and send the connection identifier to the communications terminal; where the second websocket connection is a websocket connection with the remote node pre-established by the TURN server by using the relay address and the resource port, and a message exchanged between the TURN server and the remote node is transmitted through the second websocket connection;

the multiplexing identifier included in the TURN data packet sent by the communications terminal is specifically the connection identifier; and that the TURN server is configured to send the communication data to the remote node through the communications channel identified by the multiplexing identifier specifically includes: the TURN server is configured to send the TURN data packet to the remote node through the second websocket connection corresponding to the connection identifier.

In the embodiments of the present invention, the message exchanged between the communications terminal and the TURN server is transmitted through the websocket connection established by using an HTTP port of the TURN server, so that the messages (for example, the foregoing resource allocate request and TURN data packet) sent by the communications terminal to the TURN server may pass through the firewall only opening the HTTP port and only allowing the data packet with the HTTP format to pass through, so as to solve the problem in the existing TURN technology that communication between the communications terminal in the local area network and the remote node cannot be implemented due to the foregoing limitation of this kind of firewall.

Further, the TURN data packet that includes the communication data and is sent by the communications terminal to the TURN server further carries the multiplexing identifier used to identify the communications channel between the relay address and the resource port, and the remote node corresponding to the communication data, so that the TURN server may send the communication data to the remote node through the communications channel identified by the multiplexing identifier, so as to send the communication data used to communicate with multiple remote nodes by using the websocket connection established by the HTTP port, thereby solving the problem that communication between the communications terminal in the local area network and multiple remote nodes cannot be implemented due to the limitation of this kind of firewall on the port.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3-1 to FIG. 3-3 are schematic flowcharts of a method according to Implementation manner 1 of Embodiment 1 of the present invention;

FIG. 3-4 is an example of a format of a TURN data packet according to Implementation manner 1 of Embodiment 1 of the present invention;

FIG. 4-1 and FIG. 4-2 are schematic flowcharts of a method according to a first optional implementation manner of Implementation manner 2 of Embodiment 1 of the present invention;

FIG. 4-3 is an example of a format of a TURN data packet according to Implementation manner 2 of Embodiment 1 of the present invention;

FIG. 4-4 and FIG. 4-5 are schematic flowcharts of a method according to a second optional implementation manner of Implementation manner 2 of Embodiment 1 of the present invention;

FIG. 5-1 to FIG. 5-3 are schematic flowcharts of a method according to Implementation manner 3 of Embodiment 1 of the present invention;

FIG. 6-1 to FIG. 6-4 are schematic structural diagrams of a TURN server according to Embodiment 2 of the present invention;

FIG. 7-1 to FIG. 7-4 are schematic structural diagrams of a communications terminal according to Embodiment 3 of the present invention;

FIG. 10-1 and FIG. 10-2 are schematic structural diagrams of a system according to Embodiment 6 of the present invention.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
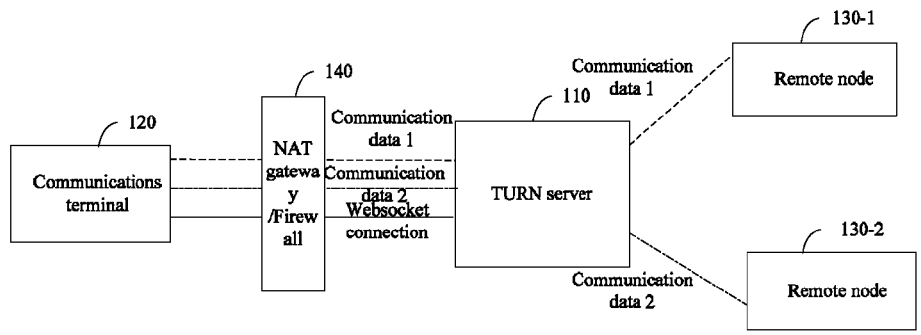
FIG. 1 is a schematic structural diagram of an implementation environment according to an embodiment of the present invention.

FIG. 1 is a schematic structural diagram of an implementation environment according to an embodiment of the present invention. The implementation environment includes a TURN server 110, a communications terminal 120, and remote nodes (a remote node 130-1 and a remote node 130-2 as shown in the drawing).

The TURN server 110 is located in a public network, the communications terminal 120 is located in a local area network, and either of the remote nodes may be located in the public network or another local area network.

The implementation environment further includes a NAT gateway and a firewall 140 deployed between the local area network and the public network. The NAT gateway and the firewall may be deployed on a same physical device, and may also be deployed on different physical devices. The firewall may be a firewall only opening an HTTP port and only allowing a data packet with an HTTP format to pass through. It should be noted that during specific deployment, the firewall may also be replaced with a proxy server, where the proxy server may be a proxy server only opening an HTTP port and only allowing a data packet with an HTTP format to pass through.

Either of the remote nodes may be specifically another communications terminal, and may also be a server (for example, a conferencing server, an instant message server, and another TURN server).

The communications terminal 120 implements communication with either of the remote nodes through the TURN server 110, where a message exchanged between the communications terminal 120 and the TURN server 110 is transmitted through a pre-established websocket connection. Specifically, the TURN server 110 receives a resource allocate request sent by the communications terminal 120 through the websocket connection, and allocates a relay address, a resource port, and other communication resources to the communications terminal 120; receives a TURN data packet that includes communication data and a multiplexing identifier and is sent by the communications terminal 120 through the websocket connection, where the multiplexing identifier is used to identify a communications channel between the relay address and the resource port, and a remote node corresponding to the communication data; and sends the communication data to the remote node through the communications channel identified by the multiplexing identifier.

The foregoing implementation environment is taken as an example, the communications terminal 120 sends two resource allocate requests to the TURN server 110 through the websocket connection, so as to apply for a communication resource 1 (including a relay address 1 and a resource port 1) and a communication resource 2 (including a relay address 2 and a resource port 2) respectively, and communicates with the remote node 130-1 and the remote node 130-2 subsequently by using the communication resource 1 and the communication resource 2 respectively. Subsequently, a communications channel between the relay address 1 and the resource port 1, and the remote node 130-1 is called a communications channel 1, and communication data sent by the communications terminal and used to communicate with the remote node 130-1 is called communication data 1; a communications channel between the relay address 2 and the resource port 2, and the remote node 130-2 is called a communications channel 2, and communication data sent by the communications terminal and used to communicate with the remote node 130-2 is called communication data 2. When communicating with the remote node 130-1, the communications terminal 120 carries a multiplexing identifier used to identify the communications channel 1 in a TURN data packet that includes the communication data 1 and is sent to the TURN server 110, and when receiving the TURN data packet, the TURN server 110 sends the communication data 1 to the remote node 130-1 through the communications channel 1; similarly, when communicating with the remote node 130-2, the communications terminal 120 carries a multiplexing identifier used to identify the communications channel 2 in a TURN data packet that includes the communication data 2 and is sent to the TURN server 110, and when receiving the TURN data packet, the TURN server 110 sends the communication data 2 to the remote node 130-2 through the communications channel 2.

According to the embodiment of the present invention, the message exchanged between the communications terminal and the TURN server is transmitted through the websocket connection established by using an HTTP port of the TURN server, so that the messages (for example, the foregoing resource allocate request and TURN data packet) sent by the communications terminal to the TURN server may pass through the firewall only opening the HTTP port and only allowing the data packet with the HTTP format to pass through, so as to solve the problem in the existing TURN technology that communication between the communications terminal in the local area network and the remote node cannot be implemented due to the limitation of this kind of firewall.

Further, the TURN data packet that includes the communication data and is sent by the communications terminal to the TURN server further carries the multiplexing identifier used to identify the communications channel between the relay address and the resource port, and the remote node corresponding to the communication data, so that the TURN server may send the communication data to the remote node through the communications channel identified by the multiplexing identifier, so as to send the communication data used to communicate with multiple remote nodes by using the websocket connection established by the HTTP port, thereby solving the problem that communication between the communications terminal in the local area network and multiple remote nodes cannot be implemented due to the limitation of this kind of firewall on the port.

Figure 2:
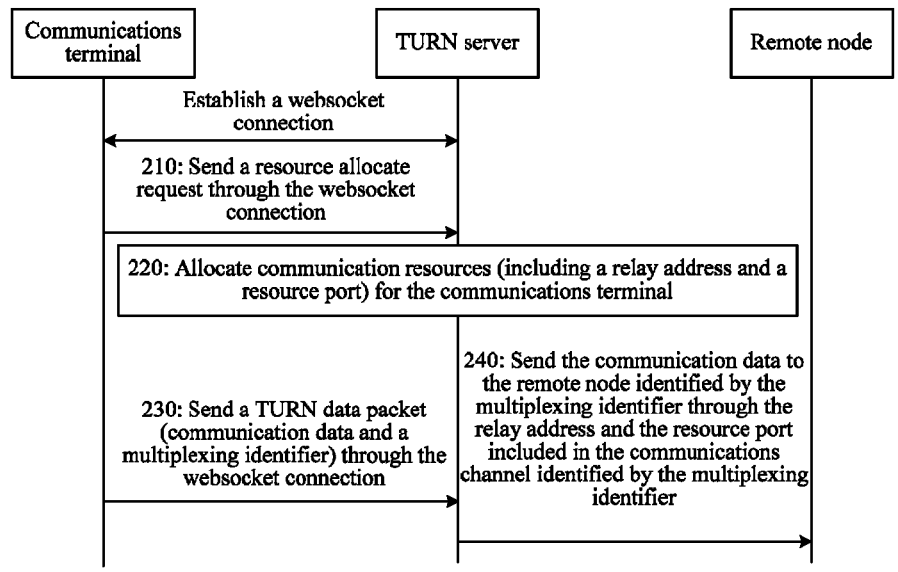
FIG. 2 is a schematic flowchart of a method according to Embodiment 1 of the present invention.

FIG. 2 is a schematic flowchart of a method for implementing private network traversal according to Embodiment 1 of the present invention.

A websocket connection is pre-established between a communications terminal in a local area network and a TURN server in a public network, and a message exchanged between the communications terminal and the TURN server is transmitted through the websocket connection.

Step 210: The communications terminal sends a resource allocate request to the TURN server.

Step 220: After receiving the resource allocate request, the TURN server allocates a relay address and a resource port for the communications terminal, where the relay address and the resource port are an IP address and a port of the TURN server.

Step 230: The communications terminal sends a TURN data packet to the TURN server.

The TURN data packet includes communication data and a multiplexing identifier, where the multiplexing identifier is used to identify a communications channel between the relay address and the resource port, and a remote node corresponding to the communication data.

The TURN data packet includes the multiplexing identifier, so as to support TURN data multiplexing on a single websocket connection, that is, to support transmitting communication data used to communicate with different remote nodes on the same websocket connection.

Step 240: The TURN server sends the communication data to the remote node through the communications channel identified by the multiplexing identifier.

In Embodiment 1 of the present invention, the messages (for example, the resource allocate request in step 210 and the TURN data packet in step 230) exchanged between the communications terminal and the TURN server are transmitted through the websocket connection.

The resource allocate request includes a resource protocol type, where the resource protocol type is used to designate a communications protocol between the TURN server and the remote node, and specifically, the communications protocol may be a TCP, a UDP, or a websocket.

The following describes 3 implementation manners of Embodiment 1 of the present invention respectively. In Implementation manner 1, the communications protocol between the TURN server and the remote node is the TCP; in Implementation manner 2, the communications protocol between the TURN server and the remote node is the UDP; and in Implementation manner 3, the communications protocol between the TURN server and the remote node is the websocket.

With reference to FIG. 3-1, FIG. 3-2, FIG. 3-3, and FIG. 3-4, the following describes Implementation manner 1 (where the communications protocol between the TURN server and the remote node is the TCP) of Embodiment 1 of the present invention in detail.

In Implementation manner 1, between steps 220 and 230, the method further includes: establishing, by the TURN server, a TCP connection with the remote node by using the relay address and the resource port; the multiplexing identifier included in the TURN data packet in step 230 is specifically used to identify the TCP connection; correspondingly, in step 240, the TURN server sends the communication data to the remote node through the TCP connection identified by the multiplexing identifier.

Figures 1, 3:
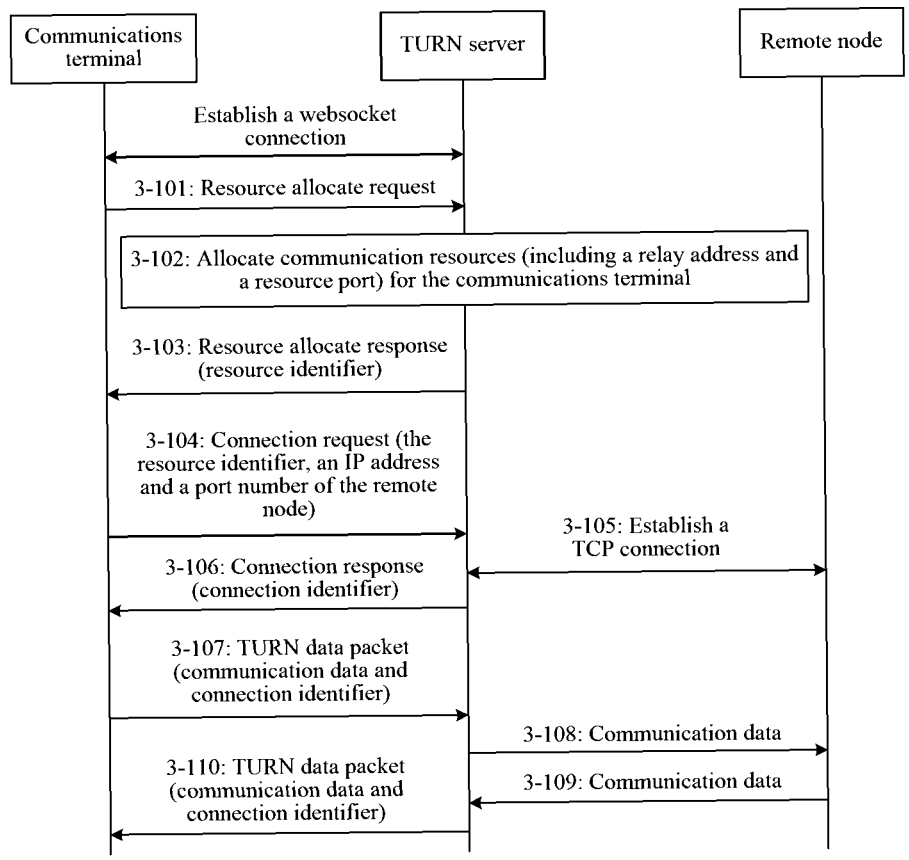
Figures 2, 3:
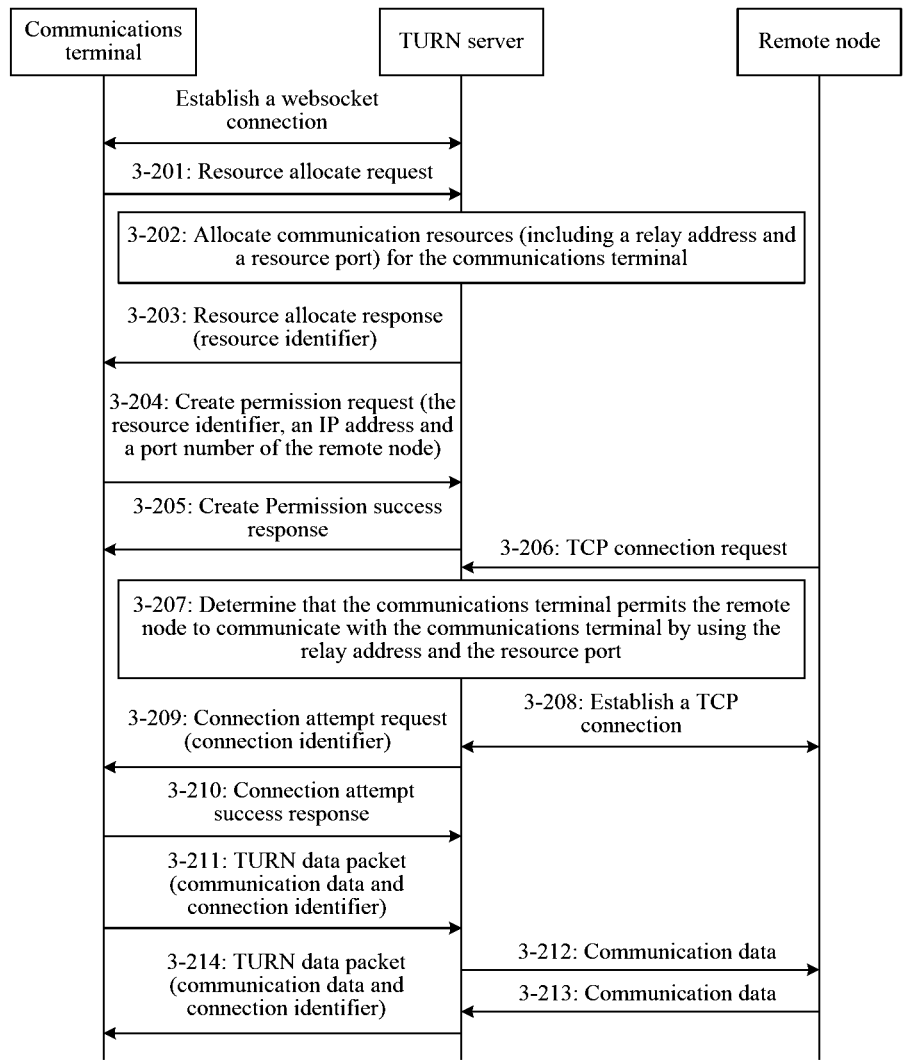
Figure 3:
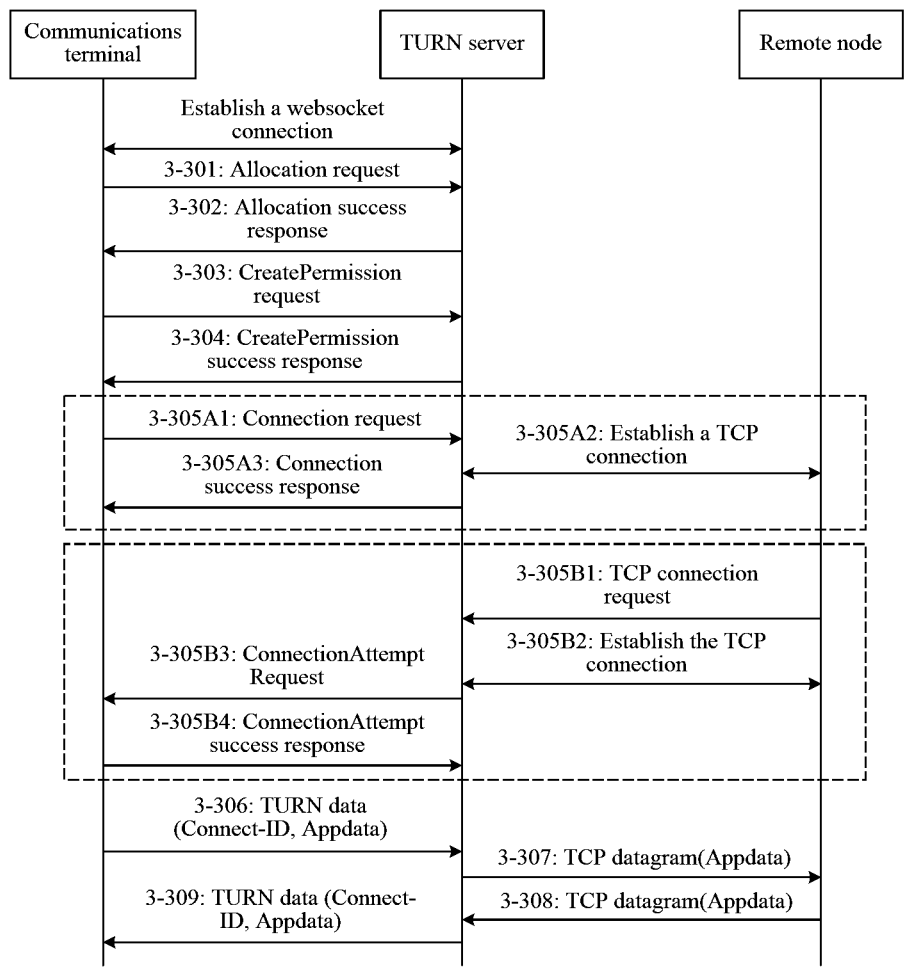

Specifically, the TURN server actively initiates establishing of the TCP connection according to a connection request of the communications terminal, or the remote node actively initiates establishing of the TCP connection. With reference to FIG. 3-1 and FIG. 3-2, the following describes the two implementation manners respectively.

As shown in FIG. 3-1, for the implementation manner that the TURN server actively initiates establishing of the TCP connection according to the connection request of the communications terminal, after allocating the relay address and the resource port, and before establishing the TCP connection, the method further includes: recording, by the TURN server, a resource identifier allocated for a pre-created configuration information object, the relay address, and the resource port in the configuration information object; sending the resource identifier to the communications terminal; receiving a connection request sent by the communications terminal, where the connection request includes the resource identifier, and an IP address and a port number of the remote node; obtaining the configuration information object in which the resource identifier is recorded, and reading the relay address and the resource port from the configuration information object; and correspondingly, the establishing the TCP connection with the remote node by using the relay address and the resource port specifically includes: establishing the TCP connection by using the read relay address and the read resource port, and the IP address and the port number of the remote node in the connection request.

With reference to FIG. 3-1, the following describes implementation steps of the foregoing implementation manner in detail:

Step 3-101: Similar to step 210, and details are not described herein again.

Step 3-102: After receiving the resource allocate request, the TURN server allocates the relay address and the resource port for the communications terminal, where the relay address and the resource port are the IP address and the port of the TURN server.

After receiving the resource allocate request, the TURN server creates the configuration information object, and records the resource identifier allocated for the configuration information object, the relay address, and the resource port in the configuration information object.

The configuration information object may be stored in the form of a file, a database form, or the like, and may also be directly stored in a memory.

Step 3-103: The TURN server sends the resource identifier to the communications terminal through the websocket connection.

Specifically, the resource identifier may be carried in a response message of the resource allocate request returned to the communications terminal.

Step 3-104: The communications terminal sends the connection request to the TURN server through the websocket connection, where the connection request includes the resource identifier, and the IP address and the port number of the remote node.

Step 3-105: The TURN server establishes the TCP connection with the remote node.

Specifically, the TURN server obtains the configuration information object in which the resource identifier is recorded, reads the relay address and the resource port from the configuration information object, and establishes the TCP connection by using the read relay address and the read resource port, and the IP address and the port number of the remote node in the connection request.

After establishing the TCP connection, the TURN server records correspondence between a connection identifier allocated for the TCP connection and the TCP connection in the configuration information object, which may be specifically recording the connection identifier and information about the TCP connection in the configuration information object. The information about the TCP connection may be specifically a handle of the TCP connection, and a sending function in a TCP object of the TCP connection may be invoked by using the handle, so as to send data through the TCP connection; and may also be the relay address and the resource port corresponding to the TCP connection, and the handle of the TCP connection may be obtained through the relay address and the resource port, so as to send the data in the foregoing manner. It should be noted that the relay address and the resource port have been recorded in step 3-102, so that only the connection identifier may be recorded at this time; and may also be a quintuple corresponding to the TCP connection (the quintuple includes the relay address and the resource port, a TCP protocol type, and the IP address and the port number of the remote node).

Step 3-106: The TURN server sends the connection identifier to the communications terminal through the websocket connection.

Specifically, the connection identifier may be carried in a response message of the connection request returned to the communications terminal.

Step 3-107: The communications terminal sends the TURN data packet to the TURN server through the websocket connection, where the TURN data packet includes the communication data and the connection identifier.

Step 3-108: The TURN server sends the communication data to the remote node through the TCP connection identified by the connection identifier.

Specifically, the TURN server obtains the configuration information object in which the connection identifier is recorded, determines the TCP connection according to the correspondence between the connection identifier and the TCP connection recorded in the configuration information object, and sends the communication data to the remote node through the TCP connection.

Step 3-109: The remote node sends the communication data to the TURN server through the TCP connection.

Step 3-110: The TURN server encapsulates the communication data received from the remote node in the TURN data packet, and sends the TURN data packet to the communications terminal through the websocket connection, where the TURN data packet further includes the connection identifier.

Specifically, after receiving the communication data through the TCP connection, the TURN server determines the IP address and the port number (that is, the relay address and the resource port) of the local end corresponding to the TCP connection, obtains the configuration information object in which the relay address and the resource port are recorded, obtains the connection identifier recorded in the configuration information object, encapsulates the communication data and the connection identifier in the TURN data packet, and sends the TURN data packet to the communications terminal.

Preferably, after the TCP connection is established in step 3-105, the remote node may record correspondence between the connection identifier of the TCP connection and the communications terminal (which may be specifically recording correspondence between the connection identifier of the TCP connection and the IP address and the port number of the communications terminal), and when receiving the communication data through the TCP connection in step 3-108, identify that the communication data is from the communications terminal according to the recorded correspondence between the connection identifier and the communications terminal. In addition, before sending the communication data through the TCP connection in step 3-109, the remote node may further obtain the connection identifier of the TCP connection corresponding to the communications terminal according to the correspondence, so as to determine the TCP connection.

Preferably, after receiving the connection identifier in step 3-106, the communications terminal may record correspondence between the connection identifier and the remote node (which may be specifically recording correspondence between the connection identifier of the TCP connection and the IP address and the port number of the remote node), and after receiving the TURN data packet in step 3-110, determines the remote node corresponding to the connection identifier in the TURN data packet according to the recorded correspondence between the connection identifier and the remote node, so as to identify that the communication data in the TURN data packet is from the remote node. In addition, before sending the TURN data packet including the connection identifier to the TURN server in step 3-107, the communications terminal may further obtain the connection identifier corresponding to the remote node according to the correspondence, and add the connection identifier in the TURN data packet.

It should be noted that in steps 3-107 and 3-108, it is implemented that the communications terminal sends the communication data to the remote node, and in steps 3-109 and 3-110, it is implemented that the remote node sends the communication data to the communications terminal, which do not have a specific order.

As shown in FIG. 3-2, for the implementation manner that the remote node actively initiates establishing of the TCP connection, after allocating the relay address and the resource port, and before establishing the TCP connection, the method further includes: the TURN server records a resource identifier allocated for a pre-created configuration information object, the relay address, and the resource port in the configuration information object, and sends the resource identifier to the communications terminal; receive a create permission request sent by the communications terminal, where the create permission request includes the resource identifier, and an IP address and a port number of the remote node; obtains the configuration information object in which the resource identifier is recorded, records permission information in the configuration information object, where the permission information includes the IP address and the port number of the remote node; receives a TCP connection request used to establish the TCP connection and sent by the remote node, where a destination IP address and a destination port of the TCP connection request are the relay address and the resource port, and a source IP address and a source port of the TCP connection request are the IP address and the port number of the remote node; obtains the configuration information object in which the relay address and the resource port are recorded, determines whether the permission information in the configuration information object includes the IP address and the port number of the remote node, and if the permission information includes the IP address and the port number of the remote node, determines that the communications terminal permits the remote node to communicate with the communications terminal by using the relay address and the resource port.

With reference to FIG. 3-2, the following describes implementation steps of the foregoing implementation manner in detail:

Step 3-201 to step 3-203: Similar to step 3-101 to step 3-103, and details are not described herein again.

Step 3-204: The communications terminal sends the create permission request to the TURN server through the websocket connection, where the create permission request includes the resource identifier, and the IP address and the port number of at least one remote node.

After receiving the create permission request, the TURN server obtains the configuration information object in which the resource identifier is recorded, and records the permission information in the configuration information, where the permission information includes the IP address and the port number of the remote node.

Step 3-205: The TURN server returns a create permission success response to the communications terminal through the websocket connection.

Step 3-206: The TURN server receives the TCP connection request used to establish the TCP connection and send by the remote node, where the destination IP address and the destination port of the TCP connection request are the relay address and the resource port, and the source IP address and the source port of the TCP connection request are the IP address and the port number of the remote node.

Step 3-207: The TURN server obtains the configuration information object in which the relay address and the resource port are recorded, determines whether the permission information in the configuration information object includes the IP address and the port number of the remote node, and if the permission information includes the IP address and the port number of the remote node, determines that the communications terminal permits the remote node to communicate with the communications terminal by using the relay address and the resource port.

Step 3-208: The TURN server accepts the TCP connection request sent by the remote node to establish the TCP connection with the remote node.

After establishing the TCP connection, the TURN server records correspondence between a connection identifier allocated for the TCP connection and the TCP connection in the configuration information object, which may be specifically recording the connection identifier and information about the TCP connection in the configuration information object. The specific implementation manner is similar to the implementation manner described in step 3-105, and details are not described herein again.

Step 3-209: The TURN server sends the connection identifier, and the IP address and the port number of the remote node to the communications terminal through the websocket connection.

Specifically, the connection identifier, and the IP address and the port number of the remote node may be carried in a connection attempt request sent to the communications terminal.

Step 3-210: The communications terminal returns a connection attempt success response to the TURN server through the websocket connection.

Steps 3-211 to 3-214: Similar to steps 3-107 to 3-110, and details are not described herein again.

Preferably, after the TCP connection is established in step 3-208, the remote node may record correspondence between the connection identifier of the TCP connection and the communications terminal (which may be specifically recording correspondence between the connection identifier of the TCP connection and the IP address and the port number of the communications terminal), and when receiving the communication data through the TCP connection in step 3-212, identify that the communication data is from the communications terminal according to the recorded correspondence between the connection identifier and the communications terminal. In addition, before sending the communication data through the TCP connection in step 3-213, the remote node may further obtain the connection identifier of the TCP connection corresponding to the communications terminal according to the correspondence, so as to determine the TCP connection.

Preferably, after receiving the connection identifier, and the IP address and the port number of the remote node in step 3-209, the communications terminal may record correspondence between the connection identifier of the TCP connection and the remote node (which may be specifically recording correspondence between the connection identifier of the TCP connection and the IP address and the port number of the remote node), and after receiving the TURN data packet in step 3-214, determines the remote node corresponding to the connection identifier in the TURN data packet according to the recorded correspondence between the connection identifier and the remote node, so as to identify that the communication data in the TURN data packet is from the remote node. In addition, before sending the TURN data packet including the connection identifier to the TURN server in step 3-211, the communications terminal may further obtain the connection identifier corresponding to the remote node according to the correspondence, and add the connection identifier in the TURN data packet.

It should be noted that in steps 3-111 and 3-112, it is implemented that the communications terminal sends the communication data to the remote node, and in steps 3-113 and 3-114, it is implemented that the remote node sends the communication data to the communications terminal, which do not have a specific order.

With reference to FIG. 3-3, the following describes an exemplary implementation manner of Implementation manner 1 in detail.

Step 3-301: The communications terminal sends the resource allocate request Allocate request to the TURN server through the websocket connection.

The Allocate request includes the resource protocol type, which may be specifically the TCP, the UDP, or the websocket, and in Implementation manner 1, the resource protocol type is the TCP. Corresponding fields included in the Allocate request are exemplarily as follows:
REQUESTED-TRANSPORT=TCP
SUB-PROTOCOL=NULL It should be noted that if a UDP or TCP resource is applied, the value of the REQUESTED-TRANSPORT field is UDP or TCP, the value of the SUB-PROTOCOL field is NULL; if a websocket resource is applied, the value of the REQUESTED-TRANSPORT field is TCP (the websocket protocol is based on the TCP protocol), and the value of the SUB-PROTOCOL field is websocket.

After receiving the Allocate request, the TURN server allocates the relay address and the resource port for the communications terminal, where the relay address and the resource port are the IP address and the port of the TURN server.

After receiving the resource allocate request, the TURN server creates the configuration information object, and records the resource identifier allocated for the configuration information object, the relay address, and the resource port in the configuration information object, and may also record transmission layer information between the communications terminal and the TURN server, a connection manner between the communications terminal and the TURN server, and a connection manner between the remote node and the TURN server, which are exemplarily as follows:
  transmission address: the relayed transport address;
  quintuple the 5-tuple: (client's IP address, client's port, server's IP address, server's port, transport protocol);
  client connection Client Connection;
  remote node connection Peer Connection;
  resource identifier Allocation-ID.

The allocated relay address and the allocated resource port are recorded in the transmission address the relayed transport address.

The transmission layer information between the communications terminal and the TURN server is recorded in the quintuple the 5-tuple, including the IP address client's IP address and the port number client's port of the communications terminal, the IP address server's IP address and the port number server's port (for example, an 80 port) of the TURN server, and the transmission protocol transport protocol adopted between the communications terminal and the TURN server. In the embodiment of the present invention, the websocket connection is established between the communications terminal and the TURN server, and the websocket is based on the TCP, so that the TCP is recorded in the transmission protocol transport protocol field.

The client connection Client Connection is used to record the connection manner between the communications terminal and the TURN server, which is specifically the Websocket in the embodiment of the present invention. The TCP connection cannot be differentiated from the websocket connection by using the quintuple 5-tuple at the transmission layer because the websocket is based on the TCP connection, so the two connection manners need to be differentiated by using the value of a Client Connection attribute.

The remote node connection Peer Connection is used to record the connection manner between the remote node and the TURN server, which is specifically the UDP, the TCP, or the Websocket. In Implementation manner 1, the value of Peer Connection is TCP, that is, the connection manner corresponding to the resource protocol type included in the resource allocate request Allocate request in step 3-301.

The resource identifier allocated for the configuration information object is recorded in resource identifier Allocation-ID.

Step 3-302: The TURN server returns a success response Allocate success response to the communications terminal through the websocket connection, where the Allocate success response includes the resource identifier.

The Allocate success response may further include the allocated relay address and the allocated resource port, and corresponding fields included in the Allocate success response are exemplary as follows:

Allocation-ID=0x0001
XOR-RELAYED-ADDRESS=222.16.2.15:80

The value of the Allocation-ID field is the resource identifier (0x0001), and the value of the XOR-RELAYED-ADDRESS field is the relay address (222.16.2.15) and the resource port (80).

It should be noted that if the resource protocol type included in the resource allocate request is websocket, the allocated resource port is the HTTP port (for example, the 80 port); otherwise, the allocated resource port may not be the HTTP port.

Step 3-303: The communications terminal sends a create permission request CreatePermission request to the TURN server through the websocket connection, where the create permission request CreatePermission request includes the resource identifier and the IP address and the port number of at least one remote node.

Corresponding fields included in the CreatePermission request are exemplarily as follows:

Allocation-ID=0x0001
XOR-PEER-ADDRESS=221.18.2.1:1260

The value of the Allocation-ID field is the resource identifier (0x0001), and the value of the XOR-PEER-ADDRESS is the IP address (221.18.2.1) and the port number (1260) of the remote node.

After receiving the CreatePermission request, the TURN server records the permission information in the configuration information object corresponding to the Allocation-ID included in the CreatePermission request, where the permission information includes the IP address and the port number of the remote node, which is exemplarily as follows: records the IP address and the port number of the remote node included in the CreatePermission request in a "list of permissions a list of permissions;" field in the configuration information object.

When subsequently receiving a TCP connection request sent by a remote node to the relay address and the resource port, the TURN server may determine whether the communications terminal permits the remote node to communicate with the communications terminal by using the relay address and the resource port according to the configuration information object, that is, the TURN server queries the configuration information object to determine whether the IP address and the port number of the remote node sending the connection request are recorded in the list of permissions a list of permissions field in the configuration information object, and if the IP address and the port number of the remote node are recorded in the field, the TURN server accepts the connection request to establish the TCP connection with the remote node.

Step 3-304: The TURN server returns a success response CreatePermission success response to the communications terminal through the websocket connection.

It should be noted that steps 3-303 and 3-304 are optional steps; if availability of the remote node in Implementation manner 1, for example does not need to be verified, a scene that the remote node sends the TCP connection request to the relay address and the resource port does not exist, steps 3-303 and 3-304 are not required.

Subsequent steps 3-305A1 to 3-305A3 are an exemplary implementation manner that the TURN server actively initiates establishing of the TCP connection according to the communications terminal.

Step 3-305A1: The communications terminal sends the connection request Connection request to the TURN server through the websocket connection, where the Connection request includes the resource identifier received in step 3-302, and the IP address and the port number of the remote node.

Corresponding fields included in the Connection request are exemplarily as follows:

Allocation-ID=0x0001
XOR-PEER-ADDRESS=221.18.2.1:1260

The value of Allocation-ID is the resource identifier (0x0001), and the value of the XOR-PEER-ADDRESS is the IP address (221.18.2.1) and the port number (1260) of the remote node.

It should be noted that the remote node in step 3-305A1 may be one of the at least one remote node in step 3-303, and may also be different from the remote node in step 3-303.

Step 3-305A2: After receiving the connection request, the TURN server obtains the configuration information object in which the resource identifier is recorded, reads the relay address and the resource port from the configuration information object, and establishes the TCP connection by using the read relay address and the read resource port, and the IP address and the port number of the remote node in the connection request.

After establishing the TCP connection, the TURN server records correspondence between a connection identifier allocated for the TCP connection and the TCP connection in the configuration information object, which may be specifically recording the connection identifier and information about the TCP connection in the configuration information object. The specific implementation manner is similar to the implementation manner described in step 3-105, and details are not described herein again.

It should be noted that the type of the connection established in step 3-305A2 is the type corresponding to a reserved resource, that is, the connection manner recorded in the remote node connection Peer Connection in the configuration information object.

Step 3-305A3: After successfully establishing the connection, the TURN server returns a connection success response Connection Success response to the communications terminal through the websocket connection, where the Connection Success response includes the connection identifier.

Corresponding fields included in the Connection Success response are exemplarily as follows:

Connect-ID=0x00A1

The value of the Connect-ID is the connection identifier (0x00A1).

Subsequent steps 3-305B1 to 3-305B4 are an exemplary implementation manner that the remote node actively initiates establishing of the TCP connection.

Step 3-305B1: The remote node sends the TCP connection request used to establish the TCP connection, where the destination IP address and the destination port of the TCP connection request are the relay address and the resource port, and the source IP address and the source port of the TCP connection request are the IP address and the port number of the remote node.

The TURN server determines whether the communications terminal permits the remote node to communicate with the communications terminal by using the relay address and the resource port; specifically, the TURN server queries the configuration information object in which the relay address and the resource port are recorded to determine whether the IP address and the port number of the remote node are recorded in the list of permissions a list of permissions field in the configuration information object, and if the IP address and the port number of the remote node are recorded in the field, executes the subsequent steps; otherwise, the TURN server rejects the connection request of the remote node.

Before sending the Connection request, the remote node may obtain the relay address and the resource port from the communications terminal, for example, the success response sent by the TURN server to the communications terminal in step 3-302 includes the relay address and the resource port, and after obtaining the relay address and the resource port in the success response, the communications terminal transmits the relay address and the resource port to the remote node. The specific implementation manner that the communications terminal transmits the relay address and the resource port to the remote node belongs to the existing technology, and is not limited in the embodiment of the present invention.

Step 3-305B2: The TURN server accepts the TCP connection request sent by the remote node to establish the TCP connection with the remote node.

After establishing the TCP connection, the TURN server records correspondence between a connection identifier allocated for the TCP connection and the TCP connection in the configuration information object, which may be specifically recording the connection identifier and information about the TCP connection in the configuration information object. The specific implementation manner is similar to the implementation manner described in step 3-105, and details are not described herein again.

Step 3-305B3: The TURN server sends a connection attempt request ConnectionAttempt request to the communications terminal through the websocket connection, where the ConnectionAttempt request includes the connection identifier, and the IP address and the port number of the remote node.

Corresponding fields included in Connection Attempt are exemplarily as follows:

Connect-ID=0x00A1
XOR-PEER-ADDRESS=221.18.2.1:1260

The value of the Connect-ID is the connection identifier (0x00A1), and the value of the XOR-PEER-ADDRESS is the IP address (221.18.2.1) and the port number (1260) of the remote node.

Step 3-305B4: The communications terminal returns a connection attempt success response ConnectionAttempt success response to the TURN server through the websocket connection.

After the TCP connection is established through steps 3-305A1 to 3-305A3 or steps 3-305B1 to 3-305B4, the communications terminal and the remote node may transmit the communication data to each other through the TURN server, as described in subsequent steps 3-306 to 3-309.

Step 3-306: The communications terminal sends the TURN data packet (TURN data) to the TURN server through the websocket connection, where the TURN data packet includes the communication data (Appdata) and the connection identifier.

Specifically, a header field of the TURN data packet includes a multiplexing identifier field, so as to support TURN data multiplexing on a single websocket connection, that is, to support transmitting communication data used to communicate with different remote nodes on the same websocket connection.

In addition, information used to indicate that the TURN data packet is encapsulated in the websocket data packet may also be carried in the header field of the websocket data packet encapsulated with the TURN data packet, or the header field of the TURN data packet; and it may also be designated in the message used to establish the websocket connection that the websocket connection is used to transmit the TURN messages (for example, the Allocate request and the Connection request as described in the embodiment of the present invention) and the TURN data packet when the websocket connection is established.

Figures 3, 4:
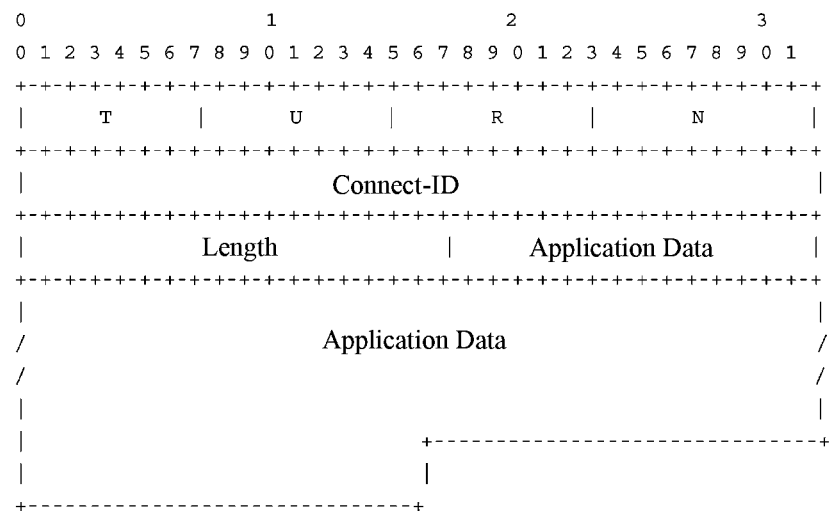

A format of the TURN data packet in Implementation manner 1 is exemplarily shown in FIG. 3-4, where "TURN" of the first four bytes (4 bytes) is used to represent that the data packet is a TURN data packet; the connection identifier connect-ID is recorded in the multiplexing identifier field of the subsequent four bytes (4 bytes); and the Application Data is the specific communication data.

Step 3-307: After receiving the TURN data packet (TURN data), the TURN server sends the communication data (Appdata) in the TURN data packet to the remote node through the TCP connection.

Specifically, the TURN server obtains the configuration information object in which the connection identifier is recorded, determines the TCP connection according to the correspondence between the connection identifier and the TCP connection recorded in the configuration information object, and sends the communication data to the remote node through the TCP connection.

Step 3-308: The TURN server receives communication data (Appdata) sent by the remote node through the TCP connection.

Step 3-309: The TURN server encapsulates the communication data in a TURN data packet (TURN data), and sends the TURN data packet to the communications terminal through the websocket connection, where the TURN data packet further includes the connection identifier.

Specifically, after receiving the communication data through the TCP connection, the TURN server determines the IP address and the port number (that is, the relay address and the resource port) of the local end corresponding to the TCP connection, obtains the configuration information object in which the relay address and the resource port are recorded, obtains the connection identifier recorded in the configuration information object, encapsulates the communication data and the connection identifier in the TURN data packet, and sends the TURN data packet to the communications terminal.

A format of the TURN data packet is the same as the format of the TURN data packet in step 3-306.

In the implementation manner shown in FIG. 3-1, FIG. 3-2, FIG. 3-3, and FIG. 3-4, the multiplexing identifier is the connection identifier allocated for the TCP connection, and as an alternative solution, the multiplexing identifier may also be the resource identifier. Specifically, in steps 3-105, 3-208, and 3-305A2, the correspondence between the resource identifier and the TCP connection is recorded in the configuration information object; in steps 3-108, 3-212, and 3-307, the TURN server obtains the configuration information object in which the resource identifier is recorded, determines the TCP connection according to the correspondence between the connection identifier and the TCP connection recorded in the configuration information object, and sends the communication data to the remote node through the TCP connection; correspondingly, in steps 3-110, 3-214, and 3-309, after receiving communication data sent by the remote node through the TCP connection, the TURN server determines the IP address and the port number (that is, the relay address and the resource port) of the local end corresponding to the TCP connection, obtains the configuration information object in which the relay address and the resource port are recorded, obtains the resource identifier recorded in the configuration information object, encapsulates the communication data and the resource identifier in the TURN data packet, and sends the TURN data packet to the communications terminal.

Figures 1, 4:
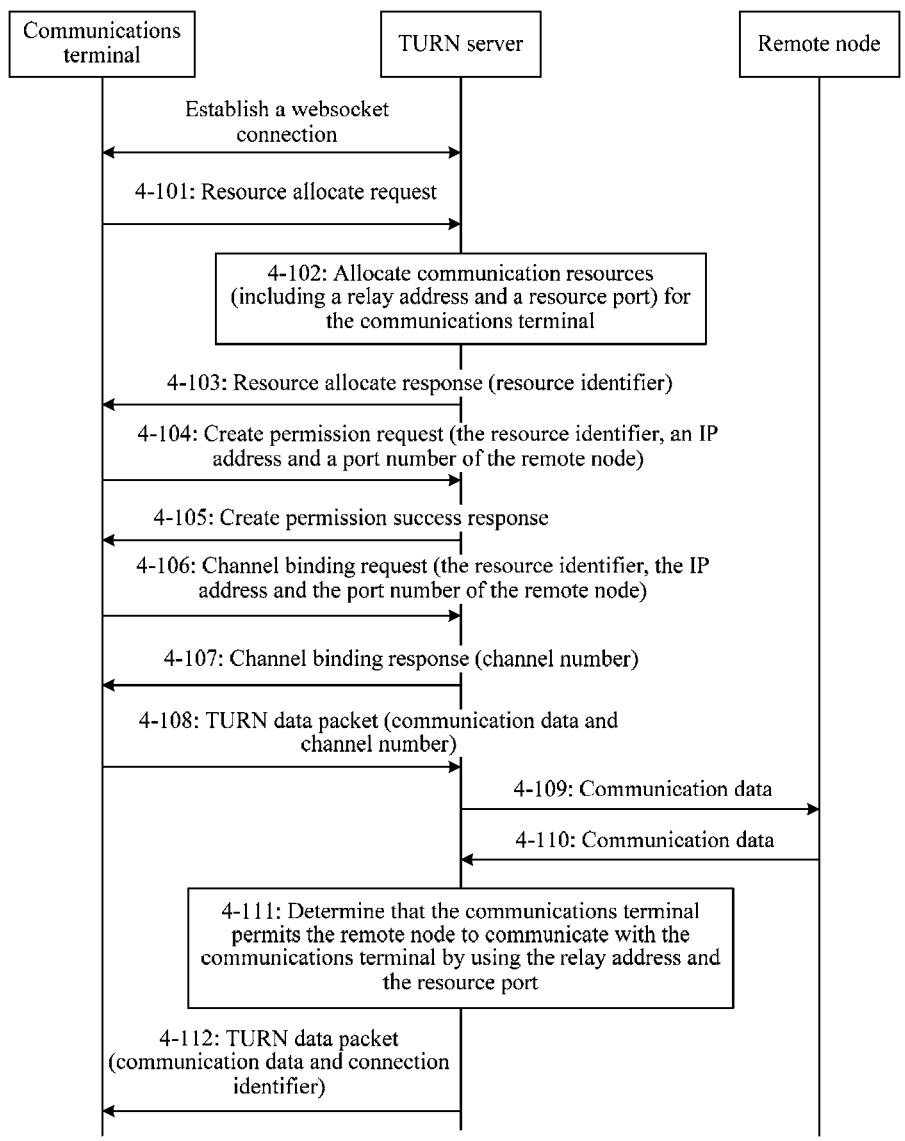
Figures 2, 4:
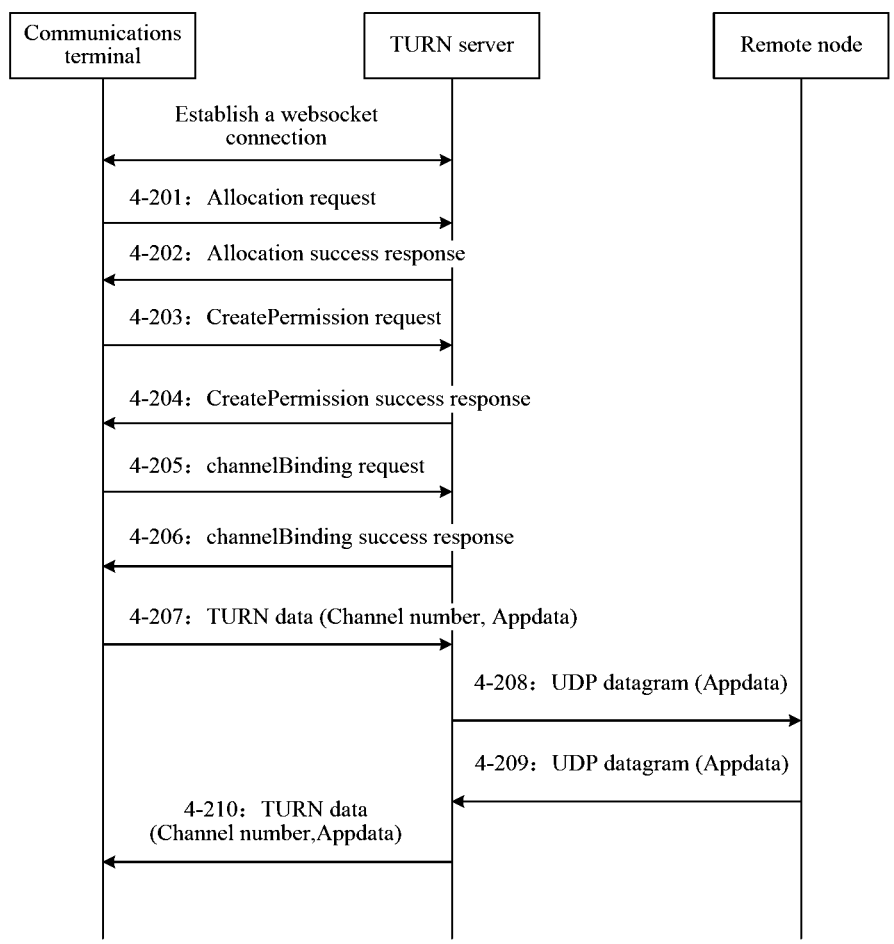
Figures 3, 4:
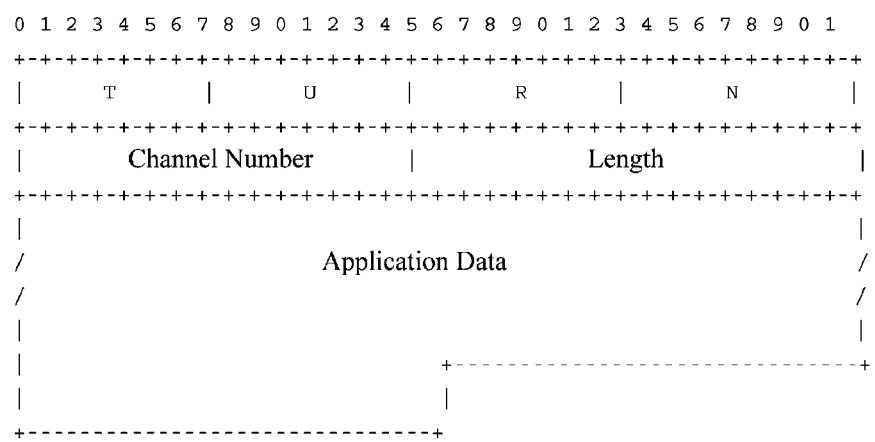
Figure 4:
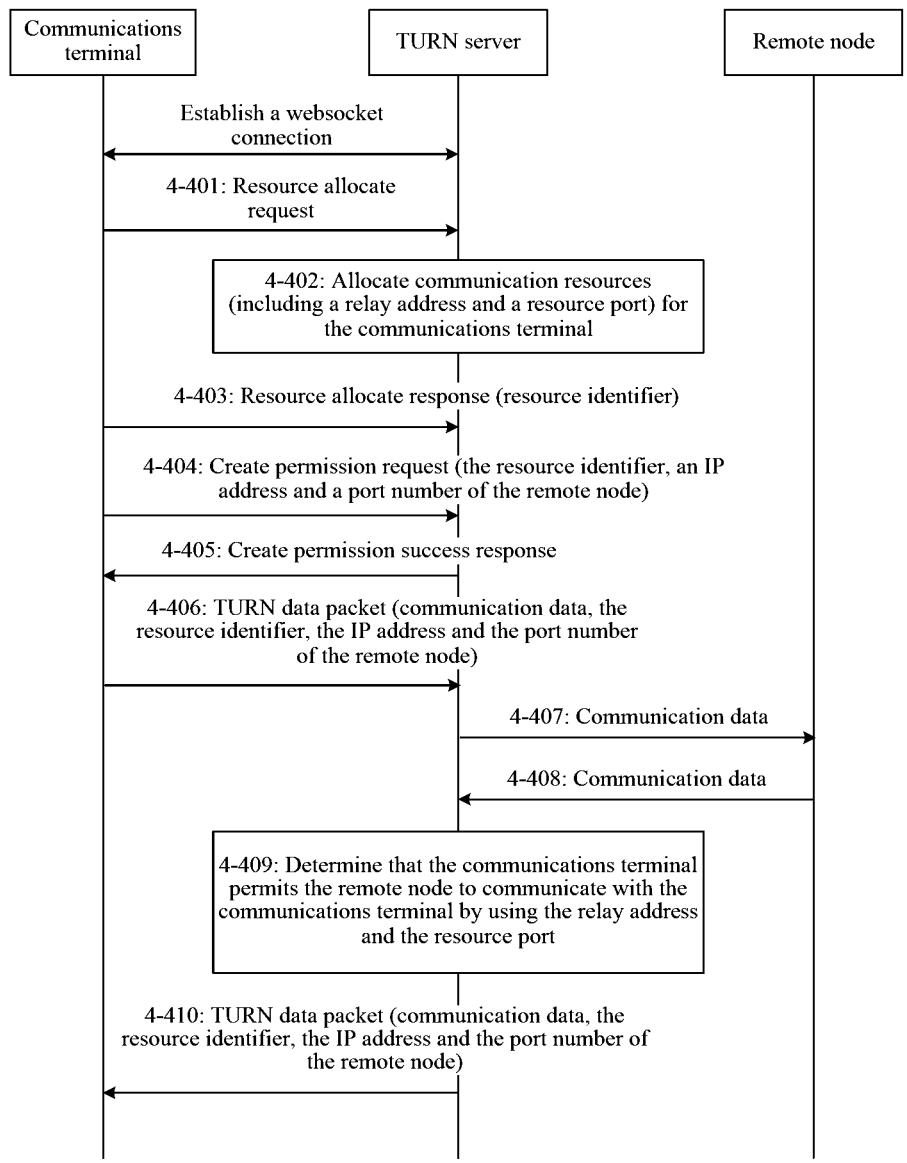
Figures 4, 5:
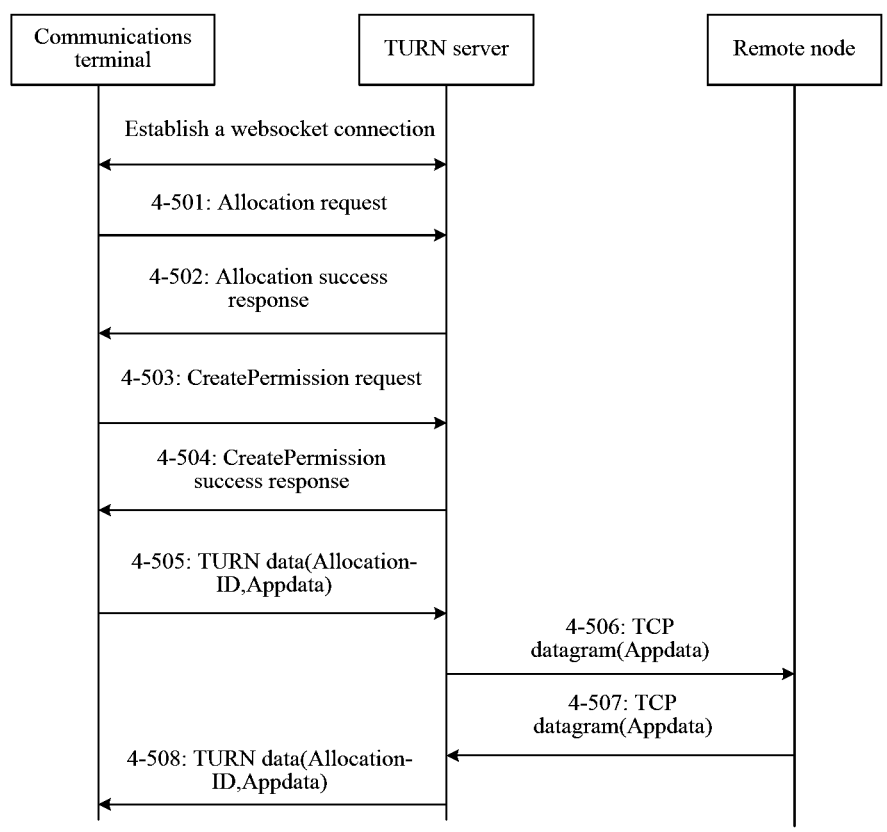
Figures 1, 5:
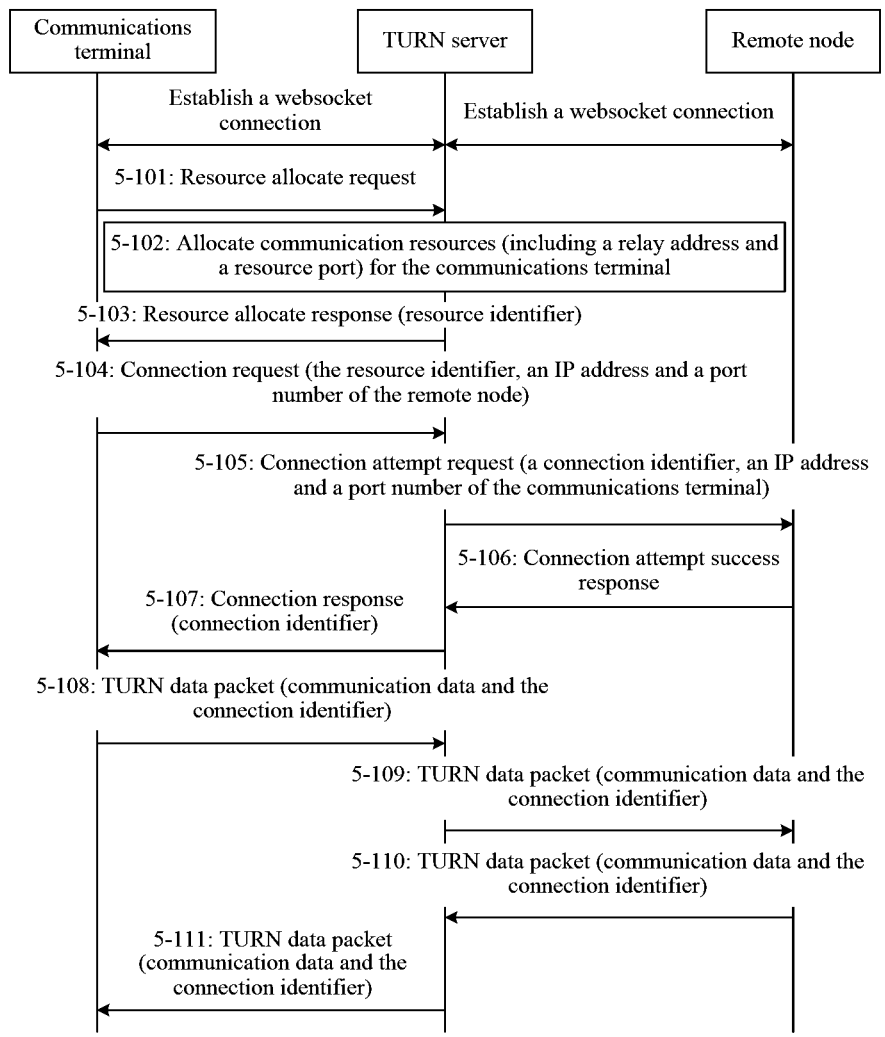
Figures 2, 5:
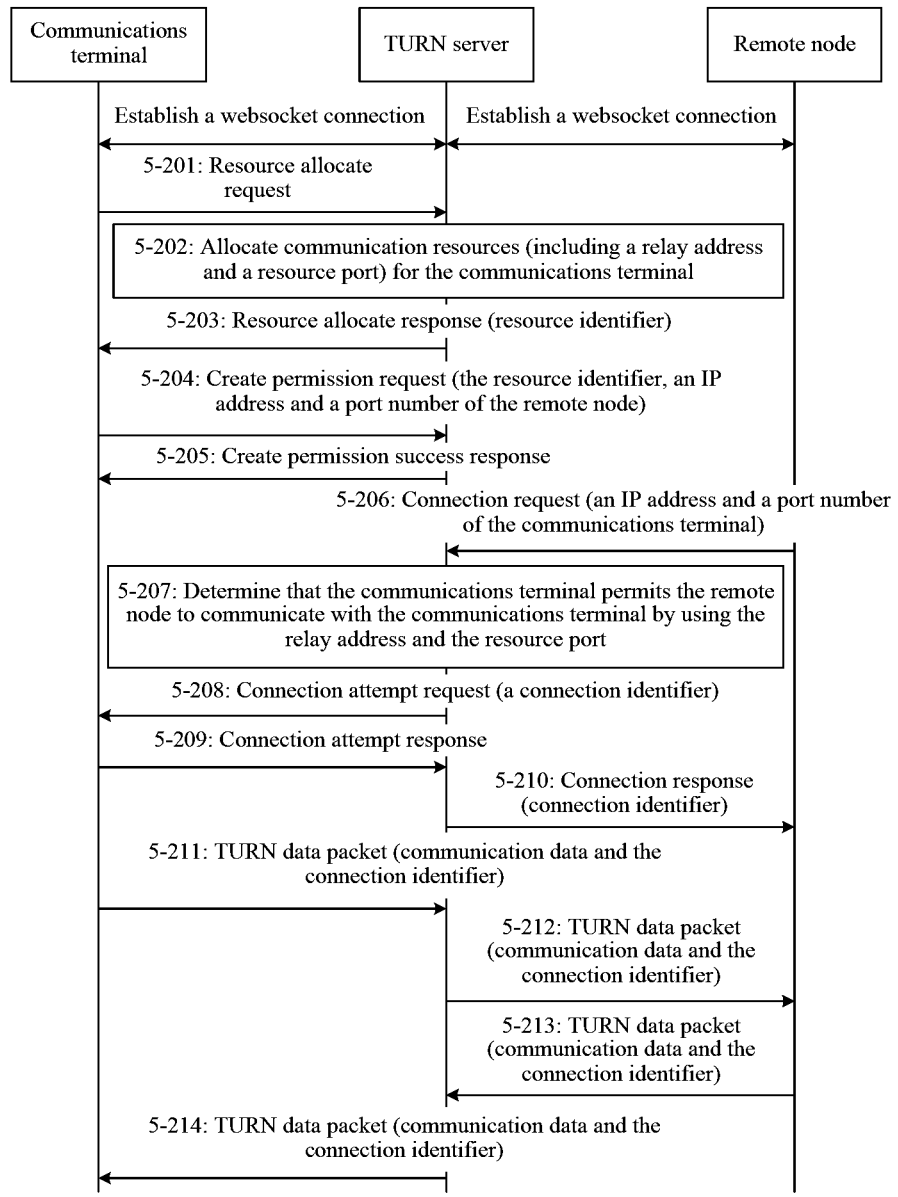
Figures 3, 5:
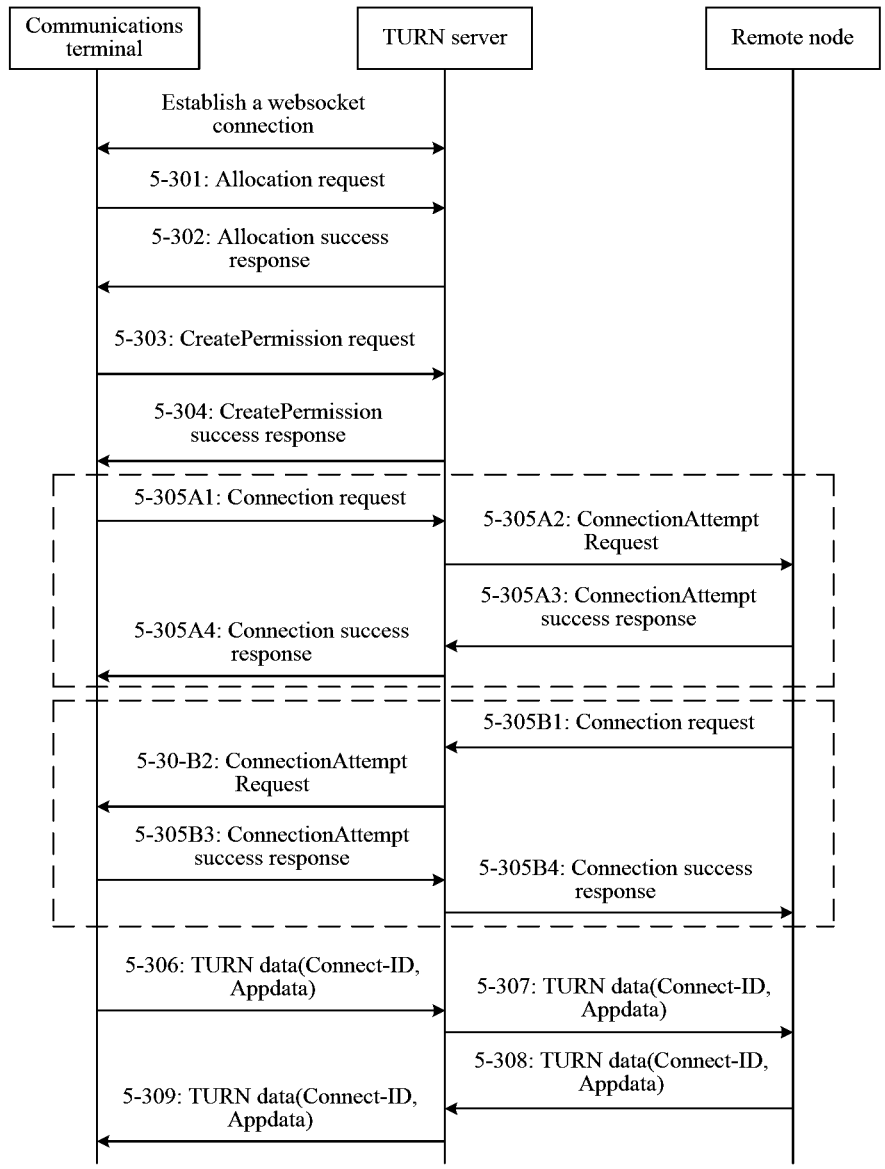

With reference to FIG. 4-1 to FIG. 4-5, the following describes Implementation manner 2 (the communications protocol between the TURN server and the remote node is the UDP) of Embodiment 1 of the present invention in detail.

In Implementation manner 2, the multiplexing identifier included in the TURN data packet in step 230 is specifically used to identify a UDP channel between the relay address and the resource port, and the remote node; step 240 is specifically as follows: the TURN server obtains the relay address and the resource port, and an IP address and a port number of the remote node according to the multiplexing identifier, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

Further, there are the following two optional implementation manners.

With reference to FIG. 4-1 to FIG. 4-3, the following describes a first optional implementation manner of Implementation manner 2 in detail.

As shown in FIG. 4-1:

Steps 4-101 to 4-105: Similar to steps 3-201 to 3-205, and details are not described herein again.

It should be noted that steps 4-104 and 4-105 are optional steps in Implementation manner 2; if availability of the remote node does not need to be verified, for example, a scene that the remote node sends the UDP data packet including the communication data to the relay address and the resource port does not exist, steps 4-104 and 4-105 are not required.

Step 4-106: The communications terminal sends a channel binding request to the TURN server through the websocket connection, where the channel binding request includes the resource identifier, and the IP address and the port number of the remote node.

It should be noted that the remote node in step 4-106 may be one of the at least one remote node in step 4-104, and may also be different from the remote node in step 4-104.

Step 4-107: The TURN server obtains the configuration information object in which the resource identifier is recorded; records a channel number allocated for the UDP channel and UDP channel information in the configuration information object, where the UDP channel information includes the IP address and the port number of the remote node; and sends the channel number to the communications terminal, and specifically, the channel number may be carried in a response message of the channel binding request returned to the communications terminal.

Step 4-108: The communications terminal sends the TURN data packet to the TURN server through the websocket connection, where the TURN data packet includes the communication data and the channel number.

Step 4-109: The TURN server obtains the configuration information object in which the channel number is recorded, obtains the relay address and the resource port, and the IP address and the port number of the remote node in the UDP channel information recorded in the configuration information object, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

Step 4-110: The TURN server receives a UDP data packet encapsulated with communication data and sent by the remote node, where the destination IP address and the destination port number of the UDP data packet are the relay address and the resource port, and the source IP address and the source port number of the UDP data packet are the IP address and the port number of the remote node.

Step 4-111: The TURN server obtains the configuration information object in which the relay address and the resource port are recorded, determines whether the permission information in the configuration information object includes the IP address and the port number of the remote node, and if the permission information includes the IP address and the port number of the remote node, executes the subsequent steps to send the communication data to the communications terminal; otherwise, the TURN server does not send the communication data to the communications terminal.

Step 4-112: The TURN server encapsulates the communication data in the TURN data packet, and sends the TURN data packet to the communications terminal through the websocket connection, where the TURN data packet further includes the multiplexing identifier, and the multiplexing identifier is specifically the channel number. Specifically, the channel number included in the TURN data packet is obtained from the configuration information object.

Preferably, after receiving the channel number in step 4-107, the communications terminal may record correspondence between the channel number and the remote node (which may be specifically recording correspondence between the channel number and the IP address and the port number of the remote node), and after receiving the TURN data packet in step 4-112, determines the remote node corresponding to the channel number in the TURN data packet according to the recorded correspondence between the channel number and the remote node, so as to identify that the communication data in the TURN data packet is from the remote node. In addition, before sending the TURN data packet including the channel number to the TURN server in step 4-108, the communications terminal may also obtain the channel number corresponding to the remote node according to the correspondence, and add the channel number in the TURN data packet.

It should be noted that in step 4-107B and step 4-109, it is implemented that the communications terminal sends the communication data to the remote node, and in step 4-111 to step 4-112, it is implemented that the remote node sends the communication data to the communications terminal, which do not have a specific order.

In the first optional implementation manner of Implementation manner 2, the multiplexing identifier is the channel number, and as an alternative implementation solution, the multiplexing identifier may also be the resource identifier. Specifically, after the channel binding request is received in step 4-107, the configuration information object in which the resource identifier is recorded is obtained; the UDP channel information is recorded in the configuration information object, where the UDP channel information includes the IP address and the port number of the remote node; in step 4-108, the multiplexing identifier included in the TURN data packet may be specifically the resource identifier; correspondingly, in step 4-109, the TURN server obtains the configuration information object in which the resource identifier is recorded, and obtains the recorded relay address and the recorded resource port, and the IP address and the port number of the remote node in the UDP channel information from the configuration information object.

With reference to FIG. 4-2, the following further describes the first optional implementation manner of Implementation manner 2 in detail.

Step 4-201: The communications terminal sends the resource allocate request Allocate request to the TURN server through the websocket connection.

The Allocate request includes the resource protocol type, which may be specifically the UDP in Implementation manner 2. Corresponding fields included in the Allocate request are exemplarily as follows:
REQUESTED-TRANSPORT=UDP
SUB-PROTOCOL=NULL After receiving the Allocate request, the TURN server allocates the relay address and the resource port for the communications terminal, where the relay address and the resource port are the IP address and the port of the TURN server.

After receiving the resource allocate request, the TURN server creates the configuration information object, and the information recorded in the configuration information object is similar to the information recorded in step 3-301 except that the value of the remote node connection Peer Connection is UDP in Implementation manner 2.

Step 4-202 to step 4-204: Similar to steps 3-302 to 3-304, and details are not described herein again.

It should be noted that steps 4-203 and 4-204 are optional steps in Implementation manner 2; if availability of the remote node does not need to be verified, for example, a scene that the remote node sends the TCP connection request to the relay address and the resource port does not exist, steps 4-203 and 4-204 are not required.

Step 4-205: The communications terminal sends a channel binding request channelBinding request to the TURN server through the websocket connection, where the channelBinding request includes the resource identifier, and the IP address and the port number of the remote node. Corresponding fields included in the channelBinding request are exemplarily as follows:

Allocation-ID=0x0001
XOR-PEER-ADDRESS=221.18.2.1:1260

The value of Allocation-ID is the resource identifier (0x0001), and the value of the XOR-PEER-ADDRESS is the IP address (221.18.2.1) and the port number (1260) of the remote node.

Step 4-206: After receiving the channelBinding request, the TURN server obtains the configuration information object in which the resource identifier is recorded; records a channel number allocated for the UDP channel and UDP channel information in the configuration information object, where the UDP channel information includes the IP address and the port number of the remote node; and returns a channel binding response channelBinding success response to the communications terminal, where the channelBinding success response includes the channel number.

Step 4-207: The communications terminal sends the TURN data packet (TURN data) to the TURN server through the websocket connection, where the TURN data packet includes the communication data (Appdata) and the channel number (Channel number).

Specifically, a header field of the TURN data packet includes a multiplexing identifier field, so as to support TURN data multiplexing on a single websocket connection, that is, to support transmitting communication data used to communicate with different remote nodes on the same websocket connection.

In addition, information used to indicate that the TURN data packet is encapsulated in the websocket data packet may also be carried in the header field of the websocket data packet encapsulated with the TURN data packet, or the header field of the TURN data packet; and it may also be designated in the message used to establish the websocket connection that the websocket connection is used to transmit the TURN messages (for example, the Allocate request and the Connection request as described in the embodiment of the present invention) and the TURN data packet when the websocket connection is established.

A format of the TURN data packet in the first optional implementation manner of Implementation manner 2 is exemplarily shown in FIG. 4-3, where "TURN" of the first four bytes (4 bytes) is used to represent that the data packet is a TURN data packet; the channel number channel number is recorded in the multiplexing identifier field of the subsequent two bytes (2 bytes).

Step 4-208: The TURN server obtains the configuration information object in which the channel number is recorded, obtains the relay address and the resource port, and the IP address and the port number of the remote node in the UDP channel information recorded in the configuration information object, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

Step 4-209: The TURN server receives a UDP data packet encapsulated with communication data (Appdata) and sent by the remote node, where the destination IP address and the destination port number of the UDP data packet are the relay address and the resource port, and the source IP address and the source port number of the UDP data packet are the IP address and the port number of the remote node.

Step 4-210: The TURN server obtains the configuration information object in which the relay address and the resource port are recorded, determines whether the permission information in the configuration information object includes the IP address and the port number of the remote node, and if the permission information includes the IP address and the port number of the remote node, encapsulates the communication data (Appdata) in the TURN data packet (TURN data), and sends the TURN data packet to the communications terminal through the websocket connection, where the TURN data packet further includes the channel number (Channel number).

Specifically, the TURN server queries the configuration information object in which the relay address and the resource port are recorded to determine whether the IP address and the port number of the remote node are recorded in the list of permissions a list of permissions field in the configuration information object, and if the IP address and the port number of the remote node are recorded in the field, encapsulates the communication data in the TURN data packet, and sends the TURN data packet to the communications terminal; otherwise, the TURN server does not send the communication data to the communications terminal.

A format of the TURN data packet is the same as the format of the TURN data packet in step 4-207.

With reference to FIG. 4-4 and FIG. 4-5, the following describes a second optional implementation manner of Implementation manner 2 in detail.

As shown in FIG. 4-4:

Steps 4-401 to 4-405: Similar to steps 4-101 to 4-105, and details are not described herein again.

It should be noted that steps 4-404 and 4-405 are optional steps in Implementation manner 2; if availability of the remote node does not need to be verified, for example, a scene that the remote node sends the UDP data packet to the relay address and the resource port does not exist, steps 4-404 and 4-405 are not required.

Step 4-406: The communications terminal sends the TURN data packet to the TURN server through the websocket connection, where the TURN data packet includes the communication data and the multiplexing identifier.

The multiplexing identifier specifically includes the resource identifier, and the IP address and the port number of the remote node.

It should be noted that the remote node in step 4-406 may be one of the at least one remote node in step 4-404, and may also be different from the remote node in step 4-404.

Step 4-407: The TURN server obtains the configuration information object in which the resource identifier is recorded, obtains the relay address and the resource port recorded in the configuration information object, obtains the IP address and the port number of the remote node in the TURN data packet, encapsulates the communication data in a UDP data packet, and sends the UDP data packet to the remote node.

A source IP address and a source port number of the UDP data packet are the relay address and the resource port, and a destination IP address and a destination port number of the UDP data packet are the IP address and the port number of the remote node. The UDP data packet may further include the IP address and the port number of the communications terminal.

Steps 4-408 and 4-409: Similar to steps 4-110 to 4-111, and details are not described herein again.

Step 4-410: The TURN server encapsulates the communication data in the TURN data packet, and sends the TURN data packet to the communications terminal through the websocket connection, where the TURN data packet further includes the multiplexing identifier, the multiplexing identifier specifically includes the resource identifier, and the IP address and the port number of the remote node. Specifically, the resource identifier included in the TURN data packet is obtained from the configuration information object; and the P address and the port number of the remote node included in the TURN data packet is obtain from the UDP data packet.

It should be noted that in steps 4-406 and 4-407, it is implemented that the communications terminal sends the communication data to the remote node, and in steps 4-408 to 4-410, it is implemented that the remote node sends the communication data to the communications terminal, which do not have a specific order.

As an alternative solution of the second optional implementation manner of Implementation manner 2, the multiplexing identifier in step 4-406 may include the relay address and the resource port, and the IP address and the port number of the remote node, in step 4-407, the relay address and the resource port in the TURN data packet, and the IP address and the port number of the remote node are obtained, the communication data is encapsulated in the UDP data packet, and the UDP data packet is sent to the remote node; the source IP address and the source port number of the UDP data packet are the relay address and the resource port, and the destination IP address and the destination port number of the UDP data packet are the IP address and the port number of the remote node.

With reference to FIG. 4 to FIG. 5, the following further describes the second optional implementation manner of Implementation manner 2 in detail.

Steps 4-501 to 4-504: Similar to steps 4-201 to 4-204, and details are not described herein again.

Step 4-505: The communications terminal sends the TURN data packet (TURN data) to the TURN server through the websocket connection, where the TURN data packet includes the communication data (Appdata) and the multiplexing identifier.

The multiplexing identifier specifically includes the resource identifier, and the IP address and the port number of the remote node.

The TURN data packet may be specifically a SEND message of the TURN protocol.

Step 4-506: The TURN server obtains the configuration information object in which the resource identifier is recorded, obtains the relay address and the resource port recorded in the configuration information object, obtains the IP address and the port number of the remote node in the TURN data packet, encapsulates the communication data (Appdata) in the UDP data packet (UDP datagram), and sends the UDP data packet to the remote node.

The source IP address and the source port number of the UDP data packet are the relay address and the resource port, and the destination IP address and the destination port number of the UDP data packet are the IP address and the port number of the remote node. The UDP data packet may further include the IP address and the port number of the communications terminal.

Step 4-507: Similar to step 4-209, and details are not described herein again.

Step 4-508: The TURN server obtains the resource identifier in the configuration information object, encapsulates the communication data in the TURN data packet, and sends the TURN data packet to the communications terminal through the websocket connection, where the TURN data packet further includes the resource identifier, and the IP address and the port number of the remote node.

The TURN data packet may be specifically a DATA message of the TURN protocol.

With reference to FIG. 5-1 to FIG. 5-4, the following describes Implementation manner 3 (the communications protocol between the TURN server and the remote node is the websocket) of Embodiment 1 of the present invention in detail.

It should be noted that Implementation manner 3 is applicable to the following scene: the remote node is also located in the local area network, and the firewall only opening the HTTP port and only allowing the data packet with the HTTP format to pass through is deployed between the local area network and the public network.

In Implementation manner 3, the TURN server establishes a websocket connection with the remote node by using the relay address and the resource port, and the TURN server and the remote node interact with each other through the websocket connection. In subsequent description of Implementation manner 3, the websocket connection established between the TURN server and the communications terminal is called a first websocket connection, and the websocket connection established between the TURN server and the remote node is called a second websocket connection.

In Implementation manner 3, before step 230, the method further includes: generating a connection identifier, recording correspondence between the connection identifier and the first websocket connection, and correspondence between the connection identifier and the second websocket connection, so as to establish a virtual connection between the communications terminal and the remote node, and sending the connection identifier to the communications terminal and the remote node respectively; the multiplexing identifier included in the TURN data packet in step 230 is specifically the connection identifier; and correspondingly, in step 240, the TURN server sends the TURN data packet to the remote node through the second websocket connection corresponding to the connection identifier.

It should be noted that the TURN server records the correspondence between the connection identifier and the first websocket connection, and the correspondence between the connection identifier and the second websocket connection, that is, the virtual connection between the communications terminal and the remote node is established. The connection identifier may be used to identify the virtual connection.

After establishing the virtual connection, the communications terminal may further receive communication data sent by the remote node through the TURN server, specifically, the TURN server receives a TURN data packet sent by the remote node through the second websocket connection, where the TURN data packet includes the communication data and the connection identifier received from the TURN server; and sends the TURN data packet to the communications terminal through the first websocket connection.

Further, Implementation manner 3 has the following two optional implementation manners in a first optional implementation manner, the TURN server establishes the virtual connection between the communications terminal and the remote node according to the connection request of the communications terminal; and in a second optional implementation manner, the TURN server establishes the virtual connection between the communications terminal and the remote node according to the connection request of the remote node.

With reference to FIG. 5-1, the following describes the first optional implementation manner of Implementation manner 3.

Steps 5-101 to 5-103: Similar to steps 3-101 to 3-103, and details are not described herein again.

Step 5-104: The communications terminal sends the connection request to the TURN server through the first websocket connection, where the connection request includes the resource identifier, and the IP address and the port number of the remote node.

After receiving the connection request, the TURN server obtains the configuration information object in which the resource identifier is recorded, determines the second websocket connection according to the relay address and the resource port recorded in the configuration information object, and the IP address and the port number of the remote node in the connection request; generates the connection identifier, and records the correspondence between the connection identifier and the first websocket connection, and the correspondence between the connection identifier and the second websocket connection in the configuration information object.

Step 5-105: The TURN server sends the connection identifier, and the IP address and the port number of the communications terminal to the remote node through the second websocket connection.

Specifically, the connection identifier, and the IP address and the port number of the communications terminal may be carried in the connection attempt request sent to the remote node.

Step 5-106: The remote node may record the correspondence between the connection identifier and the communications terminal (which may be specifically recording correspondence between the connection identifier and the IP address and the port number of the communications terminal), and returns the success response to the TURN server through the second websocket connection.

Step 5-107: After receiving the success response of the connection attempt request, the TURN server sends the connection identifier to the communications terminal through the first websocket connection.

Specifically, the connection identifier is carried in the response message of the connection request returned to the communications terminal.

The communications terminal may record the correspondence between the connection identifier and the remote node (which may be specifically recording correspondence between the connection identifier and the IP address and the port number of the remote node).

Step 5-108: The communications terminal sends the TURN data packet to the TURN server through the first websocket connection, where the TURN data packet includes the communication data and the connection identifier.

Specifically, the communications terminal obtains the connection identifier corresponding to the remote node according to the recorded correspondence between the connection identifier and the remote node, and adds the connection identifier in the TURN data packet.

Step 5-109: The TURN server sends the TURN data packet to the remote node through the second websocket connection corresponding to the connection identifier.

Specifically, the TURN server obtains the configuration information object in which the connection identifier is recorded, determines the second websocket connection according to the correspondence between the connection identifier and the second websocket connection recorded in the configuration information object, and sends the TURN data packet to the remote node through the second websocket connection.

After receiving the TURN data packet, the remote node identifies that the communication data is from the communications terminal according to the recorded correspondence between the connection identifier and the communications terminal.

Step 5-110: The remote node sends the TURN data packet to the TURN server through the second websocket connection, where the TURN data packet includes the communication data and the connection identifier.

Specifically, the remote node obtains the connection identifier corresponding to the communications terminal according to the recorded correspondence between the connection identifier and the communications terminal, and adds the connection identifier in the TURN data packet.

Step 5-111: The TURN server sends the TURN data packet received from the remote node to the communications terminal through the first websocket connection.

Specifically, the TURN server obtains the configuration information object in which the connection identifier is recorded, determines the first websocket connection according to the correspondence between the connection identifier and the first websocket connection recorded in the configuration information object, and sends the TURN data packet to the communications terminal through the first websocket connection.

After receiving the TURN data packet, the communications terminal determines the remote node corresponding to the connection identifier in the TURN data packet according to the recorded correspondence between the connection identifier and the remote node, so as to identify that the communication data in the TURN data packet is from the remote node.

It should be noted that in steps 5-108 and 5-109, it is implemented that the communications terminal sends the communication data to the remote node, and in steps 5-110 and 5-111, it is implemented that the remote node sends the communication data to the communications terminal, which do not have a specific order.

With reference to FIG. 5-2, the following describes the second optional implementation manner of Implementation manner 3.

Step 5-201: Similar to step 3-201, and details are not described herein again.

Step 5-202: After receiving the resource allocate request, the TURN server allocates the relay address and the resource port for the communications terminal, where the relay address and the resource port are the IP address and the port of the TURN server.

After receiving the resource allocate request, the TURN server creates the configuration information object, and records the resource identifier allocated for the configuration information object, the IP address and the port number of the communications terminal, the relay address, and the resource port in the configuration information object.

The configuration information object may be stored in the form of a file, a database form, or the like, and may also be directly stored in a memory.

Steps 5-203 to 5-205: Similar to steps 3-203 to 3-205, and details are not described herein again.

Step 5-206: The TURN server receives the connection request sent by the remote node through the second websocket connection, where the connection request includes the IP address and the port number of the communications terminal.

Step 5-207: The TURN server obtains the configuration information object in which the IP address and the port number of the communications terminal are recorded, determines whether the permission information in the configuration information object includes the IP address and the port number of the remote node, and if the permission information includes the IP address and the port number of the remote node, determines that the communications terminal permits the remote node to communicate with the communications terminal by using the relay address and the resource port, generates the connection identifier, and records the correspondence between the connection identifier and the first websocket connection, and the correspondence between the connection identifier and the second websocket connection in the configuration information object.

Step 5-208: The TURN server sends the connection identifier, and the P address and the port number of the remote node to the communications terminal through the first websocket connection.

Specifically, the connection identifier, and the P address and the port number of the remote node may be carried in a connection attempt request sent to the communications terminal.

The communications terminal may record the correspondence between the connection identifier and the remote node (which may be specifically recording the correspondence between the connection identifier and the IP address and the port number of the remote node).

Step 5-209: The communications terminal returns a success response of the connection attempt request to the TURN server through the first websocket connection.

Step 5-210: The TURN server sends the connection identifier to the remote node through the second websocket connection.

Specifically, the connection identifier may be carried in the response message of the connection request returned to the remote node.

After receiving the connection identifier, the remote node may record the correspondence between the connection identifier and the communications terminal (which may be specifically recording the correspondence between the connection identifier and the IP address and the port number of the communications terminal).

Steps 5-211 to 5-214: Similar to steps 5-108 to 5-111, and details are not described herein again.

With reference to FIG. 5-3, the following further describes the two optional implementation manners of Implementation manner 3 in detail.

Step 5-301: The communications terminal sends the resource allocate request Allocate request to the TURN server through the first websocket connection.

The Allocate request includes the resource protocol type, and the resource protocol type is the websocket in Implementation manner 3. Corresponding fields included in the Allocate request are exemplarily as follows:

REQUESTED-TRANSPORT=TCP
SUB-PROTOCOL=websocket

After receiving the Allocate request, the TURN server allocates the relay address and the resource port for the communications terminal, where the relay address and the resource port are the IP address and the port of the TURN server.

After receiving the resource allocate request, the TURN server creates the configuration information object, the information recorded in the configuration information object is similar to the information recorded in step 3-301 except that the value of the remote node connection Peer Connection is websocket in Implementation manner 3.

Steps 5-302 to 5-304: Similar to steps 3-302 to 3-304, and details are not described herein again.

It should be noted that steps 5-303 and 5-304 are optional steps in Implementation manner 3; if availability of the remote node does not need to be verified, for example, a scene that the remote node sends the connection request to the TURN server through the second websocket connection does not exist, steps 3-503 and 5-304 are not required.

Subsequent steps 5-305A1 to 5-305A4 are an exemplary implementation manner that the virtual connection between the communications terminal and the remote node is established according to the connection request of the communications terminal.

Step 5-305A1: Similar to step 3-305A1, and details are not described herein again.

It should be noted that the remote node in step 5-305A1 may be one of the at least one remote node in step 5-303, and may also be different from the remote node in step 5-303.

Step 5-305A2: After receiving the connection request, the TURN server obtains the configuration information object in which the resource identifier is recorded, determines the second websocket connection according to the relay address and the resource port recorded in the configuration information object, and the IP address and the port number of the remote node in the connection request; generates the connection identifier, and records the correspondence between the connection identifier and the first websocket connection, and the correspondence between the connection identifier and the second websocket connection in the configuration information object. Further, the TURN server sends a connection attempt request ConnectionAttempt request to the remote node through the second websocket connection, where the ConnectionAttempt request includes the connection identifier, and the IP address and the port number of the communications terminal.

Corresponding fields included in the ConnectionAttempt request are exemplarily as follows:

Connect-ID=0x00A1
XOR-MAPPED-ADDRESS=223.5.2.8:1340

The value of the Connect-ID is the connection identifier (0x00A1), and the value of the XOR-MAPPED-ADDRESS is the IP address (223.5.2.8) and the port number (1340) of the communications terminal.

Step 5-305A3: After receiving the connection attempt request ConnectionAttempt request, the remote node records the correspondence between the connection identifier and the IP address and the port number of the communications terminal, and sends a connection attempt success response ConnectionAttempt success response to the TURN server through the second websocket connection.

Step 5-305A4: After receiving the ConnectionAttempt success response, the TURN server returns a connection success response Connection success to the communications terminal through the first websocket connection, where the Connection success response includes the connection identifier.

Subsequent steps 5-305B1 to 5-305B4 are an exemplary implementation manner that the virtual connection between the communications terminal and the remote node is established according to the connection request of the remote node.

Step 5-305B1: The remote node sends the connection request Connection request to the TURN server through the second websocket connection, where the connection request includes the IP address and the port number of the communications terminal.

After receiving the Connection request, the TURN server obtains the configuration information object in which the IP address and the port number of the communications terminal are recorded, determines whether the permission information in the configuration information object includes the IP address and the port number of the remote node, specifically, the TURN server queries the configuration information object corresponding to the IP address and the port number of the communications terminal to determine whether the IP address and the port number of the remote node are recorded in a list of permissions a list of permissions field in the configuration information object, and if the IP address and the port number are recorded in the field, executes the subsequent steps; otherwise, the TURN server rejects the connection request.

Step 5-305B2: The TURN server generates the connection identifier, records the correspondence between the connection identifier and the first websocket connection, and the correspondence between the connection identifier and the second websocket connection in the configuration information object, and send the connection attempt request ConnectionAttempt request to the communications terminal through the first websocket connection, where the ConnectionAttempt request includes the connection identifier, and the IP address and the port number of the remote node.

Corresponding fields included in the Connection Attempt request are exemplarily as follows:

Connect-ID=0x00A1
XOR-PEER-ADDRESS=221.18.2.1:1260

The value of the Connect-ID is the connection identifier (0x00A1), and the value of the XOR-PEER-ADDRESS is the IP address (221.18.2.1) and the port number (1260) of the remote node.

Step 5-305B3: The communications terminal returns the connection attempt success response Connection Attempt success response to the TURN server through the first websocket connection.

After receiving the ConnectionAttempt request, the communications terminal records the correspondence between the connection identifier and the IP address and the port number of the remote node.

Step 5-305B4: The TURN server sends the connection identifier to the remote node.

Specifically, the connection identifier may be carried in the response message connection success response of the connection request returned to the remote node.

After receiving the connection identifier, the remote node records the correspondence between the connection identifier and the IP address and the port number of the communications terminal.

It should be noted that the TURN server may record the correspondence between the connection identifier and the first websocket connection and the correspondence between the connection identifier and the second websocket connection before step 5-305B3, and if receiving a failure response in step 5-305B3, the TURN server may delete the recorded correspondence from the configuration information object; the TURN server may also record the correspondence between the connection identifier and the first websocket connection and the correspondence between the connection identifier and the second websocket connection after receiving the success response in step 5-305B3.

Step 5-306: The communications terminal sends the TURN data packet (TURN data) to TURN server through the first websocket connection, where the TURN data packet includes the communication data (Appdata) and the connection identifier (Connect-ID).

Specifically, a header field of the TURN data packet includes a multiplexing identifier field, so as to support TURN data multiplexing on a single websocket connection, that is, to support transmitting communication data used to communicate with different remote nodes on the same websocket connection.

In addition, information used to indicate that the TURN data packet is encapsulated in the websocket data packet may also be carried in the header field of the websocket data packet encapsulated with the TURN data packet, or the header field of the TURN data packet; and it may also be designated in the message used to establish the first websocket connection that the first websocket connection is used to transmit the TURN messages (for example, the Allocate request and the Connection request as described in the embodiment of the present invention) and the TURN data packet when the first websocket connection is established.

A format of the TURN data packet in Implementation manner 3 is similar to the format of the TURN data packet in Implementation manner 1, and the format is exemplarily shown in FIG. 3-4.

Steps 5-307 to 5-309: Similar to steps 5-109 to 5-111, and details are not described herein again.

A format of the TURN data packet in steps 5-307 to 5-309 is the same as the format of the TURN data packet in step 5-306.

It should be noted that for the scene that the remote node is also located in the local area network, and the firewall only opening the HTTP port and only allowing the data packet with the HTTP format to pass through is deployed between the local area network and the public network, the remote node in the local area network cannot implement communication with the different communications terminals by sending the signaling and the communication data used to implement communication with the different communications terminals to the different ports of the TURN server due to the limitation of the firewall on the port.

According to Implementation manner 3 of Embodiment 1 of the present invention, the TURN data packet that includes the communication data and is sent by the remote node to the TURN server further carries the connection identifier used to identify the virtual connection between the communications terminal and the remote node, so that the TURN server may differentiate the TURN data used to communicate with the different communications terminals and sent by the remote node through the second websocket connection, so as to relay the TURN data received from the remote node to the corresponding communications terminals. Therefore, the remote node may send the communication data used to communicate with multiple communications terminals through the second websocket connection, so as to solve the problem that communication between the remote node in the local area network and the multiple communications terminal located in the local area network cannot be implemented due to the limitation of the firewall on the port.

According to Embodiment 1 of the present invention, Embodiment 2 of the present invention provides a TURN server 500, where the TURN server 500 is located in a public network, and a message exchanged between the TURN server 500 and a communications terminal in a local area network is transmitted through a pre-established first websocket connection.

Figures 1, 6:
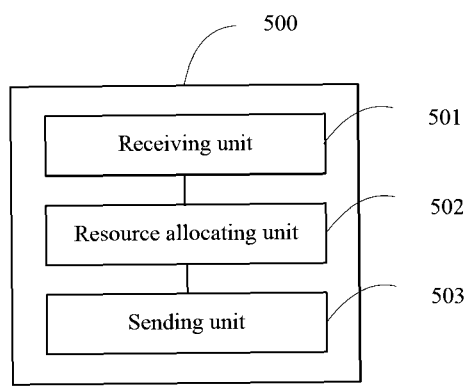
Figures 2, 6:
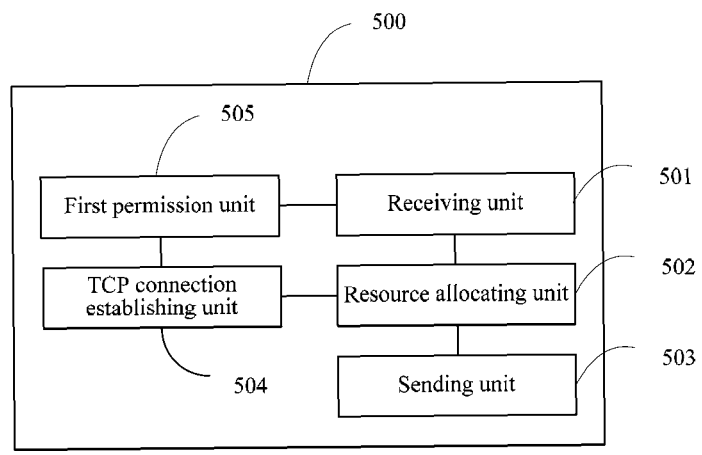
Figures 3, 6:
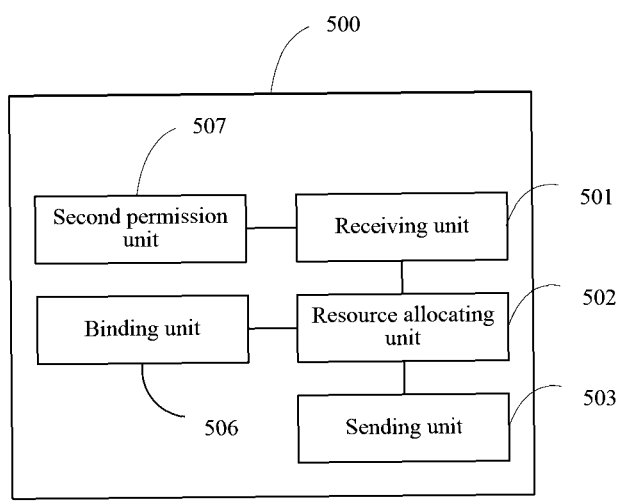
Figures 4, 6:
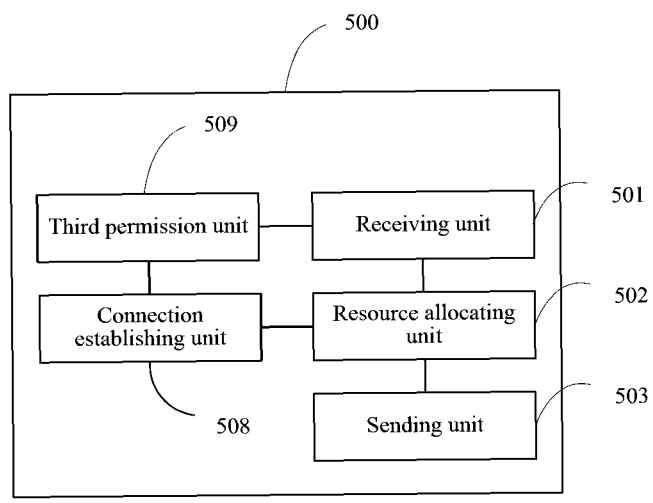

As shown in FIG. 6-1, the TURN server 50 includes: a receiving unit 501, a resource allocating unit 502, and a sending unit 503;

the receiving unit 501 is configured to receive a resource allocate request sent by the communications terminal, and transmit the resource allocate request to the resource allocating unit 502;

the resource allocating unit 502 is configured to receive the resource allocate request from the receiving unit 501, and allocate a relay address and a resource port for the communications terminal, where the relay address and the resource port are an IP address and a port of the TURN server;

the receiving unit 501 is further configured to receive a TURN data packet sent by the communications terminal, and transmit the TURN data packet to the sending unit 503, where the TURN data packet includes communication data and a multiplexing identifier, the multiplexing identifier is used to identify a communications channel between the relay address and the resource port, and a remote node corresponding to the communication data; and the sending unit 503 is configured to receive the TURN data packet from the receiving unit 501, and send the communication data to the remote node through the communications channel identified by the multiplexing identifier.

The resource allocate request includes a resource protocol type, where the resource protocol type designates that a communications protocol between the TURN server and the remote node may be specifically a TCP, a UDP, or a websocket.

The following describes 3 implementation manners of Embodiment 2 of the present invention respectively. In Implementation manner 1 of Embodiment 2, the communications protocol between the TURN server and the remote node is the TCP; in Implementation manner 2 of Embodiment 2, the communications protocol between the TURN server and the remote node is the UDP; and in Implementation manner 3 of Embodiment 2, the communications protocol between the TURN server and the remote node is the websocket.

As shown in FIG. 6-2, in Implementation manner 1 of Embodiment 2 of the present invention, the resource protocol type included in the resource allocate request received by the receiving unit 501 designates that the communications protocol between the TURN server and the remote node is specifically the TCP; and the TURN server further includes a TCP connection establishing unit 504;

the resource allocate request received by the receiving unit 501 includes a resource protocol type, where the resource protocol type designates that the communications protocol between the TURN server and the remote node is the TCP;

the TCP connection establishing unit 504 is configured to establish a TCP connection with the remote node by using the relay address and the resource port;

the multiplexing identifier included in the TURN data packet received by the receiving unit 501 is specifically used to identify the TCP connection; and that the sending unit 503 is configured to send the communication data to the remote node through the communications channel identified by the multiplexing identifier specifically includes: the sending unit 503 is configured to send the communication data to the remote node through the TCP connection identified by the multiplexing identifier.

When the TCP connection is established, specifically, the TURN server may actively initiate establishing of the TCP connection according to a connection request of the communications terminal, or the remote node may actively initiate establishing of the TCP connection.

For the implementation manner that the TURN server actively initiates establishing of the TCP connection according to the connection request of the communications terminal:

the resource allocating unit 502 is further configured to record a resource identifier allocated for a pre-created configuration information object, the relay address, and the resource port in the configuration information object;

the sending unit 503 is further configured to receive the resource identifier sent by the resource allocating unit 502, and send the resource identifier to the communications terminal;

the receiving unit 501 is further configured to receive the connection request sent by the communications terminal, where the connection request includes the resource identifier, and an IP address and a port number of the remote node; and the TCP connection establishing unit 504 is specifically configured to obtain the configuration information object in which the resource identifier is recorded, read the relay address and the resource port from the configuration information object, and establish the TCP connection by using the read relay address and the read resource port, and the IP address and the port number of the remote node in the connection request.

For the implementation manner that the remote node actively initiates establishing of the TCP connection:

the TURN server further includes a first permission unit 505;

the resource allocating unit 502 is further configured to record a resource identifier allocated for a pre-created configuration information object, the relay address, and the resource port in the configuration information object, and transmit the resource identifier to the sending unit 503;

the sending unit 503 is further configured to receive the resource identifier sent by the resource allocating unit 502, and send the resource identifier to the communications terminal;

the receiving unit 501 is further configured to receive a create permission request sent by the communications terminal, where the create permission request includes the resource identifier, and an IP address and a port number of the remote node, and transmit the create permission request to the first permission unit 505; is further configured to receive a TCP connection request used to establish the TCP connection and sent by the remote node, where a destination IP address and a destination port of the TCP connection request are the relay address and the resource port, and a source IP address and a source port of the TCP connection request are the IP address and the port number of the remote node;

the first permission unit 505 is configured to receive the create permission request from the receiving unit 501, obtain the configuration information object in which the resource identifier is recorded, record permission information in the configuration information object, where the permission information includes the IP address and the port number of the remote node; and is configured to obtain the configuration information object in which the relay address and the resource port are recorded when the receiving unit 501 receives the TCP connection request, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port;

the TCP connection establishing unit 504 is specifically configured to establish the TCP connection when the first permission unit 505 determines that the communications terminal permits the remote node to communicate with the communications terminal by using the relay address and the resource port.

Based on the foregoing two implementation manners of establishing the TCP connection:

the TCP connection establishing unit 504 is further configured to record correspondence between a connection identifier allocated for the TCP connection and the TCP connection, and transmit the connection identifier to the sending unit 503;

the sending unit 503 is further configured to receive the connection identifier from the TCP connection establishing unit 504, and send the connection identifier to the communications terminal;

the multiplexing identifier included in the TURN data packet received by the receiving unit 501 is specifically the connection identifier; and that the sending unit 503 sends the communication data to the remote node through the TCP connection identified by the multiplexing identifier specifically includes: the sending unit 503 obtains the configuration information object in which the connection identifier is recorded, determines the TCP connection according to the correspondence between the connection identifier and the TCP connection recorded in the configuration information object, and sends the communication data to the remote node through the TCP connection.

In Implementation manner 1 of Embodiment 2, the receiving unit 501 is further configured to receive communication data sent by the remote node through the TCP connection, and transmit the communication data to the sending unit 503; the sending unit 503 is further configured to receive the communication data from the receiving unit 501, encapsulate the communication data in a TURN data packet, and send the TURN data packet to the communications terminal, where the TURN data packet further includes the multiplexing identifier.

As shown in FIG. 6-3, in Implementation manner 2 of Embodiment 2 of the present invention, the resource protocol type included in the resource allocate request received by the receiving unit 501 designates that the communications protocol between the TURN server and the remote node is the UDP;

the multiplexing identifier included in the TURN data packet received by the receiving unit 501 is specifically used to identify a UDP channel between the relay address and the resource port, and the remote node;

the sending unit 503 is specifically configured to receive the TURN data packet from the receiving unit 501, obtain the relay address and the resource port, and an IP address and a port number of the remote node according to the multiplexing identifier, encapsulate the communication data in a UDP data packet, and send the UDP data packet to the remote node, where a source IP address and a source port number of the UDP data packet are the relay address and the resource port, and a destination IP address and a destination port number of the UDP data packet are the IP address and the port number of the remote node.

In an optional implementation manner of Implementation manner 2 of Embodiment 2, the TURN server 500 further includes a binding unit 506;

the resource allocating unit 502 is further configured to record a resource identifier allocated for a pre-created configuration information object, the relay address, and the resource port in the configuration information object, and transmit the resource identifier to the sending unit 503;

the sending unit 503 is further configured to receive the resource identifier from the resource allocating unit 502, and send the resource identifier to the communications terminal; receive a channel number allocated by the binding unit 506 from the binding unit 506, and send the channel number to the communications terminal;

the receiving unit 501 is further configured to receive a channel binding request sent by the communications terminal, where the channel binding request includes the resource identifier, and an IP address and a port number of the remote node, and transmit the channel binding request to the binding unit 506;

the binding unit 506 is configured to receive the channel binding request from the receiving unit 501, and obtain the configuration information object in which the resource identifier is recorded; record a channel number allocated for the UDP channel and UDP channel information in the configuration information object, where the UDP channel information includes the IP address and the port number of the remote node; and transmit the channel number to the sending unit 503; and that the sending unit 503 is configured to obtain the relay address and the resource port, and an IP address and a port number of the remote node according to the multiplexing identifier specifically includes: the sending unit 503 is configured to obtain the configuration information object in which the channel number is recorded, and obtain the relay address and the resource port, and the IP address and the port number of the remote node in the UDP channel information recorded in the configuration information object.

In another optional implementation manner of Implementation manner 2 of Embodiment 2:

the resource allocating unit 502 is further configured to record a resource identifier allocated for a pre-created configuration information object, the relay address, and the resource port in the configuration information object; and transmit the resource identifier to the sending unit 503;

the sending unit 503 is further configured to receive the resource identifier from the resource allocating unit 502, and send the resource identifier to the communications terminal;

the multiplexing identifier included in the TURN data packet received by the receiving unit 501 specifically includes the resource identifier, and an IP address and a port number of the remote node;

that the sending unit 503 is configured to obtain the relay address and the resource port, and an IP address and a port number of the remote node according to the multiplexing identifier specifically includes: the sending unit 503 is configured to obtain the configuration information object in which the resource identifier is recorded, obtain the relay address and the resource port recorded in the configuration information object, and obtain the IP address and the port number of the remote node in the TURN data packet.

Based on the foregoing two optional implementation manners, further, the TURN server 500 further includes a second permission unit 507;

the receiving unit 501 is further configured to receive a create permission request sent by the communications terminal, where the create permission request includes the resource identifier, and an IP address and a port number of the remote node, and transmit the create permission request to the second permission unit 507; and is further configured to receive a UDP data packet encapsulated with communication data and sent by the remote node, where a destination IP address and a destination port number of the UDP data packet are the relay address and the resource port, and a source IP address and a source port number of the UDP data packet are the IP address and the port number of the remote node;

the second permission unit 507 is configured to receive the create permission request from the receiving unit 501, obtain the configuration information object in which the resource identifier is recorded, and record permission information in the configuration information object, where the permission information includes the IP address and the port number of the remote node; and is configured to obtain the configuration information object in which the relay address and the resource port are recorded when the receiving unit 501 receives the UDP data packet, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port;

the sending unit 503 is further configured to encapsulate the communication data in the TURN data packet and send the TURN data packet to the communications terminal when the second permission unit 507 determines that the communications terminal permits the remote node to communicate with the communications terminal by using the relay address and the resource port, where the TURN data packet further includes the multiplexing identifier.

As shown in FIG. 6-4, in Implementation manner 3 of Embodiment 2 of the present invention, the resource protocol type included in the resource allocate request received by the receiving unit 501 designates that the communications protocol between the TURN server and the remote node is the websocket; and the TURN server further includes a connection establishing unit 508;

the resource allocate request received by the receiving unit 501 includes a resource protocol type, where the resource protocol type designates that the communications protocol between the TURN server and the remote node is the websocket; the TURN data packet received by the receiving unit 501 is specifically the connection identifier generated by the connection establishing unit 508;

the connection establishing unit 508 is configured to generate the connection identifier, and record correspondence between the connection identifier and the first websocket connection, and correspondence between the connection identifier and a second websocket connection, where the second websocket connection is a websocket connection with the remote node pre-established by the TURN server by using the relay address and the resource port, and a message exchanged between the TURN server and the remote node is transmitted through the second websocket connection; and transmit the connection identifier to the sending unit 503;

the sending unit 503 is further configured to receive the connection identifier from the connection establishing unit 508, and send the connection identifier to the communications terminal; and that the sending unit 503 is configured to send the communication data to the remote node through the communications channel identified by the multiplexing identifier specifically includes: the sending unit 503 is configured to send the TURN data packet to the remote node through the second websocket connection corresponding to the connection identifier.

Further, the receiving unit 501 is further configured to send the connection identifier to the remote node; receive a TURN data packet sent by the remote node, and transmit the TURN data packet to the sending unit 503, where the TURN data packet includes communication data and the connection identifier; the sending unit 503 is further configured to send the connection identifier to the remote node; and is configured to receive the TURN data packet from the receiving unit 501, and send the TURN data packet to the communications terminal.

Implementation manner 3 of Embodiment 2 of the present invention has the following two optional implementation manners: in a first optional implementation manner, the TURN server establishes a virtual connection between the communications terminal and the remote node according to the connection request of the communications terminal; and in a second optional implementation manner, the TURN server establishes a virtual connection between the communications terminal and the remote node according to the connection request of the remote node.

In the first optional implementation manner of Implementation manner 3 of Embodiment 2:

the resource allocating unit 502 is further configured to record a resource identifier allocated for a pre-created configuration information object, the relay address, and the resource port in the configuration information object, and transmit the resource identifier to the sending unit 503;

the sending unit 503 is further configured to receive the resource identifier sent by the resource allocating unit 502, and send the resource identifier to the communications terminal;

the receiving unit 501 is further configured to receive the connection request sent by the communications terminal, where the connection request includes the resource identifier, and an IP address and a port number of the remote node, and transmit the connection request to the connection establishing unit 508;

the connection establishing unit 508 is specifically configured to receive the connection request from the receiving unit 501, obtain the configuration information object in which the resource identifier is recorded, determine the second websocket connection according to the relay address and the resource port recorded in the configuration information object, and the IP address and the port number of the remote node in the connection request, record correspondence between the connection identifier and the first websocket connection, and correspondence between the connection identifier and the second websocket connection in the configuration information object, and transmit the connection identifier to the sending unit 503; and that the sending unit 503 is configured to send the TURN data packet to the remote node through the second websocket connection corresponding to the connection identifier specifically includes: the sending unit 503 is configured to obtain the configuration information object in which the connection identifier is recorded, determine the second websocket connection according to the correspondence between the connection identifier and the second websocket connection recorded in the configuration information object, and send the TURN data packet to the remote node through the second websocket connection.

In the second optional implementation manner of Implementation manner 3 of Embodiment 2:

the TURN server further includes a third permission unit 509;

the resource allocating unit 502 is further configured to record a resource identifier allocated for a pre-created configuration information object, the relay address, and the resource port in the configuration information object; and transmit the resource identifier to the sending unit 503;

the sending unit 503 is further configured to receive the resource identifier sent by the resource allocating unit 502, and send the resource identifier to the communications terminal;

the receiving unit 501 is further configured to receive a create permission request sent by the communications terminal, where the create permission request includes the resource identifier, and an IP address and a port number of the remote node, and transmit the create permission request to the third permission unit 509; is further configured to receive a connection request sent by the remote node, where the connection request includes the IP address and the port number of the communications terminal;

the third permission unit 509 receives the create permission request from the receiving unit 501, obtains the configuration information object in which the resource identifier is recorded, records permission information in the configuration information, where the permission information includes the IP address and the port number of the remote node; and is further configured to obtain the configuration information object in which the IP address and the port number of the communications terminal are recorded when the receiving unit 501 receives the connection request, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port;

the connection establishing unit 508 is specifically configured to receive the connection request from the receiving unit 501, obtain the configuration information object in which the resource identifier is recorded when the third permission unit 509 determines that the communications terminal permits the remote node to communicate with the communications terminal by using the relay address and the resource port, determine the second websocket connection according to the relay address and the resource port recorded in the configuration information object, and the IP address and the port number of the remote node in the connection request, record correspondence between the connection identifier and the first websocket connection, and correspondence between the connection identifier and the second websocket connection in the configuration information object, and transmit the connection identifier to the sending unit 503; and that the sending unit 503 is configured to send the TURN data packet to the remote node through the second websocket connection corresponding to the connection identifier specifically includes: the sending unit 503 is configured to obtain the configuration information object in which the connection identifier is recorded, determine the second websocket connection according to the correspondence between the connection identifier and the second websocket connection recorded in the configuration information object, and send the TURN data packet to the remote node through the second websocket connection.

Functional units described in Embodiment 2 of the present invention may be used to implement the method described in Embodiment 1.

According to Embodiment 1 of the present invention, Embodiment 3 of the present invention provides a communications terminal 600, where the communications terminal 600 is located in a local area network, and a message exchanged between a TURN server in a public network and the communications terminal 600 is transmitted through a pre-established first websocket connection.

Figures 1, 7:
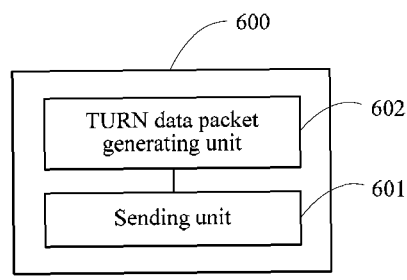
Figures 2, 7:
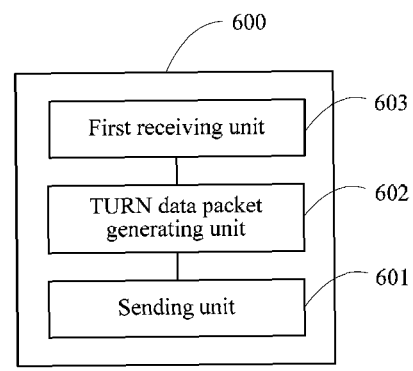
Figures 3, 7:
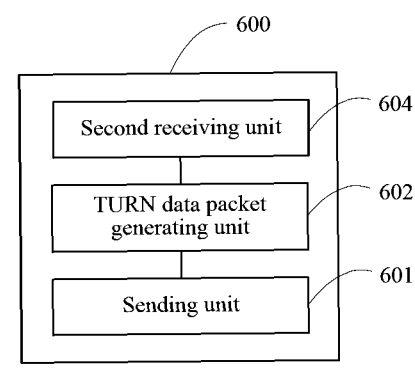
Figures 4, 7:
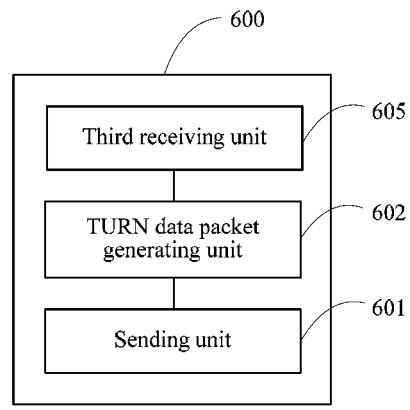

As shown in FIG. 7-1, the communications terminal 600 includes: a sending unit 601 and a TURN data packet generating unit 602; where the sending unit 601 is configured to send a resource allocate request to the TURN server, so that the TURN server allocates a relay address and a resource port for the communications terminal, where the relay address and the resource port are an IP address and a port of the TURN server;

the TURN data packet generating unit 602 is configured to generate a TURN data packet, where the TURN data packet includes communication data and a multiplexing identifier, the multiplexing identifier is used to identify a communications channel between the relay address and the resource port, and a remote node corresponding to the communication data; and transmit the TURN data packet to the sending unit 601; and the sending unit 601 is further configured to receive the TURN data packet from the TURN data packet generating unit 602, and send the TURN data packet to the TURN server, so that the TURN server sends the communication data to the remote node through the communications channel identified by the multiplexing identifier.

The following describes 3 implementation manners of Embodiment 3 of the present invention respectively. In Implementation manner 1 of Embodiment 3, a communications protocol between the TURN server and the remote node is a TCP; in Implementation manner 2 of Embodiment 3, the communications protocol between the TURN server and the remote node is a UDP; and in Implementation manner 3 of Embodiment 3, the communications protocol between the TURN server and the remote node is a websocket.

As shown in FIG. 7-2, in Implementation manner 1 of Embodiment 3 of the present invention, the resource allocate request sent by the sending unit 601 includes a resource protocol type, where the resource protocol type designates that the communications protocol between the TURN server and the remote node is the TCP;

the multiplexing identifier included in the TURN data packet generated by the TURN data packet generating unit 602 is specifically used to identify a TCP connection with the remote node established by the TURN server by using the relay address and the resource port, so that the TURN server sends the communication data to the remote node through the TCP connection identified by the multiplexing identifier.

Further, the communications terminal also includes a first receiving unit 603;

when the TCP connection is established, specifically, the TURN server may actively initiate establishing of the TCP connection according to a connection request of the communications terminal, or the remote node may actively initiate establishing of the TCP connection.

For the implementation manner that the TURN server actively initiates establishing of the TCP connection according to the connection request of the communications terminal: the first receiving unit 603 is configured to receive a resource identifier sent by the TURN server after the resource identifier allocated for a pre-created configuration information object, the relay address, and the resource port are recorded in the configuration information object; the sending unit 601 is further configured to send a connection request to the TURN server, where the connection request includes the resource identifier, and an IP address and a port number of the remote node, so that the TURN server obtains the configuration information object in which the resource identifier is recorded, reads the relay address and the resource port from the configuration information object, and establishes the TCP connection by using the read relay address and the read resource port, and the IP address and the port number of the remote node in the connection request.

In Implementation manner 1 of Embodiment 3, the first receiving unit 603 is further configured to receive a TURN data packet encapsulated with the communication data and sent by the TURN server, where the TURN data packet further includes the multiplexing identifier; where the communication data is received by the TURN server from the remote node through the TCP connection.

As shown in FIG. 7-3, in Implementation manner 2 of Embodiment 3, the resource allocate request sent by the sending unit 601 includes a resource protocol type, where the resource protocol type designates that the communications protocol between the TURN server and the remote node is the UDP;

the multiplexing identifier included in the TURN data packet generated by the TURN data packet generating unit 602 is specifically used to identify a UDP channel between the relay address and the resource port, and the remote node, so that: the TURN server obtains the relay address and the resource port, and an IP address and a port number of the remote node according to the multiplexing identifier, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

In an optional implementation manner of Implementation manner 2 of Embodiment 3, the communications terminal further includes a second receiving unit 604;

the second receiving unit 604 is further configured to receive a resource identifier sent by the TURN server after the resource identifier allocated for a pre-created configuration information object, the relay address, and the resource port are recorded in the configuration information object, and transmit the resource identifier to the sending unit 601;

the sending unit 601 is further configured to send a channel binding request to the TURN server, where the channel binding request includes the resource identifier, and the IP address and the port number of the remote node, so that: the TURN server records a channel number allocated for the UDP channel and UDP channel information in the configuration information object in which the resource identifier is recorded, where the UDP channel information includes the IP address and the port number of the remote node; and receive the channel number sent by the TURN server; and the multiplexing identifier included in the TURN data packet generated by the TURN data packet generating unit 602 is specifically the channel number, so that: the TURN server obtains the recorded relay address and the recorded resource port, and the IP address and the port number of the remote node in the UDP channel information from the configuration information object in which the channel number is recorded, encapsulates the communication data in the UDP data packet, and sends the UDP data packet to the remote node, where the source IP address and the source port number of the UDP data packet are the relay address and the resource port, and the destination IP address and the destination port number of the UDP data packet are the IP address and the port number of the remote node.

In another optional implementation manner of Implementation manner 2 of Embodiment 3:

the second receiving unit 604 is further configured to receive a resource identifier sent by the TURN server after the resource identifier allocated for a pre-created configuration information object, the relay address, and the resource port are recorded in the configuration information object, and transmit the resource identifier to the TURN data packet generating unit 602;

the TURN data packet generating unit 602 is further configured to receive the resource identifier from the second receiving unit 604; the multiplexing identifier included in the TURN data packet generated by the TURN data packet generating unit 602 specifically includes the resource identifier, and an IP address and a port number of the remote node, so that: the TURN server obtains the configuration information object in which the resource identifier is recorded, obtains the relay address and the resource port recorded in the configuration information object, obtains the IP address and the port number of the remote node in the TURN data packet, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

The second receiving unit 604 is further configured to receive the TURN data packet encapsulated with the communication data received from the remote node and sent by the TURN server, where the TURN data packet further includes the multiplexing identifier.

As shown in FIG. 7-4, in Implementation manner 3 of Embodiment 3 of the present invention, the communications terminal further includes a third receiving unit 605;

the resource allocate request sent by the sending unit 601 includes a resource protocol type, where the resource protocol type designates that the communications protocol between the TURN server and the remote node is the websocket;

the third receiving unit 605 is configured to receive a connection identifier sent by the TURN server, and is configured to transmit the connection identifier to the TURN data packet generating unit 602, where the TURN server records correspondence between the connection identifier and the first websocket connection, and correspondence between the connection identifier and a second websocket connection, the second websocket connection is a websocket connection with the remote node pre-established by the TURN server by using the relay address and the resource port, and a message exchanged between the TURN server and the remote node is transmitted through the second websocket connection;

the TURN data packet generating unit 602 is further configured to receive the connection identifier from the third receiving unit 605; the multiplexing identifier included in the TURN data packet generated by the TURN data packet generating unit 602 is specifically the connection identifier, so that the TURN server sends the TURN data packet to the remote node through the second websocket connection corresponding to the connection identifier.

Further, the third receiving unit 605 is further configured to receive the TURN data packet received from the remote node and sent by the TURN server, where the TURN data packet includes the communication data and the connection identifier; where the connection identifier added into the TURN data packet by the remote node is pre-received from the TURN server.

Functional units described in Embodiment 3 of the present invention may be used to implement the method described in Embodiment 1.

Figure 8:
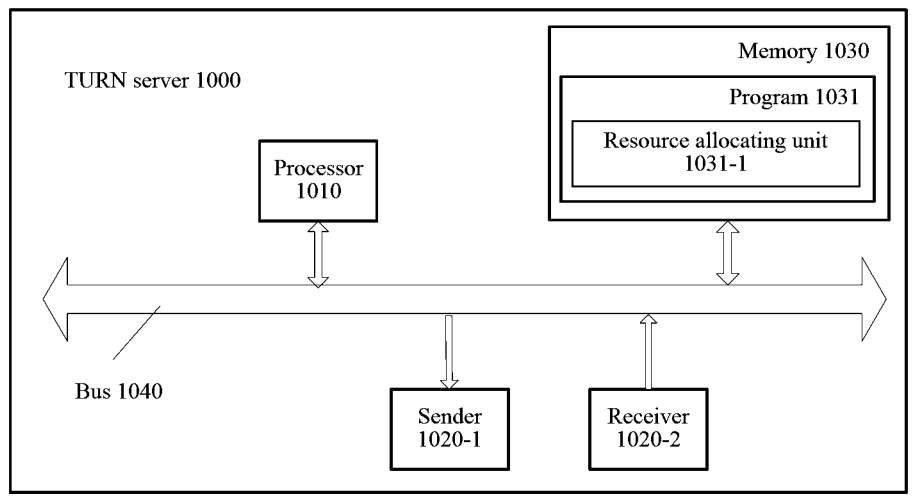
FIG. 8 is another schematic structural diagram of a TURN server according to Embodiment 4 of the present invention.

As shown in FIG. 8, Embodiment 4 of the present invention provides a TURN server 1000, where the TURN server 1000 is located in a public network, and a message exchanged between the TURN server 1000 and a communications terminal in a local area network is transmitted through a pre-established first websocket connection. The TURN server 1000 includes:

a processor (processor) 1010, a sender (transmitter) 1020-1, a receiver (receiver) 1020-2, a memory (memory) 1030, and a bus 1040, where the processor 1010, the sender 1020-1, the receiver 1020-2, and the memory 1030 complete communication with each other through the bus 1040.

The sender 1020-1 and the receiver 1020-2 are configured to communicate with a network element.

The memory 1030 is configured to save a program 1031, specifically, the program 1031 may include program code, and the program code includes computer operating instructions. The memory 1030 may include a high-speed RAM memory, or may further include a non-volatile memory (non-volatile memory), for example, at least one magnetic disk memory.

The processor 1010 is configured to execute the program 1031 saved in the memory 1030. The processor 1010 may be specifically a central processing unit (CPU, central processing unit), which is a computer core unit.

Specifically, the program 1031 may include: a resource allocating unit 1031-1;

the receiver 1020-2 is configured to receive a resource allocate request sent by the communications terminal;

the resource allocating unit 1031-1 is configured to allocate a relay address and a resource port for the communications terminal, where the relay address and the resource port are an IP address and a port of the TURN server;

the receiver 1020-2 is further configured to receive a TURN data packet sent by the communications terminal, where the TURN data packet includes communication data and a multiplexing identifier, the multiplexing identifier is used to identify a communications channel between the relay address and the resource port, and a remote node corresponding to the communication data; and the multiplexing identifier is used to identify the communications channel between the relay address and the resource port, and the remote node corresponding to the communication data.

The resource allocate request includes a resource protocol type, where the resource protocol type designates that a communications protocol between the TURN server and the remote node may be specifically a TCP, a UDP, or a websocket.

The following describes 3 implementation manners of Embodiment 4 of the present invention respectively. In Implementation manner 1 of Embodiment 4, the communications protocol between the TURN server and the remote node is the TCP; in Implementation manner 2 of Embodiment 4, the communications protocol between the TURN server and the remote node is the UDP; and in Implementation manner 3 of Embodiment 4, the communications protocol between the TURN server and the remote node is the websocket.

In Implementation manner 1 of Embodiment 4 of the present invention, the resource protocol type included in the resource allocate request received by the receiver 1020-2 designates that the communications protocol between the TURN server and the remote node is the TCP;

the program 1031 includes a TCP connection establishing unit;

the resource allocate request received by the receiver 1020-2 includes a resource protocol type, where the resource protocol type designates that the communications protocol between the TURN server and the remote node is the TCP;

the TCP connection establishing unit is configured to establish a TCP connection with the remote node by using the relay address and the resource port;

the multiplexing identifier included in the TURN data packet received by the receiver 1020-2 is specifically used to identify the TCP connection; and that the sender 1020-1 is configured to send the communication data to the remote node through the communications channel identified by the multiplexing identifier specifically includes: the sender 1020-1 is configured to send the communication data to the remote node through the TCP connection identified by the multiplexing identifier.

When the TCP connection is established, specifically, the TURN server may actively initiate establishing of the TCP connection according to a connection request of the communications terminal, or the remote node may actively initiate establishing of the TCP connection.

For the implementation manner that the TURN server actively initiates establishing of the TCP connection according to the connection request of the communications terminal:

the resource allocating unit 1031-1 is further configured to record a resource identifier allocated for a pre-created configuration information object, the relay address, and the resource port in the configuration information object, and transmit the resource identifier to the sending unit 503;

the sender 1020-1 is further configured to send the resource identifier to the communications terminal;

the receiver 1020-2 is further configured to receive the connection request sent by the communications terminal, where the connection request includes the resource identifier, and an IP address and a port number of the remote node; and the TCP connection establishing unit is specifically configured to obtain the configuration information object in which the resource identifier is recorded, read the relay address and the resource port from the configuration information object, and establish the TCP connection by using the read relay address and the read resource port, and the IP address and the port number of the remote node in the connection request.

For the implementation manner that the remote node actively initiates establishing of the TCP connection:

the program 1031 further includes a first permission unit;

the resource allocating unit 1031-1 is further configured to record a resource identifier allocated for a pre-created configuration information object, the relay address, and the resource port in the configuration information object, and transmit the resource identifier to the sending unit 503;

the sender 1020-1 is further configured to send the resource identifier to the communications terminal;

the receiver 1020-2 is further configured to receive a create permission request sent by the communications terminal, where the create permission request includes the resource identifier, and an IP address and a port number of the remote node, and transmit the create permission request to the first permission unit; is further configured to receive a TCP connection request used to establish the TCP connection and sent by the remote node, where a destination IP address and a destination port of the TCP connection request are the relay address and the resource port, and a source IP address and a source port of the TCP connection request are the IP address and the port number of the remote node;

the first permission unit is configured to receive the create permission request from the receiver 1020-2, obtain the configuration information object in which the resource identifier is recorded, record permission information in the configuration information object, where the permission information includes the IP address and the port number of the remote node; and is further configured to obtain the configuration information object in which the relay address and the resource port are recorded when the receiver 1020-2 receives the TCP connection request, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port; and the TCP connection establishing unit is specifically configured to establish the TCP connection when the first permission unit determines that the communications terminal permits the remote node to communicate with the communications terminal by using the relay address and the resource port.

Based on the foregoing two implementation manners of establishing the TCP connection:

the TCP connection establishing unit is further configured to record correspondence between a connection identifier allocated for the TCP connection and the TCP connection;

the sender 1020-1 is further configured to send the connection identifier to the communications terminal;

the multiplexing identifier included in the TURN data packet received by the receiver 1020-2 is specifically the connection identifier; and that the sender 1020-1 sends the communication data to the remote node through the TCP connection identified by the multiplexing identifier specifically includes: the sender 1020-1 obtains the configuration information object in which the connection identifier is recorded, determine the TCP connection according to the correspondence between the connection identifier and the TCP connection recorded in the configuration information object, and send the communication data to the remote node through the TCP connection.

In Implementation manner 1 of Embodiment 4, the receiver 1020-2 is further configured to receive communication data sent by the remote node through the TCP connection; the sender 1020-1 is further configured to encapsulate the communication data in a TURN data packet, and send the TURN data packet to the communications terminal, where the TURN data packet further includes the multiplexing identifier.

In Implementation manner 2 of Embodiment 4 of the present invention, the resource protocol type included in the resource allocate request received by the receiver 1020-2 designates that the communications protocol between the TURN server and the remote node is the UDP;

the multiplexing identifier included in the TURN data packet received by the receiver 1020-2 is specifically used to identify a UDP channel between the relay address and the resource port, and the remote node;

the sender 1020-1 is specifically configured to obtain the relay address and the resource port, and an IP address and a port number of the remote node according to the multiplexing identifier, encapsulate the communication data in a UDP data packet, and send the UDP data packet to the remote node, where a source IP address and a source port number of the UDP data packet are the relay address and the resource port, and a destination IP address and a destination port number of the UDP data packet are the IP address and the port number of the remote node.

In an optional implementation manner of Implementation manner 2 of Embodiment 4, the program 1031 further includes a binding unit;

the resource allocating unit 1031-1 is further configured to record a resource identifier allocated for a pre-created configuration information object, the relay address, and the resource port in the configuration information object; and transmit the resource identifier to the sender 1020-1;

the sender 1020-1 is further configured to receive the resource identifier from the resource allocating unit 1031-1, and send the resource identifier to the communications terminal; receive a channel number allocated by the binding unit from the binding unit, and send the channel number to the communications terminal;

the receiving unit 1020-2 is further configured to receive a channel binding request sent by the communications terminal, where the create permission request includes the resource identifier, and an IP address and a port number of the remote node, and transmit the channel binding request to the binding unit;

the binding unit is configured to receive the channel binding request from the receiving unit 1020-2, and obtain the configuration information object in which the resource identifier is recorded; record a channel number allocated for the UDP channel and UDP channel information in the configuration information object, where the UDP channel information includes the IP address and the port number of the remote node; and transmit the channel number to the sender 1020-1; and that the sender 1020-1 is configured to obtain the relay address and the resource port, and an IP address and a port number of the remote node according to the multiplexing identifier specifically includes: the sender 1020-1 is configured to obtain the configuration information object in which the channel number is recorded, and obtain the relay address and the resource port, and the IP address and the port number of the remote node in the UDP channel information recorded in the configuration information object.

In another optional implementation manner of Implementation manner 2 of Embodiment 4:

the resource allocating unit 1031-1 is further configured to record a resource identifier allocated for a pre-created configuration information object, the relay address, and the resource port in the configuration information object; and transmit the resource identifier to the sender 1020-1;

the sender 1020-1 is further configured to receive the resource identifier from the resource allocating unit 1031-1, and send the resource identifier to the communications terminal;

the multiplexing identifier included in the TURN data packet received by the receiver 1020-2 specifically includes the resource identifier, and an IP address and a port number of the remote node;

that the sender 1020-1 is configured to obtain the relay address and the resource port, and an IP address and a port number of the remote node according to the multiplexing identifier specifically includes: the sender 1020-1 is configured to obtain the configuration information object in which the resource identifier is recorded, obtain the relay address and the resource port recorded in the configuration information object, and obtain the IP address and the port number of the remote node in the TURN data packet.

Based on the foregoing two optional implementation manners, further, the program 1031 also includes a second permission unit;

the receiver 1020-2 is further configured to receive a create permission request sent by the communications terminal, where the create permission request includes the resource identifier, and an IP address and a port number of the remote node, and transmit the create permission request to the second permission unit; and is further configured to receive a UDP data packet encapsulated with communication data and sent by the remote node, where a destination IP address and a destination port number of the UDP data packet are the relay address and the resource port, and a source IP address and a source port number of the UDP data packet are the IP address and the port number of the remote node;

the second permission unit is configured to receive the create permission request from the receiver 1020-2, obtain the configuration information object in which the resource identifier is recorded, and record permission information in the configuration information object, where the permission information includes the IP address and the port number of the remote node; and is further configured to obtain the configuration information object in which the relay address and the resource port are recorded when the receiver 1020-2 receives the UDP data packet, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port;

the sender 1020-1 is further configured to encapsulate the communication data in the TURN data packet and send the TURN data packet to the communications terminal when the second permission unit determines that the communications terminal permits the remote node to communicate with the communications terminal by using the relay address and the resource port, where the TURN data packet further includes the multiplexing identifier.

In Implementation manner 3 of Embodiment 4 of the present invention, the resource protocol type included in the resource allocate request received by the receiver 1020-2 designates that the communications protocol between the TURN server and the remote node is the websocket;

the program 1031 further includes a connection establishing unit;

the resource allocate request received by the receiver 1020-2 includes a resource protocol type, where the resource protocol type designates that the communications protocol between the TURN server and the remote node is the websocket; the TURN data packet received by the receiver 1020-2 is specifically the connection identifier generated by the connection establishing unit;

the connection establishing unit is configured to generate the connection identifier, and record correspondence between the connection identifier and the first websocket connection, and correspondence between the connection identifier and a second websocket connection, where the second websocket connection is a websocket connection with the remote node pre-established by the TURN server by using the relay address and the resource port, and a message exchanged between the TURN server and the remote node is transmitted through the second websocket connection; and transmit the connection identifier to the sender 1020-1;

the sender 1020-1 is further configured to receive the connection identifier from the connection establishing unit, and send the connection identifier to the communications terminal; and that the sender 1020-1 is configured to send the communication data to the remote node through the communications channel identified by the multiplexing identifier specifically includes: the sender 1020-1 is configured to send the TURN data packet to the remote node through the second websocket connection corresponding to the connection identifier.

Further, the receiver 1020-2 is further configured to send the connection identifier to the remote node; receive a TURN data packet sent by the remote node, and transmit the TURN data packet to the sender 1020-1, where the TURN data packet includes communication data and the connection identifier; the sender 1020-1 is further configured to send the connection identifier to the remote node; and is configured to receive the TURN data packet from the receiver 1020-2, and send the TURN data packet to the communications terminal.

Implementation manner 3 of Embodiment 4 of the present invention has the following two optional implementation manners: in a first optional implementation manner, the TURN server establishes a virtual connection between the communications terminal and the remote node according to the connection request of the communications terminal; and in a second optional implementation manner, the TURN server establishes a virtual connection between the communications terminal and the remote node according to the connection request of the remote node.

In the first optional implementation manner of Implementation manner 3 of Embodiment 4:

the resource allocating unit 1031-1 is further configured to record a resource identifier allocated for a pre-created configuration information object, the relay address, and the resource port in the configuration information object;

the sender 1020-1 is further configured to send the resource identifier to the communications terminal;

the receiving unit 1020-2 is further configured to receive the connection request sent by the communications terminal, where the connection request includes the resource identifier, and an IP address and a port number of the remote node, and transmit the connection request to the connection establishing unit;

the connection establishing unit is specifically configured to receive the connection request from the receiver 1020-2, obtain the configuration information object in which the resource identifier is recorded, determine the second websocket connection according to the relay address and the resource port recorded in the configuration information object, and the IP address and the port number of the remote node in the connection request, record correspondence between the connection identifier and the first websocket connection, and correspondence between the connection identifier and the second websocket connection in the configuration information object, and transmit the connection identifier to the sender 1020-1; and that the sender 1020-1 is configured to send the TURN data packet to the remote node through the second websocket connection corresponding to the connection identifier specifically includes: the sender 1020-1 is configured to obtain the configuration information object in which the connection identifier is recorded, determine the second websocket connection according to the correspondence between the connection identifier and the second websocket connection recorded in the configuration information object, and send the TURN data packet to the remote node through the second websocket connection.

In the second optional implementation manner of Implementation manner 3 of Embodiment 4:

the program 1031 further includes a third permission unit;

the resource allocating unit 1031-1 is further configured to record a resource identifier allocated for a pre-created configuration information object, the relay address, and the resource port in the configuration information object;

the sender 1020-1 is further configured to send the resource identifier to the communications terminal;

the receiver 1020-2 is further configured to receive a create permission request sent by the communications terminal, where the create permission request includes the resource identifier, and an IP address and a port number of the remote node, and transmit the create permission request to the third permission unit; is further configured to receive a connection request sent by the remote node, where the connection request includes the IP address and the port number of the communications terminal;

the third permission unit obtains the configuration information object in which the resource identifier is recorded, records permission information in the configuration information, where the permission information includes the IP address and the port number of the remote node; and is configured to obtain the configuration information object in which the IP address and the port number of the communications terminal are recorded when the receiver 1020-2 receives the connection request, determine whether the permission information in the configuration information object includes the IP address and the port number of the remote node, and if the permission information includes the IP address and the port number of the remote node, determine that the communications terminal permits the remote node to communicate with the communications terminal by using the relay address and the resource port;

the connection establishing unit is specifically configured to obtain the configuration information object in which the resource identifier is recorded when the third permission unit determines that the communications terminal permits the remote node to communicate with the communications terminal by using the relay address and the resource port, determine the second websocket connection according to the relay address and the resource port recorded in the configuration information object, and the IP address and the port number of the remote node in the connection request, generate the connection identifier, record correspondence between the connection identifier and the first websocket connection, and correspondence between the connection identifier and the second websocket connection in the configuration information object, and transmit the connection identifier to the sender 1020-1; and that the sender 1020-1 is configured to send the TURN data packet to the remote node through the second websocket connection corresponding to the connection identifier specifically includes: the sender 1020-1 is configured to obtain the configuration information object in which the connection identifier is recorded, determine the second websocket connection according to the correspondence between the connection identifier and the second websocket connection recorded in the configuration information object, and send the TURN data packet to the remote node through the second websocket connection.

For specific implementation of each unit in the program 1031, refer to corresponding units in Embodiment 2 of the present invention, and details are not described herein again.

Functional units described in Embodiment 4 of the present invention may be used to implement the method described in Embodiment 1.

Figure 9:
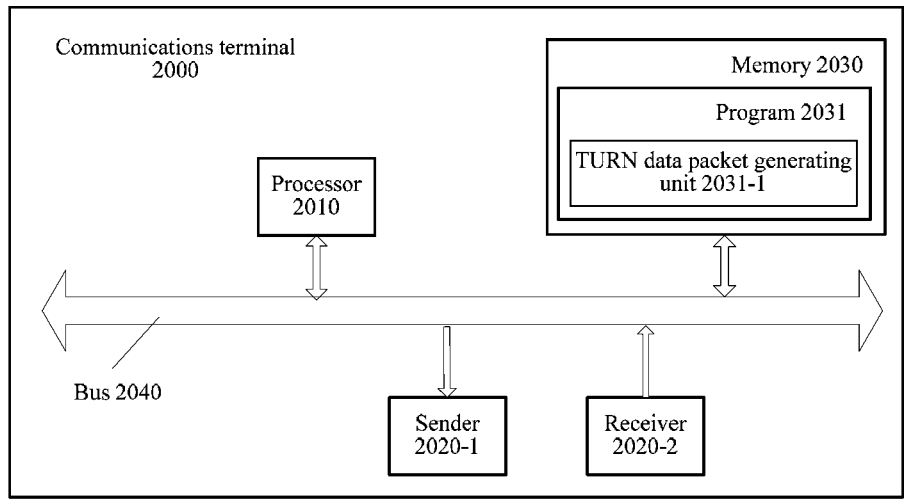
FIG. 9 is another schematic structural diagram of a communications terminal according to Embodiment 5 of the present invention.

As shown in FIG. 9, Embodiment 5 of the present invention provides a communications terminal 2000, where the communications terminal 2000 is located in a local area network, and a message exchanged between a TURN server in a public network and the communications terminal 600 is transmitted through a pre-established first websocket connection. The communications terminal 2000 includes:

a processor (processor) 2010, a sender (transmitter) 2020-1, a receiver (receiver) 2020-2, a memory (memory) 2030, and a bus 2040, where the processor 2010, the sender 2020-1, the receiver 2020-2, and the memory 2030 complete communication with each other through the bus 2040.

The sender 2020-1 and the receiver 2020-2 are configured to communicate with a network element.

The memory 2030 is configured to save a program 2031, specifically, the program 2031 may include program code, and the program code includes computer operating instructions. The memory 2030 may include a high-speed RAM memory, or may further include a non-volatile memory (non-volatile memory), for example, at least one magnetic disk memory.

The processor 2010 is configured to execute the program 2031 saved in the memory 2030. The processor 2010 may be specifically a central processing unit (CPU, central processing unit), which is a computer core unit.

Specifically, the program 2031 may include: a TURN data packet generating unit 2031-1;

the sender 2020-1 is configured to send a resource allocate request to the TURN server, so that the TURN server allocates a relay address and a resource port for the communications terminal, where the relay address and the resource port are an IP address and a port of the TURN server;

the TURN data packet generating unit 2031-1 is configured to generate a TURN data packet, where the TURN data packet includes communication data and a multiplexing identifier, the multiplexing identifier is used to identify a communications channel between the relay address and the resource port, and a remote node corresponding to the communication data; and transmit the TURN data packet to the sender 2020-1; and the sender 2020-1 is further configured to receive the TURN data packet from the TURN data packet generating unit 2031-1, and send the TURN data packet to the TURN server, so that the TURN server sends the communication data to the remote node through the communications channel identified by the multiplexing identifier.

The following describes 3 implementation manners of Embodiment 5 of the present invention respectively. In Implementation manner 1 of Embodiment 5, a communications protocol between the TURN server and the remote node is a TCP; in Implementation manner 2 of Embodiment 5, the communications protocol between the TURN server and the remote node is a UDP; and in Implementation manner 3 of Embodiment 5, the communications protocol between the TURN server and the remote node is a websocket.

In Implementation manner 1 of Embodiment 5 of the present invention, the resource allocate request sent by the sender 2020-1 includes a resource protocol type, where the resource protocol type designates that the communications protocol between the TURN server and the remote node is specifically the TCP;

the multiplexing identifier included in the TURN data packet generated by the TURN data packet generating unit 2031-1 is specifically used to identify a TCP connection with the remote node established by the TURN server by using the relay address and the resource port, so that the TURN server sends the communication data to the remote node through the TCP connection identified by the multiplexing identifier.

When the TCP connection is established, specifically, the TURN server may actively initiate establishing of the TCP connection according to a connection request of the communications terminal, or the remote node may actively initiate establishing of the TCP connection.

For the implementation manner that the TURN server actively initiates establishing of the TCP connection according to the connection request of the communications terminal: the receiver 2020-2 is configured to receive a resource identifier sent by the TURN server after recording the resource identifier allocated for a pre-created configuration information object, the relay address, and the resource port are recorded in the configuration information object; the sender 2020-1 is further configured to send a connection request to the TURN server, where the connection request includes the resource identifier, and an IP address and a port number of the remote node, so that: the TURN server obtains the configuration information object in which the resource identifier is recorded, reads the relay address and the resource port from the configuration information object, and establishes the TCP connection by using the read relay address and the read resource port, and the IP address and the port number of the remote node in the connection request.

In Implementation manner 1 of Embodiment 5, the receiver 2020-2 is further configured to receive a TURN data packet encapsulated with the communication data and sent by the TURN server, where the TURN data packet further includes the multiplexing identifier; where the communication data is received by the TURN server from the remote node through the TCP connection.

In Implementation manner 2 of Embodiment 5, the resource allocate request sent by the sender 2020-1 includes a resource protocol type, where the resource protocol type designates that the communications protocol between the TURN server and the remote node is the UDP;

the multiplexing identifier included in the TURN data packet generated by the TURN data packet generating unit 2031-1 is specifically used to identify a UDP channel between the relay address and the resource port, and the remote node, so that: the TURN server obtains the relay address and the resource port, and an IP address and a port number of the remote node according to the multiplexing identifier, encapsulates the communication data in a UDP data packet, and sends the UDP data packet to the remote node, where a source IP address and a source port number of the UDP data packet are the relay address and the resource port, and a destination IP address and a destination port number of the UDP data packet are the IP address and the port number of the remote node.

The receiver 2020-2 is further configured to receive the TURN data packet encapsulated with the communication data received from the remote node and sent by the TURN server, where the TURN data packet further includes the multiplexing identifier.

In Implementation manner 3 of Embodiment 5 of the present invention:

the resource allocate request sent by the sender 2020-1 includes a resource protocol type, where the resource protocol type designates that the communications protocol between the TURN server and the remote node is the websocket;

the receiver 2020-2 is configured to receive a connection identifier sent by the TURN server, where the TURN server records correspondence between the connection identifier and the first websocket connection, and correspondence between the connection identifier and a second websocket connection, the second websocket connection is a websocket connection with the remote node pre-established by the TURN server by using the relay address and the resource port, and a message exchanged between the TURN server and the remote node is transmitted through the second websocket connection;

the multiplexing identifier included in the TURN data packet generated by the TURN data packet generating unit 2031-1 is specifically the connection identifier, so that the TURN server sends the TURN data packet to the remote node through the second websocket connection corresponding to the connection identifier.

Further, the receiver 2020-2 is further configured to receive the TURN data packet received from the remote node and sent by the TURN server, where the TURN data packet includes the communication data and the connection identifier; where the connection identifier added into the TURN data packet by the remote node is pre-received from the TURN server.

For specific implementation of each unit in the program 2031, refer to corresponding units in Embodiment 3 of the present invention, and details are not described herein again.

Functional units described in Embodiment 5 of the present invention may be used to implement the method described in Embodiment 1.

According to Embodiment 1 to Embodiment 5 of the present invention, Embodiment 6 of the present invention provides a communications system 4000.

Figures 1, 10:
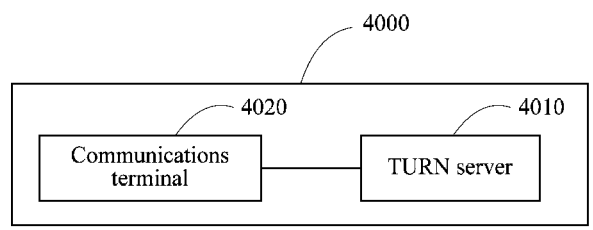
Figures 2, 10:
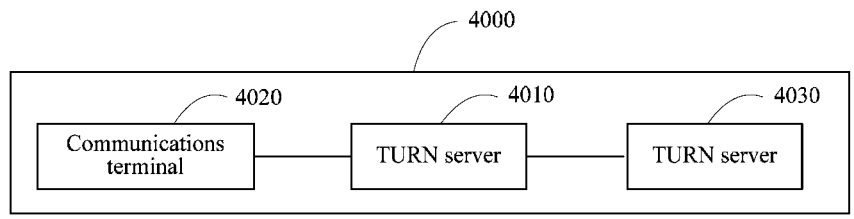

As shown in FIG. 10-1, the communications system includes a TURN server in a public network and a communications terminal in a local area network, and a message exchanged between the TURN server and the communications terminal is transmitted through a pre-established first websocket connection;

the TURN server is configured to receive a resource allocate request sent by the communications terminal, and allocate a relay address and a resource port for the communications terminal, where the relay address and the resource port are an IP address and a port of the TURN server; is further configured to receive a TURN data packet sent by the communications terminal, where the TURN data packet includes communication data and a multiplexing identifier, the multiplexing identifier is used to identify a communications channel between the relay address and the resource port, and a remote node corresponding to the communication data; and is further configured to send the communication data to the remote node through the communications channel identified by the multiplexing identifier; and the communications terminal is configured to send the resource allocate request to the TURN server, and is configured to send the TURN data packet to the TURN server.

The resource allocate request includes a resource protocol type, where the resource protocol type designates that a communications protocol between the TURN server and the remote node may be specifically a TCP, a UDP, or a websocket;

The following describes 3 implementation manners of Embodiment 2 of the present invention respectively. In Implementation manner 1 of Embodiment 2, the communications protocol between the TURN server and the remote node is the TCP; in Implementation manner 2 of Embodiment 2, the communications protocol between the TURN server and the remote node is the UDP; and in Implementation manner 3 of Embodiment 2, the communications protocol between the TURN server and the remote node is the websocket.

In Implementation manner 1 of Embodiment 6 of the present invention, the resource allocate request sent by the communications terminal includes a resource protocol type, where the resource protocol type designates that the communications protocol between the TURN server and the remote node is specifically the TCP;

the TURN server is further configured to establish a TCP connection with the remote node by using the relay address and the resource port, and an IP address and a port number of the remote node;

the multiplexing identifier included in the TURN data packet sent by the communications terminal is specifically used to identify the TCP connection; and that the TURN server is configured to send the communication data to the remote node through the communications channel identified by the multiplexing identifier specifically includes: the TURN server is configured to send the communication data to the remote node through the TCP connection identified by the multiplexing identifier.

In Implementation manner 2 of Embodiment 6 of the present invention, the resource allocate request sent by the communications terminal includes a resource protocol type, where the resource protocol type designates that the communications protocol between the TURN server and the remote node is the UDP;

the multiplexing identifier included in the TURN data packet sent by the communications terminal is specifically used to identify a UDP channel between the relay address and the resource port, and the remote node;

that the TURN server is configured to send the communication data to the remote node through the communications channel identified by the multiplexing identifier specifically includes: the TURN server is configured to obtain the relay address and the resource port, and an IP address and a port number of the remote node according to the multiplexing identifier, encapsulate the communication data in a UDP data packet, and send the UDP data packet to the remote node, where a source IP address and a source port number of the UDP data packet are the relay address and the resource port, and a destination IP address and a destination port number of the UDP data packet are the IP address and the port number of the remote node.

In an optional implementation manner of Implementation manner 2 of Embodiment 6:

the TURN server is further configured to record a resource identifier allocated for a pre-created configuration information object, the relay address, and the resource port in the configuration information object; send the resource identifier to the communications terminal; receive a channel binding request sent by the communications terminal, where the channel binding request includes the resource identifier, and the IP address and the port number of the remote node, and obtain the configuration information object in which the resource identifier is recorded; and record a channel number allocated for the UDP channel and UDP channel information in the configuration information object, where the UDP channel information includes the IP address and the port number of the remote node; and send the channel number to the communications terminal;

the multiplexing identifier included in the TURN data packet sent by the communications terminal is specifically the channel number;

that the TURN server is configured to obtain the relay address and the resource port, and an IP address and a port number of the remote node according to the multiplexing identifier specifically includes: the TURN server obtains the configuration information object in which the channel number is recorded, and obtains the relay address and the resource port, and the IP address and the port number of the remote node in the UDP channel information recorded in the configuration information object; and the communications terminal is further configured to receive the resource identifier sent by the TURN server, and is configured to send the channel binding request to the TURN server.

In Implementation manner 3 of Embodiment 2 of the present invention:

the resource allocate request sent by the communications terminal includes a resource protocol type, where the resource protocol type designates that the communications protocol between the TURN server and the remote node is the websocket;

the TURN server is further configured to generate a connection identifier, record correspondence between the connection identifier and the first websocket connection, and correspondence between the connection identifier and a second websocket connection, and send the connection identifier to the communications terminal; where the second websocket connection is a websocket connection with the remote node pre-established by the TURN server by using the relay address and the resource port, and a message exchanged between the TURN server and the remote node is transmitted through the second websocket connection;

the multiplexing identifier included in the TURN data packet sent by the communications terminal is specifically the connection identifier; and that the TURN server is configured to send the communication data to the remote node through the communications channel identified by the multiplexing identifier specifically includes: the TURN server is configured to send the TURN data packet to the remote node through the second websocket connection corresponding to the connection identifier.

As shown in FIG. 10-2, based on Embodiment 6, Implementation manner 1 of Embodiment 6, or Implementation manner 2 of Embodiment 6, further, the communications system may further include the remote node, where the remote node is specifically a TURN server 4030 in a public network, and a message exchanged between the TURN server 4030 and a communication device in another local area network is transmitted through a pre-established third websocket connection;

an IP address and a port number of the remote node are specifically the relay address and the resource port allocated for the communication device by the TURN server 4030 after the resource allocate request of the communication device is received;

the TURN server 4030 is further configured to encapsulate the communicate data received from the TURN server in a TURN data packet, and send the TURN data packet to the communication device, where the TURN data packet includes the multiplexing identifier.

Further, in Implementation manner 1, the communication data sent by the remote node (TURN server 4030) to the TURN server through the TCP connection is received from the communication device, specifically, the TURN server 4030 is further configured to receive TURN data sent by the communication device, where the TURN data includes the communication data and the multiplexing identifier.

During specific implementation, the TURN server 4010 and the TURN server 4030 may be located in the same physical entity, and may also be located in different physical entities.

The communications system described in Embodiment 6 of the present invention may be used to implement the method described in Embodiment 1.

It should be noted that, for brevity, the foregoing method embodiments are expressed as a series of actions. However, a person skilled in the art should appreciate that the present invention is not limited to the order of the described actions, because according to the present invention, some steps may be performed in other orders or concurrently. Next, a person skilled in the art should also appreciate that all the embodiments described in the specification are exemplary embodiments, and that the involved actions and modules are not necessarily required by the present invention.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing private network traversal, wherein a message exchanged between a traversal using relay network address translation (TURN) server in a public network and a communications terminal in a local area network is transmitted through a pre-established first websocket connection, the method comprising:

receiving, by the TURN server, a resource allocate request sent by the communications terminal, and allocating a relay address and a resource port for the communications terminal, wherein the relay address and the resource port are an IP address and a port of the TURN server;

receiving, by the TURN server, a TURN data packet sent by the communications terminal, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node; and sending, by the TURN server, the communication data to the remote node through the communications channel identified by the multiplexing identifier.

2. The method according to claim 1, wherein the resource allocate request comprises a resource protocol type, wherein the resource protocol type designates that a communications protocol between the TURN server and the remote node is a TCP;

before the receiving, by the TURN server, the TURN data packet sent by the communications terminal, the method further comprises: establishing, by the TURN server, a TCP connection with the remote node by using the relay address and the resource port, and the IP address and the port number of the remote node;

the multiplexing identifier comprised in the TURN data packet is used to identify the TCP connection; and the sending, by the TURN server, the communication data to the remote node through the communications channel identified by the multiplexing identifier comprises: sending, by the TURN server, the communication data to the remote node through the TCP connection identified by the multiplexing identifier.

3. The method according to claim 2, wherein after the allocating the relay address and the resource port for the communications terminal, and before the establishing the TCP connection with the remote node by using the relay address and the resource port, and the IP address and the port number of the remote node, the method further comprises:

recording a resource identifier allocated for a pre-created configuration information object, the relay address, and the resource port in the configuration information object, and sending the resource identifier to the communications terminal;

receiving a create permission request sent by the communications terminal, wherein the create permission request comprises the resource identifier, and the IP address and the port number of the remote node; obtaining the configuration information object in which the resource identifier is recorded, recording permission information in the configuration information object, wherein the permission information comprises the IP address and the port number of the remote node;

receiving a TCP connection request used to establish a TCP connection and sent by a remote node, wherein a destination IP address and a destination port of the TCP connection request are the relay address and the resource port, and a source IP address and a source port of the TCP connection request are an IP address and a port number of the remote node sending the TCP connection request;

obtaining the configuration information object in which the relay address and the resource port are recorded, determining whether the permission information in the configuration information object comprises the IP address and the port number of the remote node sending the TCP connection request, and if the permission information comprises the IP address and the port number of the remote node sending the TCP connection request, determining that the communications terminal permits the remote node sending the TCP connection request to communicate with the communications terminal by using the relay address and the resource port; and the establishing a TCP connection with the remote node by using the relay address and the resource port, and the IP address and the port number of the remote node comprises: establishing the TCP connection with the remote node sending the TCP connection request by using the relay address and the resource port, and the IP address and the port number of the remote node sending the TCP connection request, when determining that the communications terminal permits the remote node sending the TCP connection request to communicate with the communications terminal by using the relay address and the resource port.

4. The method according to claim 2, wherein after the allocating the relay address and the resource port for the communications terminal, and before the establishing the TCP connection with the remote node by using the relay address and the resource port, and the IP address and the port number of the remote node, the method further comprises: recording a resource identifier allocated for a pre-created configuration information object, the relay address, and the resource port in the configuration information object; sending the resource identifier to the communications terminal; receiving a connection request sent by the communications terminal, wherein the connection request comprises the resource identifier, and the IP address and the port number of the remote node, obtaining the configuration information object in which the resource identifier is recorded, and reading the relay address and the resource port from the configuration information object; and the establishing a TCP connection with the remote node by using the relay address and the resource port, and the IP address and the port number of the remote node comprises: establishing the TCP connection by using the read relay address and the read resource port, and the IP address and the port number of the remote node in the connection request.

5. The method according to claim 3, wherein after the establishing a TCP connection with the remote node by using the relay address and the resource port, and the IP address and the port number of the remote node, the method further comprises:

recording correspondence between a connection identifier allocated for the TCP connection and the TCP connection in the configuration information object;

sending the connection identifier to the communications terminal; wherein, the multiplexing identifier comprised in the TURN data packet sent by the communications terminal is the connection identifier; and the sending the communication data to the remote node through the TCP connection identified by the multiplexing identifier comprises: obtaining the configuration information object in which the connection identifier is recorded, determining the TCP connection according to the correspondence between the connection identifier and the TCP connection recorded in the configuration information object, and sending the communication data to the remote node through the TCP connection.

6. The method according to claim 2, wherein after the establishing the TCP connection with the remote node, the method further comprises: receiving communication data sent by the remote node through the TCP connection, encapsulating the communication data in a TURN data packet, and sending the TURN data packet to the communications terminal, wherein the TURN data packet further comprises the multiplexing identifier.

7. The method according to claim 1, wherein
the resource allocate request comprises a resource protocol type, wherein the resource protocol type designates that a communications protocol between the TURN server and the remote node is a UDP;
the multiplexing identifier comprised in the TURN data packet is used to identify a UDP channel between the TURN server and the remote node, which is established by using the relay address and the resource port, and the IP address and the port number of the remote node; and
the sending, by the TURN server, the communication data to the remote node through the communications channel identified by the multiplexing identifier comprises:
obtaining, by the TURN server, the relay address and the resource port, and the IP address and the port number of the remote node according to the multiplexing identifier, encapsulating the communication data in a UDP data packet, and sending the UDP data packet to the remote node, wherein a source IP address and a source port number of the UDP data packet are the relay address and the resource port, and a destination IP address and a destination port number of the UDP data packet are the IP address and the port number of the remote node.

8. The method according to claim 7, wherein
after the allocating the relay address and the resource port for the communications terminal, and before the receiving the TURN data packet sent by the communications terminal, the method further comprises: recording a resource identifier allocated for a pre-created configuration information object, the relay address, and the resource port in the configuration information object; sending the resource identifier to the communications terminal; receiving a channel binding request sent by the communications terminal, wherein the channel binding request comprises the resource identifier, and the IP address and the port number of the remote node, and obtaining the configuration information object in which the resource identifier is recorded; and recording a channel number allocated for the UDP channel and UDP channel information in the configuration information object, wherein the UDP channel information comprises the IP address and the port number of the remote node; and sending the channel number to the communications terminal;
the multiplexing identifier comprised in the TURN data packet is the channel number; and
the obtaining, by the TURN server, the relay address and the resource port, and the IP address and the port number of the remote node according to the multiplexing identifier comprises: obtaining, by the TURN server, the configuration information object in which the channel number is recorded, and obtaining the relay address and the resource port, and the IP address and the port number of the remote node in the UDP channel information recorded in the configuration information object.

9. The method according to claim 8, wherein after the sending the resource identifier to the communications terminal, the method further comprises:
receiving, by the TURN server, a create permission request sent by the communications terminal, wherein the create permission request comprises the resource identifier, and the IP address and the port number of the remote node;
obtaining, by the TURN server, the configuration information object in which the resource identifier is recorded, and recording permission information in the configuration information object, wherein the permission information comprises the IP address and the port number of the remote node;
receiving, by the TURN server, a UDP data packet encapsulated with communication data and sent by a remote node, wherein a destination IP address and a destination port number of the UDP data packet are the relay address and the resource port, and a source IP address and a source port number of the UDP data packet are an IP address and a port number of the remote node sending the UDP data packet; and
obtaining, by the TURN server, the configuration information object in which the relay address and the resource port are recorded, determining whether the permission information in the configuration information object comprises the IP address and the port number of the remote node sending the UDP data packet, and if the permission information comprises the IP address and the port number of the remote node sending the UDP data packet, determining that the communications terminal permits the remote node sending the UDP data packet to communicate with the communications terminal by using the relay address and the resource port, encapsulating the communication data in a TURN data packet, and sending the TURN data packet to the communications terminal, wherein the TURN data packet further comprises the multiplexing identifier.

10. The method according to claim 1, wherein
the resource allocate request comprises a resource protocol type, wherein the resource protocol type designates that a communications protocol between the TURN server and the remote node is a websocket;
before the receiving, by the TURN server, a TURN data packet sent by the communications terminal, the method further comprises: generating a connection identifier, recording correspondence between the connection identifier and the first websocket connection, and correspondence between the connection identifier and a second websocket connection, and sending the connection identifier to the communications terminal, wherein the second websocket connection is a websocket connection with the remote node pre-established by the TURN server by using the relay address and the resource port, and the IP address and the port number of the remote node, and a message exchanged between the TURN server and the remote node is transmitted through the second websocket connection;
the multiplexing identifier comprised in the TURN data packet is the connection identifier; and
the sending, by the TURN server, the communication data to the remote node through the communications channel identified by the multiplexing identifier comprises: sending, by the TURN server, the TURN data packet to the remote node through the second websocket connection corresponding to the connection identifier.

11. The method according to claim 10, wherein after the generating the connection identifier, recording correspondence between the connection identifier and the first websocket connection, and correspondence between the connection identifier and the second websocket connection, the method further comprises:
sending the connection identifier to the remote node; and
receiving a TURN data packet sent by the remote node, and sending a TURN data packet to the communications terminal, wherein the TURN data packet comprises communication data and the connection identifier.

12. The method according to claim 10, wherein
after allocating the relay address and the resource port for the communications terminal, and before the generating the connection identifier, recording correspondence between the connection identifier and the first websocket connection, and correspondence between the connection identifier and the second websocket connection, the method further comprises: recording a resource identifier allocated for a pre-created configuration information object, the relay address, and the resource port in the configuration information object; sending the resource identifier to the communications terminal; receiving a connection request sent by the communications terminal, wherein the connection request comprises the resource identifier, and the IP address and the port number of the remote node, obtaining the configuration information object in which the resource identifier is recorded, and determining the second websocket connection according to the relay address and the resource port recorded in the configuration information object, and the IP address and the port number of the remote node in the connection request;
the recording correspondence between the connection identifier and the first websocket connection, and correspondence between the connection identifier and the second websocket connection comprises: recording the correspondence between the connection identifier and the first websocket connection, and the correspondence between the connection identifier and the second websocket connection in the configuration information object; and
the sending, by the TURN server, the TURN data packet to the remote node through the second websocket connection corresponding to the connection identifier comprises: obtaining the configuration information object in which the connection identifier is recorded, determining the second websocket connection according to the correspondence between the connection identifier and the second websocket connection recorded in the configuration information object, and sending the TURN data packet to the remote node through the second websocket connection.

13. The method according to claim 10, wherein
after allocating the relay address and the resource port for the communications terminal, and before the generating the connection identifier, recording correspondence between the connection identifier and the first websocket connection, and correspondence between the connection identifier and the second websocket connection, the method further comprises: recording a resource identifier allocated for a pre-created configuration information object, the relay address, and the resource port in the configuration information object; sending the resource identifier to the communications terminal;
receiving a create permission request sent by the communications terminal, wherein the create permission request comprises the resource identifier, and the IP address and the port number of the remote node; obtaining the configuration information object in which the resource identifier is recorded, recording permission information in the configuration information object, wherein the permission information comprises the IP address and the port number of the remote node; receiving a connection request sent by a remote node, wherein the connection request comprises an IP address and a port number of the communications terminal, obtaining the configuration information object in which the IP address and the port number of the communications terminal are recorded, determining whether the permission information in the configuration information object comprises the IP address and the port number of the remote node sending the connection request, and if the permission information comprises the IP address and the port number of the remote node sending the connection request, determining that the communications terminal permits the remote node sending the connection request to communicate with the communications terminal by using the relay address and the resource port;
the recording correspondence between the connection identifier and the first websocket connection, and correspondence between the connection identifier and the second websocket connection comprises: recording the correspondence between the connection identifier and the first websocket connection, and the correspondence between the connection identifier and the second websocket connection in the configuration information object, when determining that the communications terminal permits the remote node sending the connection request to communicate with the communications terminal by using the relay address and the resource port, wherein the second websocket connection is a websocket connection with the remote node sending the connection request pre-established by the TURN server by using the relay address and the resource port, and the IP address and the port number of the remote node sending the connection request; and
the sending, by the TURN server, the TURN data packet to the remote node through the second websocket connection corresponding to the connection identifier comprises: obtaining the configuration information object in which the connection identifier is recorded, determining the second websocket connection according to the correspondence between the connection identifier and the second websocket connection recorded in the configuration information object, and sending the TURN data packet to the remote node sending the connection request through the second websocket connection.

14. A method for implementing private network traversal, wherein a message exchanged between a traversal using relay network address translation (TURN) server in a public network and a communications terminal in a local area network is transmitted through a pre-established first websocket connection, the method comprising:
sending, by the communications terminal, a resource allocate request to the TURN server, so that the TURN server allocates a relay address and a resource port for the communications terminal, wherein the relay address and the resource port are an IP address and a port of the TURN server; and
sending, by the communications terminal, a TURN data packet to the TURN server, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node, so that the TURN server sends the communication data to the remote node through the communications channel identified by the multiplexing identifier.

15. The method according to claim 14, wherein
the resource allocate request comprises a resource protocol type, wherein the resource protocol type designates that a communications protocol between the TURN server and the remote node is a TCP; and
the multiplexing identifier comprised in the TURN data packet is used to identify a TCP connection with the remote node established by the TURN server by using the relay address and the resource port, and the IP address and the port number of the remote node, so that the TURN server sends the communication data to the remote node through the TCP connection identified by the multiplexing identifier.

16. The method according to claim 14, wherein
the resource allocate request comprises a resource protocol type, wherein the resource protocol type designates that a communications protocol between the TURN server and the remote node is a UDP; and
the multiplexing identifier comprised in the TURN data packet is used to identify a UDP channel between the relay address and the resource port, and the remote node, so that the TURN server obtains the relay address and the resource port, and the IP address and the port number of the remote node according to the multiplexing identifier, encapsulates the communication data in a UDP data packet, and sends the UDP data packet to the remote node, wherein a source IP address and a source port number of the UDP data packet are the relay address and the resource port, and a destination IP address and a destination port number of the UDP data packet are the IP address and the port number of the remote node.

17. The method according to claim 16, wherein
before the sending, by the communications terminal, the TURN data packet to the TURN server, the method further comprises: receiving, by the communications terminal, a resource identifier sent by the TURN server after the resource identifier allocated for a pre-created configuration information object, the relay address, and the resource port are recorded in the configuration information object; sending a channel binding request to the TURN server, wherein the channel binding request comprises the resource identifier, and the IP address and the port number of the remote node, so that: the TURN server records a channel number allocated for the UDP channel and UDP channel information in the configuration information object in which the resource identifier is recorded, wherein the UDP channel information comprises the IP address and the port number of the remote node; and receiving the channel number sent by the TURN server; and
the multiplexing identifier comprised in the TURN data packet is the channel number, so that the TURN server obtains the recorded relay address and the recorded resource port, and the IP address and the port number of the remote node in the UDP channel information from the configuration information object in which the channel number is recorded, encapsulates the communication data in the UDP data packet, and sends the UDP data packet to the remote node, wherein the source IP address and the source port number of the UDP data packet are the relay address and the resource port, and the destination IP address and the destination port number of the UDP data packet are the IP address and the port number of the remote node.

18. The method according to claim 14, wherein
the resource allocate request comprises a resource protocol type, wherein the resource protocol type designates that a communications protocol between the TURN server and the remote node is a websocket;
before the sending, by the communications terminal, the TURN data packet to the TURN server, the method further comprises: receiving, by the communications terminal, a connection identifier sent by the TURN server, wherein the TURN server records correspondence between the connection identifier and the first websocket connection, and correspondence between the connection identifier and a second websocket connection, the second websocket connection is a websocket connection with the remote node pre-established by the TURN server by using the relay address and the resource port, and the IP address and the port number of the remote node, and a message exchanged between the TURN server and the remote node is transmitted through the second websocket connection; and
the multiplexing identifier comprised in the TURN data packet is the connection identifier, so that the TURN server sends the TURN data packet to the remote node through the second websocket connection corresponding to the connection identifier.

19. A traversal using relay network address translation (TURN) server, wherein the TURN server is located in a public network, and a message exchanged with a communications terminal in a local area network is transmitted through a pre-established first websocket connection, the TURN server comprising: a receiving unit, a resource allocating unit, and a sending unit; wherein
the receiving unit is configured to receive a resource allocate request sent by the communications terminal, and transmit the resource allocate request to the resource allocating unit;
the resource allocating unit is configured to receive the resource allocate request from the receiving unit, and allocate a relay address and a resource port for the communications terminal, wherein the relay address and the resource port are an IP address and a port of the TURN server;
the receiving unit is further configured to receive a TURN data packet sent by the communications terminal, and transmit the TURN data packet to the sending unit, wherein the TURN data packet comprises communication data and a multiplexing identifier, the multiplexing identifier is used to identify a communications channel between the TURN server and a remote node corresponding to the communication data, which is established by using the relay address and the resource port, and an IP address and a port number of the remote node; and
the sending unit is configured to receive the TURN data packet from the receiving unit, and send the communication data to the remote node through the communications channel identified by the multiplexing identifier.

20. The TURN server according to claim 19, wherein:
the TURN server further comprises a TCP connection establishing unit;

the resource allocate request received by the receiving unit comprises a resource protocol type, wherein the resource protocol type designates that a communications protocol between the TURN server and the remote node is a TCP;

the TCP connection establishing unit is configured to establish a TCP connection with the remote node by using the relay address and the resource port, and the IP address and the port number of the remote node;

the multiplexing identifier comprised in the TURN data packet received by the receiving unit is used to identify the TCP connection; and the sending unit is configured to send the communication data to the remote node through the TCP connection identified by the multiplexing identifier.

21. The TURN server according to claim 19, wherein the resource allocate request received by the receiving unit comprises a resource protocol type, wherein the resource protocol type designates that a communications protocol between the TURN server and the remote node is a UDP;

the multiplexing identifier comprised in the TURN data packet received by the receiving unit is used to identify a UDP channel between the TURN server and the remote node which is established by using the relay address and the resource port, and the IP address and the port number of the remote node; and the sending unit is configured to receive the TURN data packet from the receiving unit, obtain the relay address and the resource port, and the IP address and the port number of the remote node according to the multiplexing identifier, encapsulate the communication data in a UDP data packet, and send the UDP data packet to the remote node, wherein a source IP address and a source port number of the UDP data packet are the relay address and the resource port, and a destination IP address and a destination port number of the UDP data packet are the IP address and the port number of the remote node.

22. The TURN server according to claim 19, wherein the TURN server further comprises a connection establishing unit;

the resource allocate request received by the receiving unit comprises a resource protocol type, wherein the resource protocol type designates that a communications protocol between the TURN server and the remote node is a websocket; the multiplexing identifier comprised in the TURN data packet received by the receiving unit is a connection identifier generated by the connection establishing unit;

the connection establishing unit is configured to generate the connection identifier, and record correspondence between the connection identifier and the first websocket connection, and correspondence between the connection identifier and a second websocket connection, wherein the second websocket connection is a websocket connection with the remote node pre-established by the TURN server by using the relay address and the resource port, and the IP address and the port number of the remote node, and a message exchanged between the TURN server and the remote node is transmitted through the second websocket connection; and transmit the connection identifier to the sending unit;

the sending unit is further configured to receive the connection identifier from the connection establishing unit, and send the connection identifier to the communications terminal; and the sending unit is configured to send the TURN data packet to the remote node through the second websocket connection corresponding to the connection identifier.

23. A communications terminal located in a local area network, wherein a message exchanged between a traversal using relay network address translation (TURN) server in a public network and the communications terminal is transmitted through a pre-established first websocket connection, the communications terminal comprising: a sending unit and a TURN data packet generating unit; wherein the sending unit is configured to send a resource allocate request to the TURN server, so that the TURN server allocates a relay address and a resource port for the communications terminal, wherein the relay address and the resource port are an IP address and a port of the TURN server;

the TURN data packet generating unit is configured to generate a TURN data packet, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node; and transmit the TURN data packet to the sending unit; and the sending unit is further configured to receive the TURN data packet from the TURN data packet generating unit, and send the TURN data packet to the TURN server, so that the TURN server sends the communication data to the remote node through the communications channel identified by the multiplexing identifier.

24. The communications terminal according to claim 23, wherein the resource allocate request sent by the sending unit comprises a resource protocol type, wherein the resource protocol type designates that a communications protocol between the TURN server and the remote node is a TCP; and the multiplexing identifier comprised in the TURN data packet generated by the TURN data packet generating unit is used to identify a TCP connection with the remote node established by the TURN server by using the relay address and the resource port, and the IP address and the port number of the remote node, so that the TURN server sends the communication data to the remote node through the TCP connection identified by the multiplexing identifier.

25. The communications terminal according to claim 23, wherein the resource allocate request sent by the sending unit comprises a resource protocol type, wherein the resource protocol type designates that a communications protocol between the TURN server and the remote node is a UDP; and the multiplexing identifier comprised in the TURN data packet generated by the TURN data packet generating unit is used to identify a UDP channel between the relay address and the resource port, and the remote node, so that the TURN server obtains the relay address and the resource port, and an IP address and a port number of the remote node according to the multiplexing identifier, encapsulates the communication data in a UDP data packet, and sends the UDP data packet to the remote node, wherein a source IP address and a source port number of the UDP data packet are the relay address and the resource port, and a destination IP address and a destination port number of the UDP data packet are the IP address and the port number of the remote node.

26. The communications terminal according to claim 23, wherein the communications terminal further comprises a second receiving unit;
the resource allocate request sent by the sending unit comprises a resource protocol type, wherein the resource protocol type designates that a communications protocol between the TURN server and the remote node is a websocket;
the second receiving unit is configured to receive a connection identifier sent by the TURN server, and is configured to transmit the connection identifier to the TURN data packet generating unit, wherein the TURN server records correspondence between the connection identifier and the first websocket connection, and correspondence between the connection identifier and a second websocket connection, the second websocket connection is a websocket connection with the remote node pre-established by the TURN server by using the relay address and the resource port, and the IP address and the port number of the remote node, and a message exchanged between the TURN server and the remote node is transmitted through the second websocket connection; and
the TURN data packet generating unit is further configured to receive the connection identifier from the second receiving unit; the multiplexing identifier comprised in the TURN data packet generated by the TURN data packet generating unit is the connection identifier, so that the TURN server sends the TURN data packet to the remote node through the second websocket connection corresponding to the connection identifier.

27. A communications system, comprising a traversal using relay network address translation (TURN) server in a public network and a communications terminal in a local area network, wherein a message exchanged between the TURN server and the communications terminal is transmitted through a pre-established first websocket connection;
the TURN server is configured to receive a resource allocate request sent by the communications terminal, and allocate a relay address and a resource port for the communications terminal, wherein the relay address and the resource port are an IP address and a port of the TURN server; the TURN server is further configured to receive a TURN data packet sent by the communications terminal, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node; and is further configured to send the communication data to the remote node through the communications channel identified by the multiplexing identifier; and
the communications terminal is configured to send the resource allocate request to the TURN server, and is configured to send the TURN data packet to the TURN server.

28. A traversal using relay network address translation (TURN) server, wherein the TURN server is located in a public network, and a message exchanged with a communications terminal in a local area network is transmitted through a pre-established first websocket connection, the TURN server comprising:
a processor; and
a non-transitory computer readable medium which contains computer-executable instructions,
the processor is configured to execute the computer-executable instructions to perform operations comprising:
receiving a resource allocate request sent by the communications terminal, and allocating a relay address and a resource port for the communications terminal, wherein the relay address and the resource port are an IP address and a port of the TURN server;
receiving a TURN data packet sent by the communications terminal, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node; and
sending the communication data to the remote node through the communications channel identified by the multiplexing identifier.

29. The TURN server according to claim 28, wherein the resource allocate request comprises a resource protocol type, wherein the resource protocol type designates that a communications protocol between the TURN server and the remote node is a TCP;
the processor is configured to execute the computer-executable instructions to further perform an operation comprising: establishing a TCP connection with the remote node by using the relay address and the resource port, and the IP address and the port number of the remote node;
the multiplexing identifier comprised in the TURN data packet is specifically used to identify the TCP connection; and
the operation of sending the communication data to the remote node through the communications channel identified by the multiplexing identifier comprises: sending the communication data to the remote node through the TCP connection identified by the multiplexing identifier.

30. The TURN server according to claim 28, wherein:
the resource allocate request comprises a resource protocol type, wherein the resource protocol type designates that a communications protocol between the TURN server and the remote node is a UDP;
the multiplexing identifier comprised in the TURN data packet is specifically used to identify a UDP channel between the TURN server and the remote node, which is established by using the relay address and the resource port, and the IP address and the port number of the remote node; and
the operation of sending the communication data to the remote node through the communications channel identified by the multiplexing identifier comprises: obtaining the relay address and the resource port, and the IP address and the port number of the remote node according to the multiplexing identifier, encapsulating the communication data in a UDP data packet, and sending the UDP data packet to the remote node, wherein a source IP address and a source port number of the UDP data packet are the relay address and the resource port, and a destination IP address and a destination port number of the UDP data packet are the IP address and the port number of the remote node.

31. The TURN server according to claim 28, wherein the resource allocate request comprises a resource protocol type, wherein the resource protocol type designates that a communications protocol between the TURN server and the remote node is a websocket;

the processor is configured to execute the computer-executable instructions to further perform operations comprising: generating a connection identifier, recording correspondence between the connection identifier and the first websocket connection, and correspondence between the connection identifier and a second websocket connection, and sending the connection identifier to the communications terminal, wherein the second websocket connection is a websocket connection with the remote node pre-established by the TURN server by using the relay address and the resource port, and the IP address and the port number of the remote node, and a message exchanged between the TURN server and the remote node is transmitted through the second websocket connection;

the multiplexing identifier comprised in the TURN data packet is specifically the connection identifier; and the operation of sending the communication data to the remote node through the communications channel identified by the multiplexing identifier specifically comprises: sending the TURN data packet to the remote node through the second websocket connection corresponding to the connection identifier.

32. A communications terminal, wherein the communications terminal is located in a local area network, and a message exchanged between a traversal using relay network address translation (TURN) server in a public network and the communications terminal is transmitted through a pre-established first websocket connection, the communications terminal comprising:

a processor; and a non-transitory computer readable medium which contains computer-executable instructions, the processor is configured to execute the computer-executable instructions to perform operations comprising:

sending a resource allocate request to the TURN server, so that the TURN server allocates a relay address and a resource port for the communications terminal, wherein the relay address and the resource port are an IP address and a port of the TURN server; and sending a TURN data packet to the TURN server, wherein the TURN data packet comprises communication data and a multiplexing identifier, the multiplexing identifier is used to identify a communications channel between the TURN server and a remote node corresponding to the communication data, which is established by using the relay address and the resource port of the TURN server, and an IP address and a port number of the remote node, so that the TURN server sends the communication data to the remote node through the communications channel identified by the multiplexing identifier.

33. The communications terminal according to claim 32, wherein:

the resource allocate request comprises a resource protocol type, wherein the resource protocol type designates that a communications protocol between the TURN server and the remote node is a TCP; and the multiplexing identifier comprised in the TURN data packet is specifically used to identify a TCP connection with the remote node established by the TURN server by using the relay address and the resource port, and the IP address and the port number of the remote node, so that the TURN server sends the communication data to the remote node through the TCP connection identified by the multiplexing identifier.

34. The communications terminal according to claim 32, wherein:

the resource allocate request comprises a resource protocol type, wherein the resource protocol type designates that a communications protocol between the TURN server and the remote node is a UDP; and the multiplexing identifier comprised in the TURN data packet is specifically used to identify a UDP channel between the relay address and the resource port, and the remote node, so that the TURN server obtains the relay address and the resource port, and the IP address and the port number of the remote node according to the multiplexing identifier, encapsulates the communication data in a UDP data packet, and sends the UDP data packet to the remote node, wherein a source IP address and a source port number of the UDP data packet are the relay address and the resource port, and a destination IP address and a destination port number of the UDP data packet are the IP address and the port number of the remote node.

35. The communications terminal according to claim 32, wherein:

the resource allocate request comprises a resource protocol type, wherein the resource protocol type designates that a communications protocol between the TURN server and the remote node is a websocket;

the processor is configured to execute the computer-executable instructions to further perform an operation comprising: receiving a connection identifier sent by the TURN server, wherein the TURN server records correspondence between the connection identifier and the first websocket connection, and correspondence between the connection identifier and a second websocket connection, the second websocket connection is a websocket connection with the remote node pre-established by the TURN server by using the relay address and the resource port, and the IP address and the port number of the remote node, and a message exchanged between the TURN server and the remote node is transmitted through the second websocket connection;

the multiplexing identifier comprised in the TURN data packet is specifically the connection identifier, so that the TURN server sends the TURN data packet to the remote node through the second websocket connection corresponding to the connection identifier; and the TURN data packet generating unit is further configured to receive the connection identifier from the second receiving unit; the multiplexing identifier comprised in the TURN data packet generated by the TURN data packet generating unit is specifically the connection identifier, so that the TURN server sends the TURN data packet to the remote node through the second websocket connection corresponding to the connection identifier.

* * * * *

UNITED STATES PATENT AND TRADEMARK OFFICE
CERTIFICATE OF CORRECTION

PATENT NO. : 8,885,649 B2  
APPLICATION NO. : 14/139022  
DATED : November 11, 2014  
INVENTOR(S) : Chen et al.

Page 1 of 1

It is certified that error appears in the above-identified patent and that said Letters Patent is hereby corrected as shown below:

On the Title Page item 71

*Under the Applicant:*

Huawei Technologies Co., Ltd., Guangdong (CN)

should read

Huawei Technologies Co., Ltd., Shenzhen (CN)

Signed and Sealed this  
Second Day of June, 2015

Michelle K. Lee  
*Director of the United States Patent and Trademark Office*